US011829760B2

(12) United States Patent
Song et al.

(10) Patent No.: US 11,829,760 B2
(45) Date of Patent: Nov. 28, 2023

(54) PROCESSING-IN-MEMORY DEVICE AND PROCESSING-IN-MEMORY SYSTEM INCLUDING THE SAME

(71) Applicant: SK hynix Inc., Icheon-si (KR)

(72) Inventors: Choung Ki Song, Yongin-si (KR); Il Kon Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 78 days.

(21) Appl. No.: 17/726,303

(22) Filed: Apr. 21, 2022

(65) Prior Publication Data

US 2022/0244958 A1    Aug. 4, 2022

Related U.S. Application Data

(63) Continuation-in-part of application No. 17/027,276, filed on Sep. 21, 2020, now Pat. No. 11,513,733.

(60) Provisional application No. 62/958,226, filed on Jan. 7, 2020.

(30) Foreign Application Priority Data

Jan. 17, 2020    (KR) ........................ 10-2020-0006903

(51) Int. Cl.
  *G06F 9/30*      (2018.01)
(52) U.S. Cl.
  CPC .......... *G06F 9/3016* (2013.01); *G06F 9/3001* (2013.01)
(58) Field of Classification Search
  CPC ............................. G06F 9/3016; G06F 9/3001
  See application file for complete search history.

(56) References Cited

U.S. PATENT DOCUMENTS

| 10,042,639 | B2 | 8/2018 | Gopal et al. |
| 2019/0114265 | A1* | 4/2019 | Chang .................. G06F 13/124 |
| 2020/0089472 | A1 | 3/2020 | Pareek et al. |
| 2020/0174749 | A1 | 6/2020 | Kang et al. |
| 2021/0072986 | A1* | 3/2021 | Yudanov .............. G11C 7/1006 |

FOREIGN PATENT DOCUMENTS

KR    1020200064264 A    6/2020

* cited by examiner

*Primary Examiner* — David E Martinez
(74) *Attorney, Agent, or Firm* — WILLIAM PARK & ASSOCIATES LTD.

(57) ABSTRACT

A processing-in-memory (PIM) device includes a plurality of multiplication/accumulation (MAC) units, each of the MAC units including a memory bank and a MAC operator and performing one operation, among a memory operation and a PIM operation, a command mapping register generating one of a memory operation mode signal and a PIM operation mode signal based on a row address that is mapped to the PIM operation to be performed by the plurality of MAC units, and a command decoder generating a memory control signal for the memory operation and a PIM control signal for the PIM operation, wherein the command decoder is configured to generate the PIM control signal in response to the PIM operation mode signal and configured to transmit the PIM control signal to the plurality of MAC units, and configured to generate the memory control signal in response to the memory operation mode signal and configured to transmit the memory control signal to the plurality of MAC units.

21 Claims, 51 Drawing Sheets

FIG.5

$$\begin{pmatrix} W0.0 & W0.1 & W0.2 & W0.3 & W0.4 & W0.5 & W0.6 & W0.7 \\ W1.0 & W1.1 & W1.2 & W1.3 & W1.4 & W1.5 & W1.6 & W1.7 \\ W2.0 & W2.1 & W2.2 & W2.3 & W2.4 & W2.5 & W2.6 & W2.7 \\ W3.0 & W3.1 & W3.2 & W3.3 & W3.4 & W3.5 & W3.6 & W3.7 \\ W4.0 & W4.1 & W4.2 & W4.3 & W4.4 & W4.5 & W4.6 & W4.7 \\ W5.0 & W5.1 & W5.2 & W5.3 & W5.4 & W5.5 & W5.6 & W5.7 \\ W6.0 & W6.1 & W6.2 & W6.3 & W6.4 & W6.5 & W6.6 & W6.7 \\ W7.0 & W7.1 & W7.2 & W7.3 & W7.4 & W7.5 & W7.6 & W7.7 \end{pmatrix} \times \begin{pmatrix} X0.0 \\ X1.0 \\ X2.0 \\ X3.0 \\ X4.0 \\ X5.0 \\ X6.0 \\ X7.0 \end{pmatrix} = \begin{pmatrix} MAC0.0 \\ MAC1.0 \\ MAC2.0 \\ MAC3.0 \\ MAC4.0 \\ MAC5.0 \\ MAC6.0 \\ MAC7.0 \end{pmatrix}$$

WEIGHT MATRIX  VECTOR MATRIX  MAC RESULT MATRIX

FIG.32

| COLUMN ADDRESS ENTRY | PIM OPERATION ENTRY | ENABLE STATE ENTRY | START ROW ADDRESS ENTRY | END ROW ADDRESS ENTRY |
|---|---|---|---|---|
| 0x00 | MAC ARITHMETIC OPERATION | Enable | 0x8000 | 0x8FFF |
| 0x01 | WRITE VECTOR DATA | Enable | 0xFFF7 | 0xFFF7 |
| 0x02 | WRITE BIAS DATA | Enable | 0xFFF8 | 0xFFF8 |
| 0x03 | AF OPERATION WITH SIGMOID | Enable | 0xFFF9 | 0xFFF9 |
| 0x04 | AF OPERATION WITH TANH | Enable | 0xFFFA | 0xFFFA |
| 0x05 | AF OPERATION WITH GELU | Enable | 0xFFFB | 0xFFFB |
| 0x06 | AF OPERATION WITH RELU | Enable | 0xFFFC | 0xFFFC |
| 0x07 | READ MAC RESULT DATA | Enable | 0xFFFD | 0xFFFD |
| 0x08 | READ AF RESULT DATA | Enable | 0xFFFE | 0xFFFE |

REGISTER ← COMMAND MAPPING REGISTER (623)

FIG. 42

| COLUMN ADDRESS ENTRY | PIM OPERATION ENTRY | ENABLE STATE ENTRY | START ROW ADDRESS ENTRY | END ROW ADDRESS ENTRY |
|---|---|---|---|---|
| 0x00 | MAC ARITHMETIC OPERATION | Disable | | |
| 0x01 | WRITE VECTOR DATA | Disable | | |
| 0x02 | WRITE BIAS DATA | Disable | | |
| 0x03 | AF OPERATION WITH SIGMOID | Disable | | |
| 0x04 | AF OPERATION WITH TANH | Disable | | |
| 0x05 | AF OPERATION WITH GELU | Disable | | |
| 0x06 | AF OPERATION WITH RELU | Disable | | |
| 0x07 | READ MAC RESULT DATA | Disable | | |
| 0x08 | READ AF RESULT DATA | Disable | | |

REGISTER

COMMAND MAPPING REGISTER (623)

FIG.43

| COLUMN ADDRESS ENTRY | PIM OPERATION ENTRY | ENABLE STATE ENTRY | START ROW ADDRESS ENTRY | END ROW ADDRESS ENTRY |
|---|---|---|---|---|
| 0x00 | MAC ARITHMETIC OPERATION | Disable | | |
| 0x01 | WRITE VECTOR DATA | Enable | 0xFFF7 | 0xFFF7 |
| 0x02 | WRITE BIAS DATA | Enable | 0xFFF8 | 0xFFF8 |
| 0x03 | AF OPERATION WITH SIGMOID | Enable | 0xFFF9 | 0xFFF9 |
| 0x04 | AF OPERATION WITH TANH | Enable | 0xFFFA | 0xFFFA |
| 0x05 | AF OPERATION WITH GELU | Enable | 0xFFFB | 0xFFFB |
| 0x06 | AF OPERATION WITH RELU | Enable | 0xFFFC | 0xFFFC |
| 0x07 | READ MAC RESULT DATA | Enable | 0xFFFD | 0xFFFD |
| 0x08 | READ AF RESULT DATA | Enable | 0xFFFE | 0xFFFE |

REGISTER

COMMAND MAPPING REGISTER (623)

FIG. 44

| REGISTER | COLUMN ADDRESS ENTRY | PIM OPERATION ENTRY | ENABLE STATE ENTRY | START ROW ADDRESS ENTRY | END ROW ADDRESS ENTRY |
|---|---|---|---|---|---|
| | 0x00 | MAC ARITHMETIC OPERATION | Enable | 0x8000 | 0x8FFF |
| | 0x01 | WRITE VECTOR DATA | Enable | 0xFFF7 | 0xFFF7 |
| | 0x02 | WRITE BIAS DATA | Enable | 0xFFF8 | 0xFFF8 |
| | 0x03 | AF OPERATION WITH SIGMOID | Enable | 0xFFF9 | 0xFFF9 |
| | 0x04 | AF OPERATION WITH TANH | Enable | 0xFFFA | 0xFFFA |
| | 0x05 | AF OPERATION WITH GELU | Enable | 0xFFFB | 0xFFFB |
| | 0x06 | AF OPERATION WITH RELU | Enable | 0xFFFC | 0xFFFC |
| | 0x07 | READ MAC RESULT DATA | Enable | 0xFFFD | 0xFFFD |
| | 0x08 | READ AF RESULT DATA | Enable | 0xFFFE | 0xFFFE |

COMMAND MAPPING REGISTER (623)

FIG.47

| COLUMN ADDRESS ENTRY | PIM OPERATION ENTRY | ENABLE STATE ENTRY | START ROW ADDRESS ENTRY | END ROW ADDRESS ENTRY |
|---|---|---|---|---|
| 0x00 | MAC ARITHMETIC OPERATION | | | |
| 0x01 | WRITE VECTOR DATA | | | |
| 0x02 | | | | |
| 0x03 | | | | |
| 0x04 | | | | |
| 0x05 | | | | |
| 0x06 | | | | |
| 0x07 | | | | |
| 0x08 | | | | |

REGISTER

COMMAND MAPPING REGISTER (G23)

FIG.49

| COLUMN ADDRESS ENTRY | PIM OPERATION ENTRY | ENABLE STATE ENTRY | START ROW ADDRESS ENTRY | END ROW ADDRESS ENTRY |
|---|---|---|---|---|
| 0x00 | MAC ARITHMETIC OPERATION | | | |
| 0x01 | WRITE VECTOR DATA | | | |
| 0x02 | WRITE BIAS DATA | | | |
| 0x03 | | | | |
| 0x04 | | | | |
| 0x05 | | | | |
| 0x06 | | | | |
| 0x07 | | | | |
| 0x08 | | | | |

REGISTER → COMMAND MAPPING REGISTER (623)

FIG.51

| COLUMN ADDRESS ENTRY | PIM OPERATION ENTRY | ENABLE STATE ENTRY | START ROW ADDRESS ENTRY | END ROW ADDRESS ENTRY |
|---|---|---|---|---|
| 0x00 | MAC ARITHMETIC OPERATION | | | |
| 0x01 | WRITE VECTOR DATA | | | |
| 0x02 | WRITE BIAS DATA | | | |
| 0x03 | AF OPERATION WITH SIGMOID | | | |
| 0x04 | AF OPERATION WITH TANH | | | |
| 0x05 | AF OPERATION WITH GELU | | | |
| 0x06 | AF OPERATION WITH RELU | | | |
| 0x07 | READ MAC RESULT DATA | | | |
| 0x08 | READ AF RESULT DATA | | | |

REGISTER

COMMAND MAPPING REGISTER (523)

PROCESSING-IN-MEMORY DEVICE AND PROCESSING-IN-MEMORY SYSTEM INCLUDING THE SAME

CROSS-REFERENCE TO RELATED APPLICATIONS

This is a continuation-in-part of U.S. patent application Ser. No. 17/027,276, filed Sep. 21, 2020, which claims the benefit of U.S. Provisional Application No. 62/958,226, filed on Jan. 7, 2020, and claims priority to Korean Application No. 10-2020-0006903, filed on Jan. 17, 2020, which are incorporated herein by reference in their entirety.

BACKGROUND

1. Technical Field

Various embodiments of the present disclosure relate to processing-in-memory (PIM) devices and PIM systems including the same.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. In general, techniques for effectively learning deep neural networks (DNNs) or deep networks having increased layers as compared with general neural networks to utilize the deep neural networks (DNNs) or the deep networks in pattern recognition or inference are commonly referred to as deep learning.

One cause of this widespread interest may be the improved performance of processors performing arithmetic operations. To improve the performance of artificial intelligence, it may be necessary to increase the number of layers constituting a neural network in the artificial intelligence to educate the artificial intelligence. This trend has continued in recent years, which has led to an exponential increase in the amount of computation required for the hardware that actually does the computation. Moreover, if the artificial intelligence employs a general hardware system including memory and a processor which are separated from each other, the performance of the artificial intelligence may be degraded due to limitation of the amount of data communication between the memory and the processor. In order to solve this problem, a PIM device in which a processor and memory are integrated in one semiconductor chip has been used as a neural network computing device. Because the PIM device directly performs arithmetic operations internally, data processing speed in the neural network may be improved.

SUMMARY

A PIM device according to an embodiment of the present disclosure may include a plurality of multiplication and accumulation (MAC) units, each of the plurality of MAC units including a memory bank and a MAC operator and performing one operation, among a memory operation and a PIM operation, a command mapping register configured to generate one of a memory operation mode signal and a PIM operation mode signal based on a row address that is mapped to the PIM operation to be performed by the plurality of MAC units, and a command decoder configured to generate a memory control signal for the memory operation and a PIM control signal for the PIM operation. The command decoder may be configured to generate the PIM control signal in response to the PIM operation mode signal and configured to transmit the PIM control signal to the plurality of MAC units. The command decoder may be configured to generate the memory control signal in response to the memory operation mode signal and configured to transmit the memory control signal to the plurality of MAC units.

A PIM system according to another embodiment of the present disclosure may include a controller configured to generate a command and an address in response to a request from a host, and a PIM device configured to perform a memory operation or a PIM operation in response to the command and address from the controller. The PIM device may include a plurality of multiplication and accumulation (MAC) units, each of the plurality of MAC units including a memory bank and a MAC operator and performing one operation, among the memory operation and the PIM operation, a command mapping register configured to generate one of a memory operation mode signal and a PIM operation mode signal based on a row address that is mapped to the PIM operation to be performed by the plurality of MAC units, and a command decoder configured to generate a memory control signal for the memory operation and a PIM control signal for the PIM operation. The command decoder may be configured to generate the PIM control signal to transmit the PIM control signal to the plurality of MAC units in response to the PIM operation mode signal. The command decoder may be configured to generate the memory control signal to transmit the memory control signal to the plurality of MAC units in response to the memory operation mode signal.

BRIEF DESCRIPTION OF THE DRAWINGS

Certain features of the disclosed technology are illustrated in various embodiments with reference to the attached drawings.

FIG. 5 illustrates an example of a MAC arithmetic operation performed in a PIM system according to a first embodiment of the present disclosure.

FIG. 32 is a diagram illustrating an example of a configuration of a command mapping register of a PIM device in the PIM system of FIG. 31.

FIG. 42 is a diagram illustrating a state of the command mapping register before a primary setting process for the command mapping register of a step 733 is performed in the flowchart of FIG. 41.

FIG. 43 is a diagram illustrating a state of the command mapping register after the primary setting process for the command mapping register of step 733 is performed in the flowchart of FIG. 41.

FIG. 44 is a diagram illustrating a state of the command mapping register after a secondary setting process for the command mapping register of a step 755 is performed in the flowchart of FIG. 41.

FIGS. 45 to 51 are diagrams illustrating a PIM operation entry setting process of the command mapping register of the PIM device in the PIM system of FIG. 31.

DETAILED DESCRIPTION OF THE EMBODIMENTS

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean a relative positional relationship, but not used to limit certain cases in which the element directly contacts the other element, or at least one intervening element is present therebetween. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements therebetween.

Various embodiments are directed to PIM systems and methods of operating the PIM systems.

Figure 1:
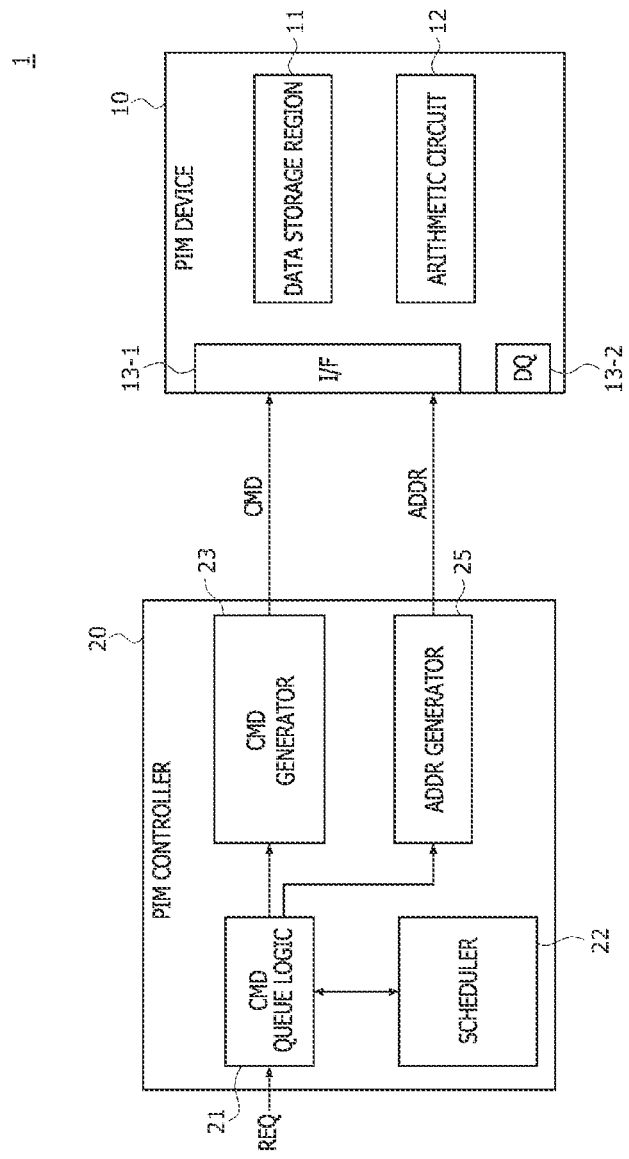
FIG. 1 is a block diagram illustrating a PIM system according to an embodiment of the present disclosure.

FIG. 1 is a block diagram illustrating a PIM system according to an embodiment of the present disclosure. As illustrated in FIG. 1, the PIM system 1 may include a PIM device 10 and a PIM controller 20. The PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device 10 through the data I/O pad 13-2.

The interface 13-1 of the PIM device 10 may receive a command CMD and address ADDR from the PIM controller 20. The interface 13-1 may output the command CMD to the data storage region 11 or the arithmetic circuit 12 in the PIM device 10. The interface 13-1 may output the address ADDR to the data storage region 11 in the PIM device 10. The data I/O pad 13-2 of the PIM device 10 may function as a data communication terminal between a device external to the PIM device 10, for example the PIM controller 20, and the data storage region 11 included in the PIM device 10. The external device to the PIM device 10 may correspond to the PIM controller 20 of the PIM system 1 or a host located outside the PIM system 1. Accordingly, data outputted from the host or the PIM controller 20 may be inputted into the PIM device 10 through the data I/O pad 13-2.

The PIM controller 20 may control operations of the PIM device 10. In an embodiment, the PIM controller 20 may control the PIM device 10 such that the PIM device 10 operates in a memory mode or an arithmetic mode. In the event that the PIM controller 20 controls the PIM device 10 such that the PIM device 10 operates in the memory mode, the PIM device 10 may perform a data read operation or a data write operation for the data storage region 11. In the event that the PIM controller 20 controls the PIM device 10 such that the PIM device 10 operates in the arithmetic mode, the arithmetic circuit 12 of the PIM device 10 may receive first data and second data from the data storage region 11 to perform an arithmetic operation. In the event that the PIM controller 20 controls the PIM device 10 such that the PIM device 10 operates in the arithmetic mode, the PIM device 10 may also perform the data read operation and the data write operation for the data storage region 11 to execute the arithmetic operation. The arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The PIM controller 20 may be configured to include command queue logic 21, a scheduler 22, a command (CMD) generator 23, and an address (ADDR) generator 25. The command queue logic 21 may receive a request REQ from an external device (e.g., a host of the PIM system 1) and store the command queue corresponding to the request REQ in the command queue logic 21. The command queue logic 21 may transmit information on a storage status of the command queue to the scheduler 22 whenever the command queue logic 21 stores the command queue. The command queue stored in the command queue logic 21 may be transmitted to the command generator 23 according to a sequence determined by the scheduler 22. The command queue logic 21, and also the command queue logic 210 of FIGS. 2 and 20, may be implemented as hardware, software, or a combination of hardware and software. For example, the command queue logic 21 and/or 210 may be a command queue logic circuit operating in accordance with an algorithm and/or a processor executing command queue logic code.

The scheduler 22 may adjust a sequence of the command queue when the command queue stored in the command queue logic 21 is outputted from the command queue logic 21. In order to adjust the output sequence of the command queue stored in the command queue logic 21, the scheduler 22 may analyze the information on the storage status of the command queue provided by the command queue logic 21 and may readjust a process sequence of the command queue so that the command queue is processed according to a proper sequence.

The command generator 23 may receive the command queue related to the memory mode of the PIM device 10 and the MAC mode of the PIM device 10 from the command queue logic 21. The command generator 23 may decode the command queue to generate and output the command CMD. The command CMD may include a memory command for the memory mode or an arithmetic command for the arithmetic mode. The command CMD outputted from the command generator 23 may be transmitted to the PIM device 10.

The command generator 23 may be configured to generate and transmit the memory command to the PIM device 10 in the memory mode. The command generator 23 may be configured to generate and transmit a plurality of arithmetic commands to the PIM device 10 in the arithmetic mode. In one example, the command generator 23 may be configured to generate and output first to fifth arithmetic commands with predetermined time intervals in the arithmetic mode. The first arithmetic command may be a control signal for reading the first data out of the data storage region 11. The second arithmetic command may be a control signal for reading the second data out of the data storage region 11. The third arithmetic command may be a control signal for latching the first data in the arithmetic circuit 12. The fourth arithmetic command may be a control signal for latching the second data in the arithmetic circuit 12. And the fifth MAC command may be a control signal for latching arithmetic result data of the arithmetic circuit 12.

The address generator 25 may receive address information from the command queue logic 21 and generate the address ADDR for accessing a region in the data storage region 11. In an embodiment, the address ADDR may include a bank address, a row address, and a column address. The address ADDR outputted from the address generator 25 may be inputted to the data storage region 11 through the interface (I/F) 13-1.

Figure 2:
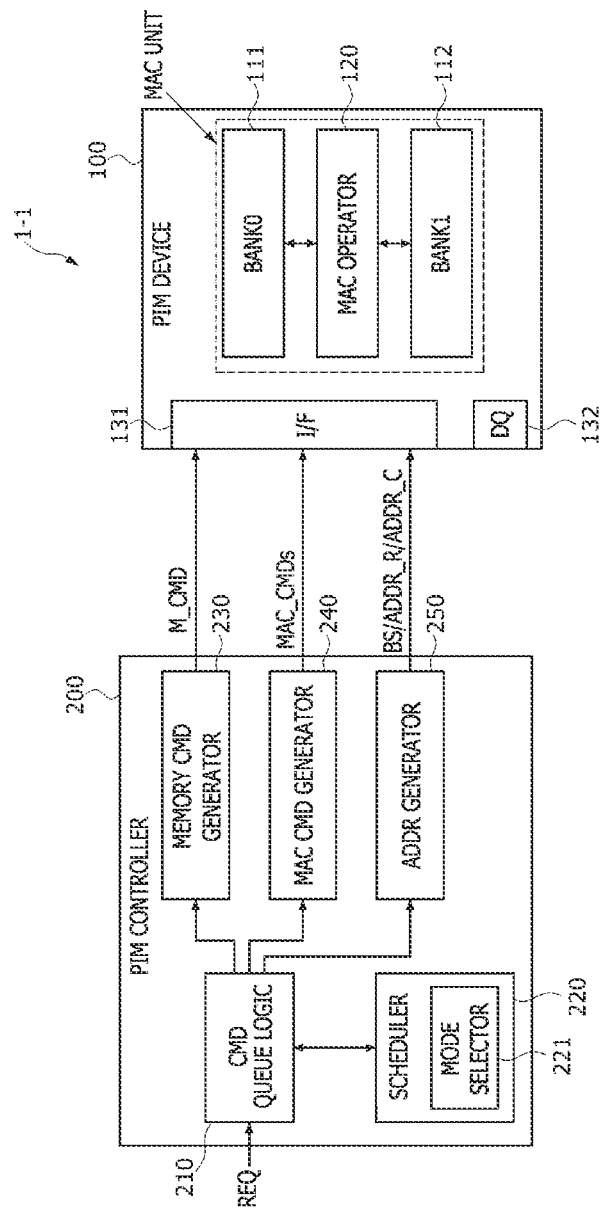
FIG. 2 is a block diagram illustrating a PIM system according to a first embodiment of the present disclosure.

FIG. 2 is a block diagram illustrating a PIM system 1-1 according to a first embodiment of the present disclosure. As illustrated in FIG. 2, the PIM system 1-1 may include a PIM device 100 and a PIM controller 200. The PIM device 100 may include a first memory bank (BANK0) 111, a second memory bank (BANK1) 112, a MAC operator 120, an interface (I/F) 131, and a data input/output (I/O) pad 132. For an embodiment, the MAC operator 120 represents a MAC operator circuit. The first memory bank (BANK0) 111, the second memory bank (BANK1) 112, and the MAC operator 120 included in the PIM device 100 may constitute one MAC unit. In another embodiment, the PIM device 100 may include a plurality of MAC units. The first memory bank (BANK0) 111 and the second memory bank (BANK1) 112 may represent a memory region for storing data, for example, a DRAM device. Each of the first memory bank (BANK0) 111 and the second memory bank (BANK1) 112 may be a component unit which is independently activated and may be configured to have the same data bus width as data I/O lines in the PIM device 100. In an embodiment, the first and second memory banks 111 and 112 may operate through interleaving such that an active operation of the first and second memory banks 111 and 112 is performed in parallel while another memory bank is selected. Each of the first and second memory banks 111 and 112 may include at least one cell array which includes memory unit cells located at cross points of a plurality of rows and a plurality of columns.

Although not shown in the drawings, a core circuit may be disposed adjacent to the first and second memory banks 111 and 112. The core circuit may include X-decoders XDECs and Y-decoders/IO circuits YDEC/IOs. An X-decoder XDEC may also be referred to as a word line decoder or a row decoder. The X-decoder XDEC may receive a row address ADD_R from the PIM controller 200 and may decode the row address ADD_R to select and enable one of the rows (i.e., word lines) coupled to the selected memory bank. Each of the Y-decoders/IO circuits YDEC/IOs may include a Y-decoder YDEC and an I/O circuit JO. The Y-decoder YDEC may also be referred to as a bit line decoder or a column decoder. The Y-decoder YDEC may receive a column address ADDR_C from the PIM controller 200 and may decode the column address ADDR_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the first and second memory banks 111 and 112. In addition, the I/O circuit may include a write driver for driving a write datum during a write operation for the first and second memory banks 111 and 112.

The interface 131 of the PIM device 100 may receive a memory command M_CMD, MAC commands MAC_CMDs, a bank selection signal BS, and the row/column addresses ADDR_R/ADDR_C from the PIM controller 200. The interface 131 may output the memory command M_CMD, together with the bank selection signal BS and the row/column addresses ADDR_R/ADDR_C, to the first memory bank 111 or the second memory bank 112. The interface 131 may output the MAC commands MAC_CMDs to the first memory bank 111, the second memory bank 112, and the MAC operator 120. In such a case, the interface 131 may output the bank selection signal BS and the row/column addresses ADDR_R/ADDR_C to both of the first memory bank 111 and the second memory bank 112. The data I/O pad 132 of the PIM device 100 may function as a data communication terminal between a device external to the PIM device 100 and the MAC unit (which includes the first and second memory banks 111 and 112 and the MAC operator 120) included in the PIM device 100. The external device to the PIM device 100 may correspond to the PIM controller 200 of the PIM system 1-1 or a host located outside the PIM system 1-1. Accordingly, data outputted from the host or the PIM controller 200 may be inputted into the PIM device 100 through the data I/O pad 132.

The PIM controller 200 may control operations of the PIM device 100. In an embodiment, the PIM controller 200 may control the PIM device 100 such that the PIM device 100 operates in a memory mode or a MAC mode. In the event that the PIM controller 200 controls the PIM device 100 such that the PIM device 100 operates in the memory mode, the PIM device 100 may perform a data read operation or a data write operation for the first memory bank 111 and the second memory bank 112. In the event that the PIM controller 200 controls the PIM device 100 such that the PIM device 100 operates in the MAC mode, the PIM device 100 may perform a MAC arithmetic operation for the MAC operator 120. In the event that the PIM controller 200 controls the PIM device 100 such that the PIM device 100 operates in the MAC mode, the PIM device 100 may also perform the data read operation and the data write operation for the first and second memory banks 111 and 112 to execute the MAC arithmetic operation.

The PIM controller 200 may be configured to include command queue logic 210, a scheduler 220, a memory command generator 230, a MAC command generator 240, and an address generator 250. The command queue logic 210 may receive a request REQ from an external device (e.g., a host of the PIM system 1-1) and store a command queue corresponding to the request REQ in the command queue logic 210. The command queue logic 210 may transmit information on a storage status of the command queue to the scheduler 220 whenever the command queue logic 210 stores the command queue. The command queue stored in the command queue logic 210 may be transmitted to the memory command generator 230 or the MAC command generator 240 according to a sequence determined by the scheduler 220. When the command queue outputted from the command queue logic 210 includes command information requesting an operation in the memory mode of the PIM device 100, the command queue logic 210 may transmit the command queue to the memory command generator 230. On the other hand, when the command queue outputted from the command queue logic 210 is command information requesting an operation in the MAC mode of the PIM device 100, the command queue logic 210 may transmit the command queue to the MAC command generator 240. Information on whether the command queue relates to the memory mode or the MAC mode may be provided by the scheduler 220.

The scheduler 220 may adjust a timing of the command queue when the command queue stored in the command queue logic 210 is outputted from the command queue logic 210. In order to adjust the output timing of the command queue stored in the command queue logic 210, the scheduler 220 may analyze the information on the storage status of the command queue provided by the command queue logic 210 and may readjust a process sequence of the command queue such that the command queue is processed according to a proper sequence. The scheduler 220 may output and transmit to the command queue logic 210 information on whether the command queue outputted from the command queue logic 210 relates to the memory mode of the PIM device 100 or relates to the MAC mode of the PIM device 100. In order to obtain the information on whether the command queue outputted from the command queue logic 210 relates to the memory mode or the MAC mode, the scheduler 220 may include a mode selector 221. The mode selector 221 may generate a mode selection signal including information on whether the command queue stored in the command queue logic 210 relates to the memory mode or the MAC mode, and the scheduler 220 may transmit the mode selection signal to the command queue logic 210.

The memory command generator 230 may receive the command queue related to the memory mode of the PIM device 100 from the command queue logic 210. The memory command generator 230 may decode the command queue to generate and output the memory command M_CMD. The memory command M_CMD outputted from the memory command generator 230 may be transmitted to the PIM device 100. In an embodiment, the memory command M_CMD may include a memory read command and a memory write command. When the memory read command is outputted from the memory command generator 230, the PIM device 100 may perform the data read operation for the first memory bank 111 or the second memory bank 112. Data which are read out of the PIM device 100 may be transmitted to an external device through the data I/O pad 132. The read data outputted from the PIM device 100 may be transmitted to a host through the PIM controller 200. When the memory write command is outputted from the memory command generator 230, the PIM device 100 may perform the data write operation for the first memory bank 111 or the second memory bank 112. In such a case, data to be written into the PIM device 100 may be transmitted from the host to the PIM device 100 through the PIM controller 200. The write data inputted to the PIM device 100 may be transmitted to the first memory bank 111 or the second memory bank 112 through the data I/O pad 132.

The MAC command generator 240 may receive the command queue related to the MAC mode of the PIM device 100 from the command queue logic 210. The MAC command generator 240 may decode the command queue to generate and output the MAC commands MAC_CMDs. The MAC commands MAC_CMDs outputted from the MAC command generator 240 may be transmitted to the PIM device 100. The data read operation for the first memory bank 111 and the second memory bank 112 of the PIM device 100 may be performed by the MAC commands MAC_CMDs outputted from the MAC command generator 240, and the MAC arithmetic operation of the MAC operator 120 may also be performed by the MAC commands MAC_CMDs outputted from the MAC command generator 240. The MAC commands MAC_CMDs and the MAC arithmetic operation of the PIM device 100 according to the MAC commands MAC_CMDs will be described in detail with reference to FIG. 3.

The address generator 250 may receive address information from the command queue logic 210. The address generator 250 may generate the bank selection signal BS for selecting one of the first and second memory banks 111 and 112 and may transmit the bank selection signal BS to the PIM device 100. In addition, the address generator 250 may generate the row address ADDR_R and the column address ADDR_C for accessing a region (e.g., memory cells) in the first or second memory bank 111 or 112 and may transmit the row address ADDR_R and the column address ADDR_C to the PIM device 100.

Figure 3:
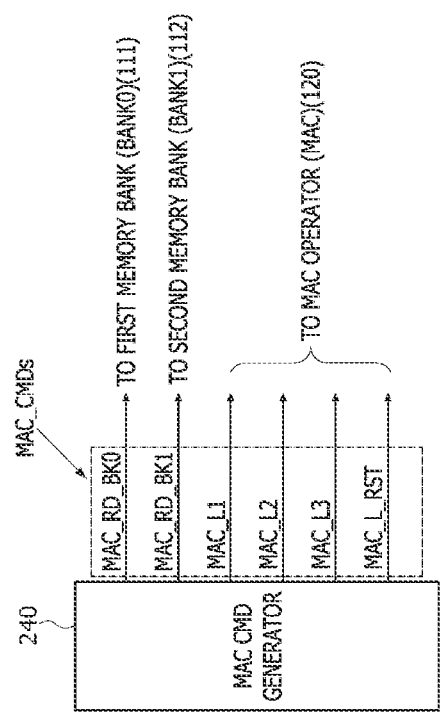
FIG. 3 illustrates MAC commands outputted from a MAC command generator of a PIM controller included in a PIM system according to a first embodiment of the present disclosure.

FIG. 3 illustrates the MAC commands MAC_CMDs outputted from the MAC command generator 240 included in the PIM system 1-1 according to the first embodiment of the present disclosure. As illustrated in FIG. 3, the MAC commands MAC_CMDs may include first to sixth MAC command signals. In an embodiment, the first MAC command signal may be a first MAC read signal MAC_RD_BK0, the second MAC command signal may be a second MAC read signal MAC_RD_BK1, the third MAC command signal may be a first MAC input latch signal MAC_L1, the fourth MAC command signal may be a second MAC input latch signal MAC_L2, the fifth MAC command signal may be a MAC output latch signal MAC_L3, and the sixth MAC command signal may be a MAC latch reset signal MAC_L_RST.

The first MAC read signal MAC_RD_BK0 may control an operation for reading first data (e.g., weight data) out of the first memory bank 111 to transmit the first data to the MAC operator 120. The second MAC read signal MAC_RD_BK1 may control an operation for reading second data (e.g., vector data) out of the second memory bank 112 to transmit the second data to the MAC operator 120. The first MAC input latch signal MAC_L1 may control an input latch operation of the weight data transmitted from the first memory bank 111 to the MAC operator 120. The second MAC input latch signal MAC_L2 may control an input latch operation of the vector data transmitted from the second memory bank 112 to the MAC operator 120. If the input latch operations of the weight data and the vector data are performed, the MAC operator 120 may perform the MAC arithmetic operation to generate MAC result data corresponding to the result of the MAC arithmetic operation. The MAC output latch signal MAC_L3 may control an output latch operation of the MAC result data generated by the MAC operator 120. And, the MAC latch reset signal MAC_L_RST may control an output operation of the MAC result data generated by the MAC operator 120 and a reset operation of an output latch included in the MAC operator 120.

The PIM system 1-1 according to the present embodiment may be configured to perform a deterministic MAC arithmetic operation. The term "deterministic MAC arithmetic operation" used in the present disclosure may be defined as the MAC arithmetic operation performed in the PIM system 1-1 during a predetermined fixed time. Thus, the MAC commands MAC_CMDs transmitted from the PIM controller 200 to the PIM device 100 may be sequentially generated with fixed time intervals. Accordingly, the PIM controller 200 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 200 with fixed time intervals corresponding to the fixed latencies.

For example, the MAC command generator 240 is configured to output the first MAC command at a first point in time. The MAC command generator 240 is configured to output the second MAC command at a second point in time when a first latency elapses from the first point in time. The first latency is set as the time it takes to read the first data out of the first storage region based on the first MAC command and to output the first data to the MAC operator. The MAC command generator 240 is configured to output the third MAC command at a third point in time when a second latency elapses from the second point in time. The second latency is set as the time it takes to read the second data out of the second storage region based on the second MAC command and to output the second data to the MAC operator. The MAC command generator 240 is configured to output the fourth MAC command at a fourth point in time when a third latency elapses from the third point in time. The third latency is set as the time it takes to latch the first data in the MAC operator based on the third MAC command. The MAC command generator 240 is configured to output the fifth MAC command at a fifth point in time when a fourth latency elapses from the fourth point in time. The fourth latency is set as the time it takes to latch the second data in the MAC operator based on the fourth MAC command and to perform the MAC arithmetic operation of the first and second data which are latched in the MAC operator. The MAC command generator 240 is configured to output the sixth MAC command at a sixth point in time when a fifth latency elapses from the fifth point in time. The fifth latency is set as the time it takes to perform an output latch operation of MAC result data generated by the MAC arithmetic operation.

Figure 4:
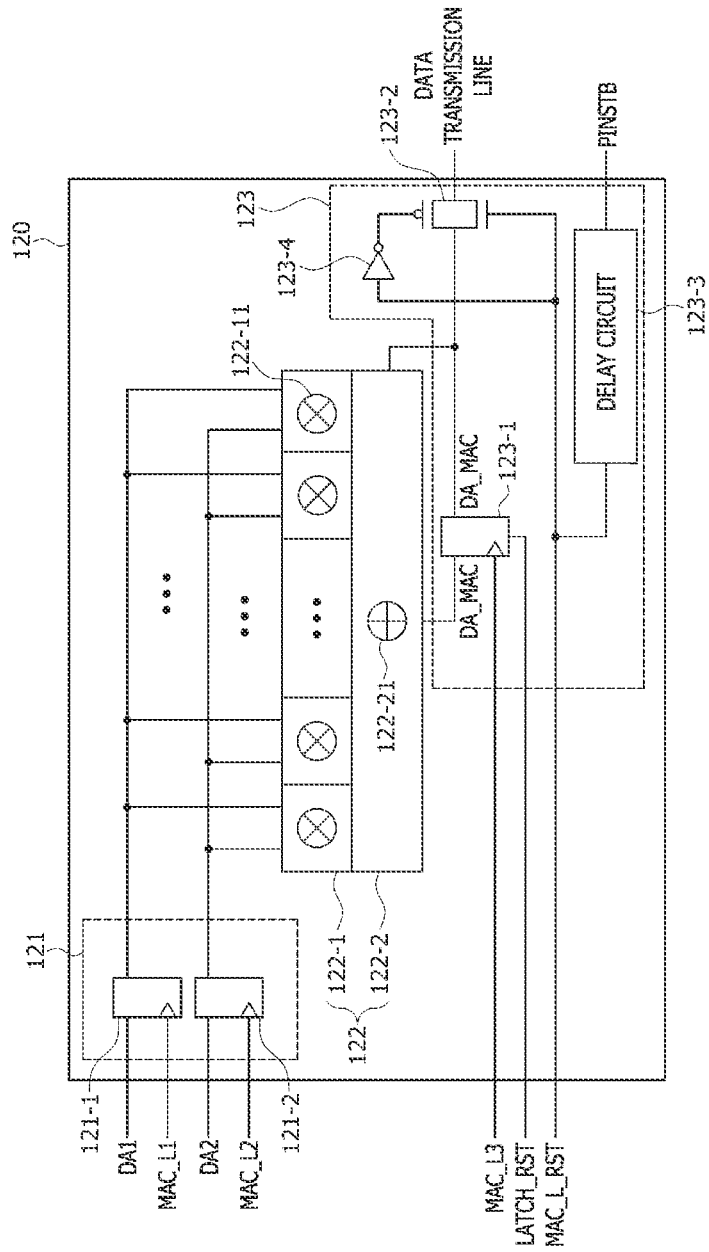
FIG. 4 is a block diagram illustrating an example of a configuration of a MAC operator of a PIM device included in a PIM system according to a first embodiment of the present disclosure.

FIG. 4 illustrates an example of the MAC operator 120 of the PIM device 100 included in the PIM system 1-1 according to the first embodiment of the present disclosure. Referring to FIG. 4, MAC operator 120 may be configured to include a data input circuit 121, a MAC circuit 122, and a data output circuit 123. The data input circuit 121 may include a first input latch 121-1 and a second input latch 121-2. The MAC circuit 122 may include a multiplication logic circuit 122-1 and an addition logic circuit 122-2. The data output circuit 123 may include an output latch 123-1, a transfer gate 123-2, a delay circuit 123-3, and an inverter 123-4. In an embodiment, the first input latch 121-1, the second input latch 121-2, and the output latch 123-1 may be realized using flip-flops.

The data input circuit 121 of the MAC operator 120 may be synchronized with the first MAC input latch signal MAC_L1 to latch first data DA1 transferred from the first memory bank 111 to the MAC circuit 122 through an internal data transmission line. In addition, the data input circuit 121 of the MAC operator 120 may be synchronized with the second MAC input latch signal MAC_L2 to latch second data DA2 transferred from the second memory bank 112 to the MAC circuit 122 through another internal data transmission line. Because the first MAC input latch signal MAC_L1 and the second MAC input latch signal MAC_L2 are sequentially transmitted from the MAC command generator 240 of the PIM controller 200 to the MAC operator 120 of the PIM device 100 with a predetermined time interval, the second data DA2 may be inputted to the MAC circuit 122 of the MAC operator 120 after the first data DA1 is inputted to the MAC circuit 122 of the MAC operator 120.

The MAC circuit 122 may perform the MAC arithmetic operation of the first data DA1 and the second data DA2 inputted through the data input circuit 121. The multiplication logic circuit 122-1 of the MAC circuit 122 may include a plurality of multipliers 122-11. Each of the multipliers 122-11 may perform a multiplying calculation of the first data DA1 outputted from the first input latch 121-1 and the second data DA2 outputted from the second input latch 121-2 and may output the result of the multiplying calculation. Bit values constituting the first data DA1 may be separately inputted to the multipliers 122-11. Similarly, bit values constituting the second data DA2 may also be separately inputted to the multipliers 122-11. For example, if the first data DA1 is represented by an 'N'-bit binary stream, the second data DA2 is represented by an 'N'-bit binary stream, and the number of the multipliers 122-11 is 'M', then 'N/M'-bit portions of the first data DA1 and 'N/M'-bit portions of the second data DA2 may be inputted to each of the multipliers 122-11.

The addition logic circuit 122-2 of the MAC circuit 122 may include a plurality of adders 122-21. Although not shown in the drawings, the plurality of adders 122-21 may be disposed to provide a tree structure including a plurality of stages. Each of the adders 122-21 disposed at a first stage may receive two sets of multiplication result data from two of the multipliers 122-11 included in the multiplication logic circuit 122-1 and may perform an adding calculation of the two sets of multiplication result data to output the addition result data. Each of the adders 122-21 disposed at a second stage may receive two sets of addition result data from two of the adders 122-21 disposed at the first stage and may perform an adding calculation of the two sets of addition result data to output the addition result data. The adder 122-21 disposed at a last stage may receive two sets of addition result data from two adders 122-21 disposed at the previous stage and may perform an adding calculation of the two sets of addition result data to output the addition result data. Although not shown in the drawings, the addition logic circuit 122-2 may further include an additional adder for performing an accumulative adding calculation of MAC result data DA_MAC outputted from the adder 122-21 disposed at the last stage and previous MAC result data DA_MAC stored in the output latch 123-1 of the data output circuit 123.

The data output circuit 123 may output the MAC result data DA_MAC outputted from the MAC circuit 122 to a data transmission line. Specifically, the output latch 123-1 of the data output circuit 123 may be synchronized with the MAC output latch signal MAC_L3 to latch the MAC result data DA_MAC outputted from the MAC circuit 122 and to output the latched data of the MAC result data DA_MAC. The MAC result data DA_MAC outputted from the output latch 123-1 may be fed back to the MAC circuit 122 for the accumulative adding calculation. In addition, the MAC result data DA_MAC may be inputted to the transfer gate 123-2. The output latch 123-1 may be initialized if a latch reset signal LATCH_RST is inputted to the output latch 123-1. In such a case, all of data latched by the output latch 123-1 may be removed. In an embodiment, the latch reset signal LATCH_RST may be activated by generation of the MAC latch reset signal MAC_L_RST and may be inputted to the output latch 123-1.

The MAC latch reset signal MAC_L_RST outputted from the MAC command generator 240 may be inputted to the transfer gate 123-2, the delay circuit 123-3, and the inverter 123-4. The inverter 123-4 may inversely buffer the MAC latch reset signal MAC_L_RST to output the inversely buffered signal of the MAC latch reset signal MAC_L_RST to the transfer gate 123-2. The transfer gate 123-2 may transfer the MAC result data DA_MAC from the output latch 123-1 to the data transmission line in response to the MAC latch reset signal MAC_L_RST. The delay circuit 123-3 may delay the MAC latch reset signal MAC_L_RST by a certain time to generate and output a latch control signal PINSTB.

FIG. 5 illustrates an example of the MAC arithmetic operation performed in the PIM system 1-1 according to the first embodiment of the present disclosure. As illustrated in FIG. 5, the MAC arithmetic operation performed by the PIM system 1-1 may be executed though a matrix calculation. Specifically, the PIM device 100 may execute a matrix multiplying calculation of an 'M×N' weight matrix (e.g., '8×8' weight matrix) and a 'N×1' vector matrix (e.g., '8×1' vector matrix) according to control of the PIM controller 200 (where, 'M' and 'N' are natural numbers). Elements W0.0, . . . , and W7.7 constituting the weight matrix may correspond to the first data DA1 inputted to the MAC operator 120 from the first memory bank 111. Elements X0.0, . . . , and X7.0 constituting the vector matrix may correspond to the second data DA2 inputted to the MAC operator 120 from the second memory bank 112. Each of the elements W0.0, . . . , and W7.7 constituting the weight matrix may be represented by a binary stream having a plurality of bit values. In addition, each of the elements X0.0, . . . , and X7.0 constituting the vector matrix may also be represented by a binary stream having a plurality of bit values. The number of bits included in each of the elements W0.0, . . . , and W7.7 constituting the weight matrix may be equal to the number of bits included in each of the elements X0.0, . . . , and X7.0 constituting the vector matrix.

The matrix multiplying calculation of the weight matrix and the vector matrix may be appropriate for a multilayer perceptron-type neural network structure (hereinafter, referred to as an 'MLP-type neural network'). In general, the MLP-type neural network for executing deep learning may include an input layer, a plurality of hidden layers (e.g., at least three hidden layers), and an output layer. The matrix multiplying calculation (i.e., the MAC arithmetic operation)

of the weight matrix and the vector matrix illustrated in FIG. 5 may be performed in one of the hidden layers. In a first hidden layer of the plurality of hidden layers, the MAC arithmetic operation may be performed using vector data inputted to the first hidden layer. However, in each of second to last hidden layers among the plurality of hidden layers, the MAC arithmetic operation may be performed using a calculation result of the previous hidden layer as the vector data.

Figure 6:
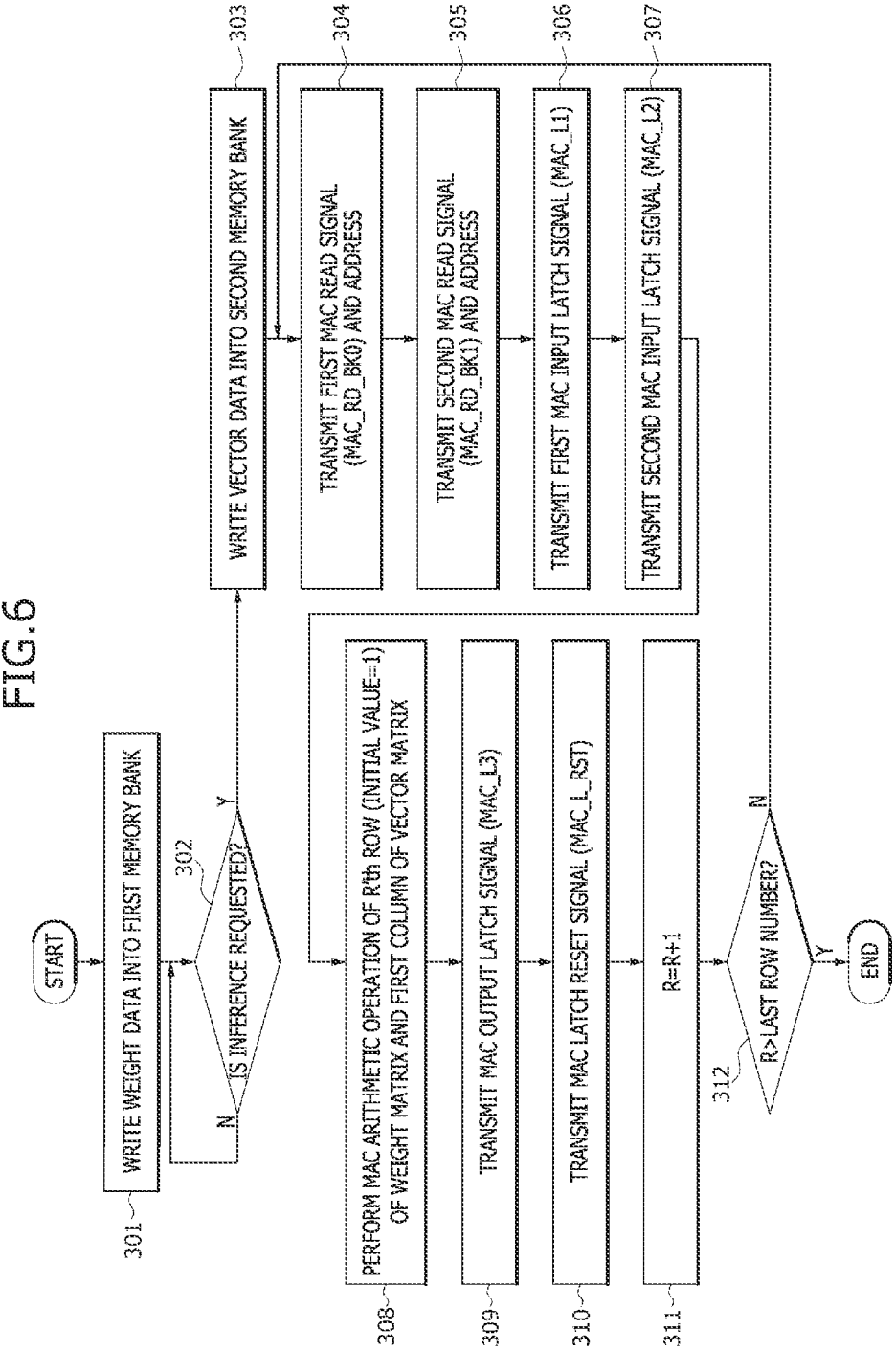
FIG. 6 is a flowchart illustrating processes of the MAC arithmetic operation illustrated in FIG. 5 in a PIM system according to a first embodiment of the present disclosure.

FIG. 6 is a flowchart illustrating processes of the MAC arithmetic operation described with reference to FIG. 5, which are performed in the PIM system 1-1 according to the first embodiment of the present disclosure. In addition, FIGS. 7 to 13 are block diagrams illustrating the processes of the MAC arithmetic operation illustrated in FIG. 5, which are performed in the PIM system 1-1 according to the first embodiment of the present disclosure. Referring to FIGS. 6 to 13, before the MAC arithmetic operation is performed, the first data (i.e., the weight data) may be written into the first memory bank 111 at a step 301. Thus, the weight data may be stored in the first memory bank 111 of the PIM device 100. In the present embodiment, it may be assumed that the weight data are the elements W0.0, . . . , and W7.7 constituting the weight matrix of FIG. 5. The integer before the decimal point is one less than a row number, and the integer after the decimal point is one less than a column number. Thus, for example, the weight W0.0 represents the element of the first row and the first column of the weight matrix.

At a step 302, whether an inference is requested may be determined. An inference request signal may be transmitted from an external device located outside of the PIM system 1-1 to the PIM controller 200 of the PIM system 1-1. An inference request, in some instances, may be based on user input. An inference request may initiate a calculation performed by the PIM system 1-1 to reach a determination based on input data. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 200 at the step 302, then the PIM controller 200 may write the vector data transmitted with the inference request signal into the second memory bank 112 at a step 303. Accordingly, the vector data may be stored in the second memory bank 112 of the PIM device 100.

Figure 7:
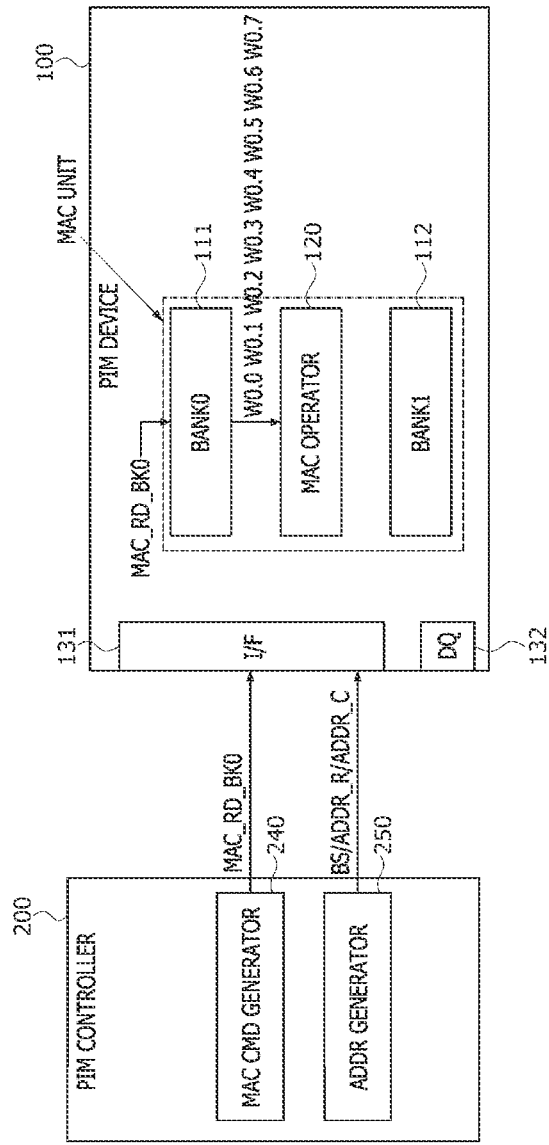
FIGS. 7 to 13 are block diagrams illustrating processes of the MAC arithmetic operation illustrated in FIG. 5 in a PIM system according to a first embodiment of the present disclosure.

At a step 304, the MAC command generator 240 of the PIM controller 200 may generate and transmit the first MAC read signal MAC_RD_BK0 to the PIM device 100, as illustrated in FIG. 7. In such a case, the address generator 250 of the PIM controller 200 may generate and transmit the bank selection signal BS and the row/column address ADDR_R/ADDR_C to the PIM device 100. The bank selection signal BS may be generated to select the first memory bank 111 of the first and second memory banks 111 and 112. Thus, the first MAC read signal MAC_RD_BK0 may control the data read operation for the first memory bank 111 of the PIM device 100. The first memory bank 111 may output and transmit the elements W0.0, . . . , and W0.7 in the first row of the weight matrix of the weight data stored in a region of the first memory bank 111, which is selected by the row/column address ADDR_R/ADDR_C, to the MAC operator 120 in response to the first MAC read signal MAC_RD_BK0. In an embodiment, the data transmission from the first memory bank 111 to the MAC operator 120 may be executed through a global input/output (hereinafter, referred to as 'GIO') line which is provided as a data transmission path in the PIM device 100. Alternatively, the data transmission from the first memory bank 111 to the MAC operator 120 may be executed through a first bank input/output (hereinafter, referred to as 'BIO') line which is provided specifically for data transmission between the first memory bank 111 and the MAC operator 120.

Figure 8:
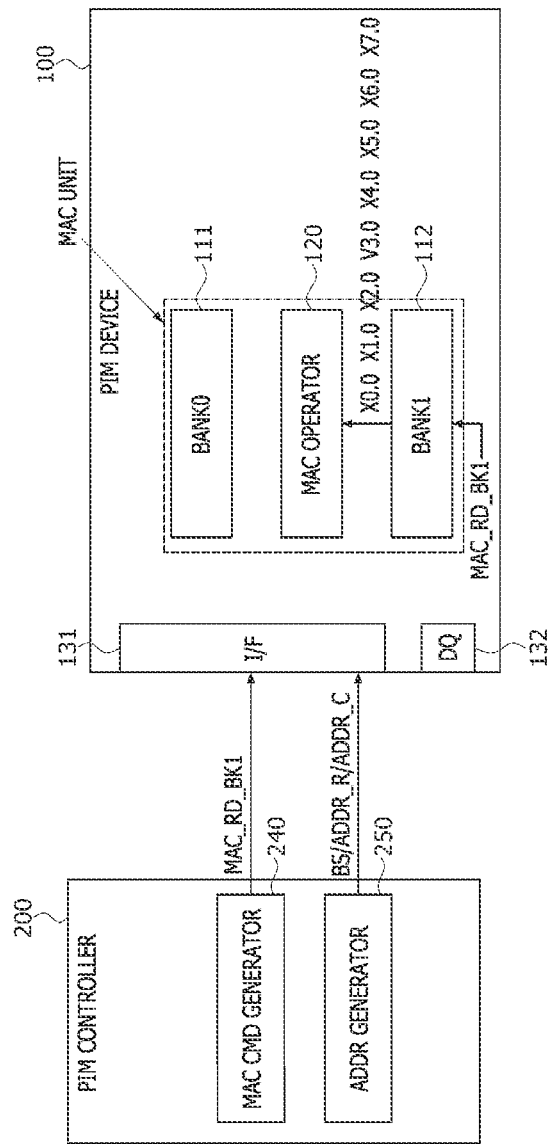

At a step 305, the MAC command generator 240 of the PIM controller 200 may generate and transmit the second MAC read signal MAC_RD_BK1 to the PIM device 100, as illustrated in FIG. 8. In such a case, the address generator 250 of the PIM controller 200 may generate and transmit the bank selection signal BS for selecting the second memory bank 112 and the row/column address ADDR_R/ADDR_C to the PIM device 100. The second MAC read signal MAC_RD_BK1 may control the data read operation for the second memory bank 112 of the PIM device 100. The second memory bank 112 may output and transmit the elements X0.0, . . . , and X7.0 in the first column of the vector matrix corresponding to the vector data stored in a region of the second memory bank 112, which is selected by the row/column address ADDR_R/ADDR_C, to the MAC operator 120 in response to the second MAC read signal MAC_RD_BK1. In an embodiment, the data transmission from the second memory bank 112 to the MAC operator 120 may be executed through the GIO line in the PIM device 100. Alternatively, the data transmission from the second memory bank 112 to the MAC operator 120 may be executed through a second BIO line which is provided specifically for data transmission between the second memory bank 112 and the MAC operator 120.

Figure 9:
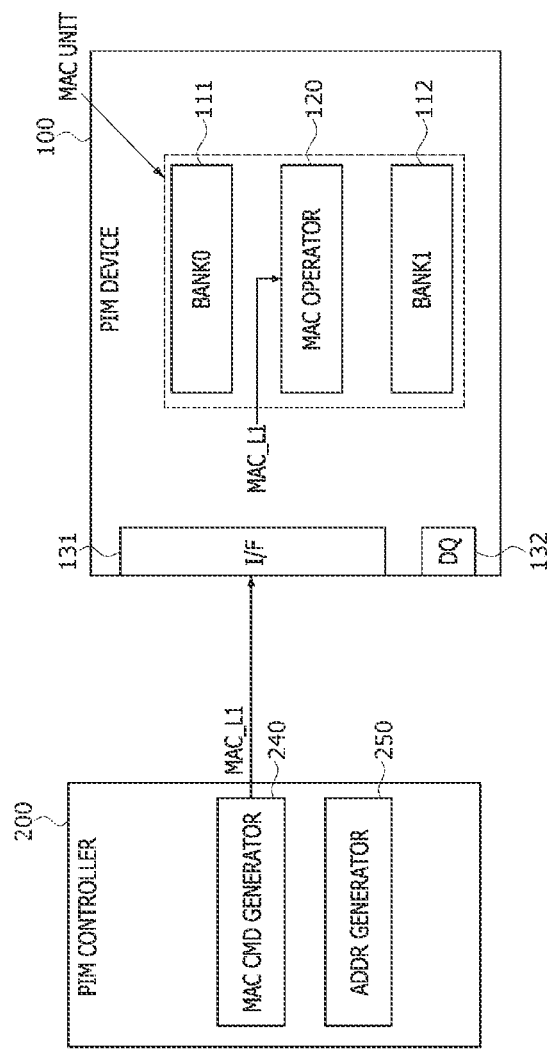
Figure 11:
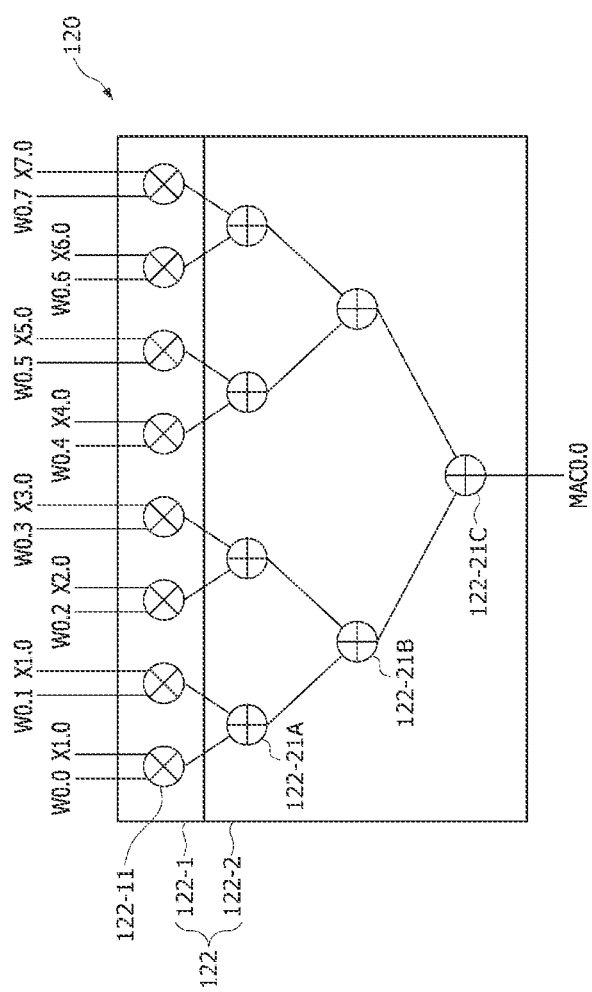

At a step 306, the MAC command generator 240 of the PIM controller 200 may generate and transmit the first MAC input latch signal MAC_L1 to the PIM device 100, as illustrated in FIG. 9. The first MAC input latch signal MAC_L1 may control the input latch operation of the first data for the MAC operator 120 of the PIM device 100. The elements W0.0, . . . , and W0.7 in the first row of the weight matrix may be inputted to the MAC circuit 122 of the MAC operator 120 by the input latch operation, as illustrated in FIG. 11. The MAC circuit 122 may include the plurality of multipliers 122-11 (e.g., eight multipliers 122-11), the number of which is equal to the number of columns of the weight matrix. In such a case, the elements W0.0, . . . , and W0.7 in the first row of the weight matrix may be inputted to the eight multipliers 122-11, respectively.

Figure 10:
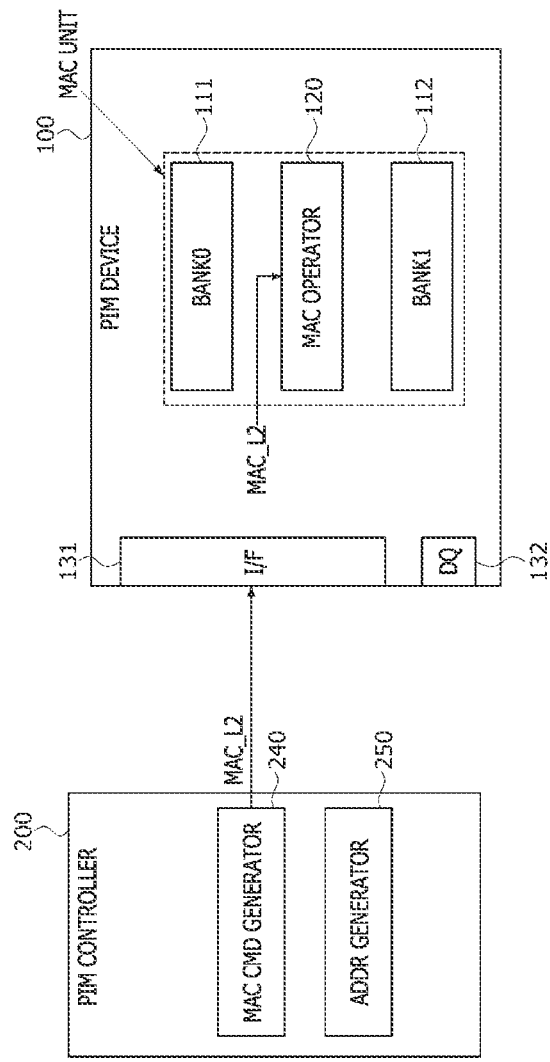

At a step 307, the MAC command generator 240 of the PIM controller 200 may generate and transmit the second MAC input latch signal MAC_L2 to the PIM device 100, as illustrated in FIG. 10. The second MAC input latch signal MAC_L2 may control the input latch operation of the second data for the MAC operator 120 of the PIM device 100. The elements X0.0, . . . , and X7.0 in the first column of the vector matrix may be inputted to the MAC circuit 122 of the MAC operator 120 by the input latch operation, as illustrated in FIG. 11. In such a case, the elements X0.0, . . . , and X7.0 in the first column of the vector matrix may be inputted to the eight multipliers 122-11, respectively.

At a step 308, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. For example, the scalar product is calculated of the Rth '1×N' row vector of the 'M×N' weight matrix and the 'N×1' vector matrix as an 'R×1' element of the 'M×1' MAC result matrix. For R=1, the scalar product of the first row of the weight matrix and the first column of the vector matrix shown in FIG. 5 is W0.0*X0.0+W0.1*X1.0+W0.2*X2.0+ W0.3*X3.0+W0.4*X4.0+W0.5*X5.0+W0.6*X6.0+ W0.7*X7.0. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2, as illustrated in FIG. 11, may include four adders 122-21A disposed at a first stage, two adders 122-21B disposed at a second stage, and an adder 122-21C disposed at a third stage.

Each of the adders 122-21A disposed at the first stage may receive output data of two of the multipliers 122-11 and may perform an adding calculation of the output data of the two multipliers 122-11 to output the result of the adding calculation. Each of the adders 122-21B disposed at the second stage may receive output data of two of the adders 122-21A disposed at the first stage and may perform an adding calculation of the output data of the two adders 122-21A to output the result of the adding calculation. The adder 122-21C disposed at the third stage may receive output data of two of the adders 122-21B disposed at the second stage and may perform an adding calculation of the output data of the two adders 122-21B to output the result of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to an element MAC0.0 located at a first row of an '8×1' MAC result matrix having eight elements of MAC0.0, . . . , and MAC7.0, as illustrated in FIG. 5. The output data MAC0.0 of the addition logic circuit 122-2 may be inputted to the output latch 123-1 disposed in the data output circuit 123 of the MAC operator 120, as described with reference to FIG. 4.

Figure 12:
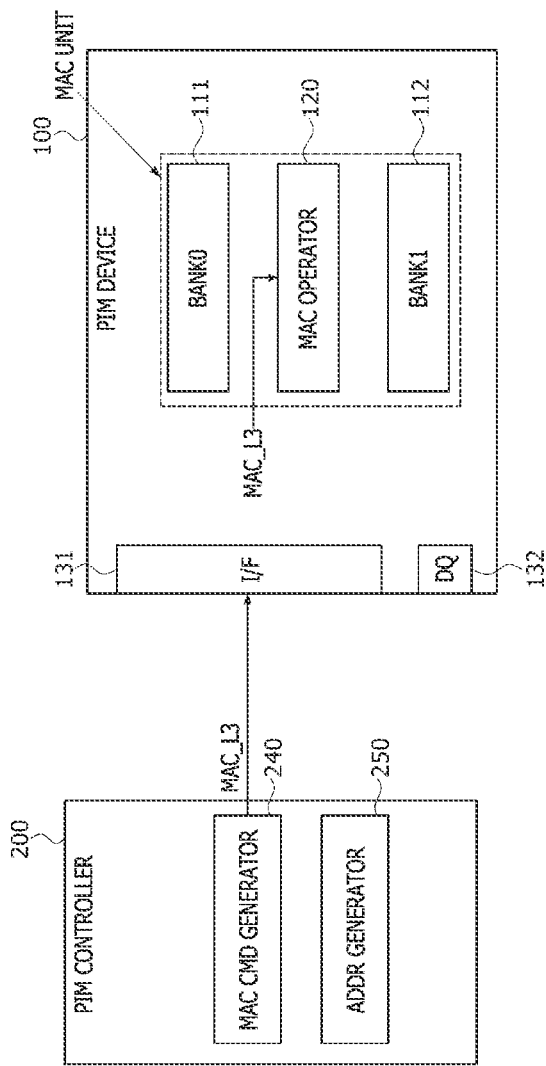

At a step 309, the MAC command generator 240 of the PIM controller 200 may generate and transmit the MAC output latch signal MAC_L3 to the PIM device 100, as illustrated in FIG. 12. The MAC output latch signal MAC_L3 may control the output latch operation of the MAC result data MAC0.0 performed by the MAC operator 120 of the PIM device 100. The MAC result data MAC0.0 inputted from the MAC circuit 122 of the MAC operator 120 may be outputted from the output latch 123-1 in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 13:
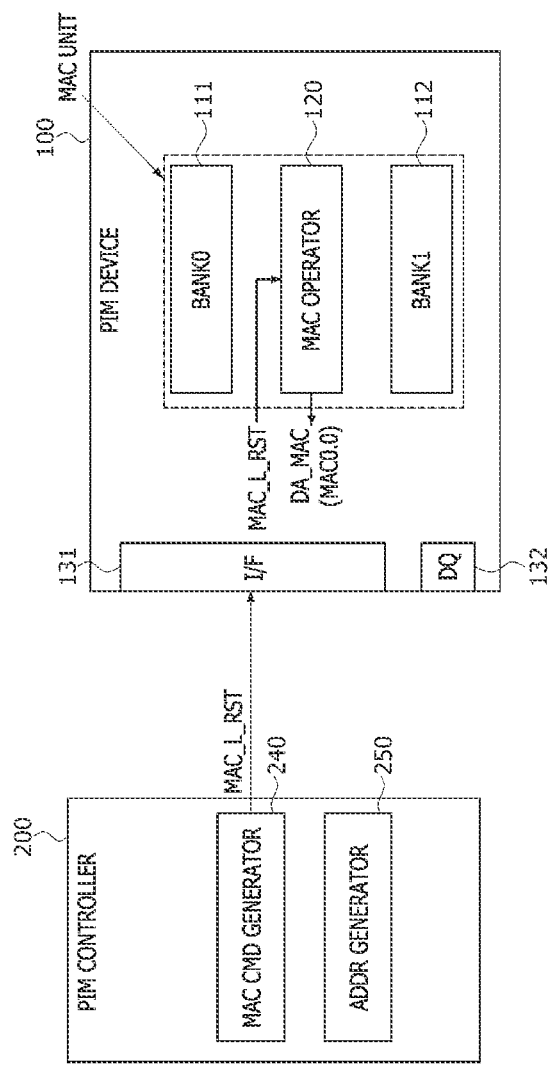

At a step 310, the MAC command generator 240 of the PIM controller 200 may generate and transmit the MAC latch reset signal MAC_L_RST to the PIM device 100, as illustrated in FIG. 13. The MAC latch reset signal MAC_L_RST may control an output operation of the MAC result data MAC0.0 generated by the MAC operator 120 and a reset operation of the output latch included in the MAC operator 120. As described with reference to FIG. 4, the transfer gate 123-2 receiving the MAC result data MAC0.0 from the output latch 123-1 of the MAC operator 120 may be synchronized with the MAC latch reset signal MAC_L_RST to output the MAC result data MAC0.0. In an embodiment, the MAC result data MAC0.0 outputted from the MAC operator 120 may be stored into the first memory bank 111 or the second memory bank 112 through the first BIO line or the second BIO line in the PIM device 100.

At a step 311, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 311. At a step 312, whether the row number changed at the step 311 is greater than the row number of the last row (i.e., the eighth row of the current example) of the weight matrix may be determined. Because the row number of the weight matrix is changed to '2' at the step 311, a process of the MAC arithmetic operation may be fed back to the step 304.

If the process of the MAC arithmetic operation is fed back to the step 304 from the step 312, then the same processes as described with reference to the steps 304 to 310 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 304 at the step 312, then the processes from the step 304 to the step 311 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 311, the MAC arithmetic operation may terminate because the row number of '9' is greater than the last row number of '8' at the step 312.

Figure 14:
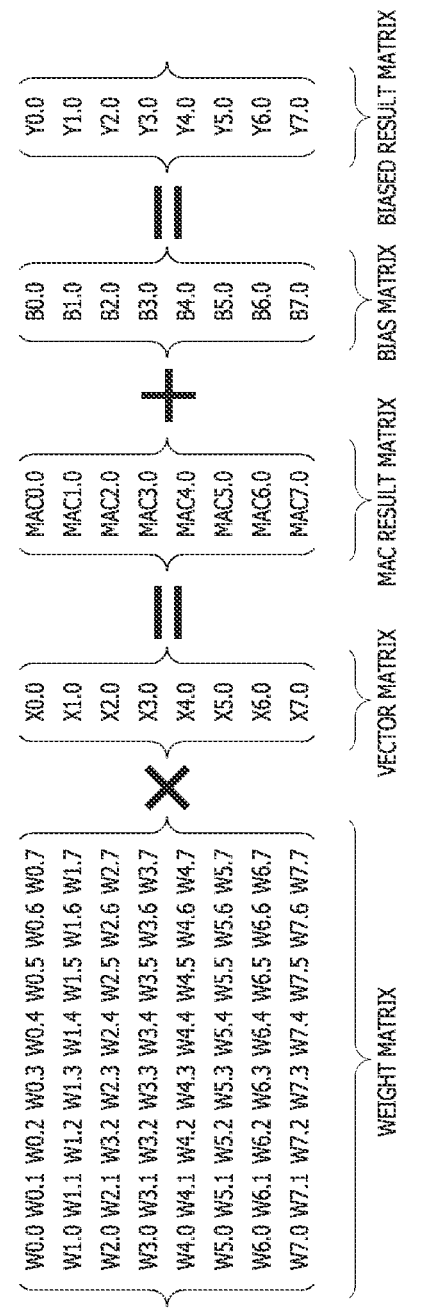
FIG. 14 illustrates another example of a MAC arithmetic operation performed in a PIM system according to a first embodiment of the present disclosure.

FIG. 14 illustrates another example of a MAC arithmetic operation performed in the PIM system 1-1 according to the first embodiment of the present disclosure. As illustrated in FIG. 14, the MAC arithmetic operation performed by the PIM system 1-1 may further include an adding calculation of the MAC result matrix and a bias matrix. Specifically, as described with reference to FIG. 5, the PIM device 100 may execute the matrix multiplying calculation of the '8×8' weight matrix and the '8×1' vector matrix according to control of the PIM controller 200. As a result of the matrix multiplying calculation of the '8×8' weight matrix and the '8×1' vector matrix, the '8×1' MAC result matrix having the eight elements MAC0.0, . . . , and MAC7.0 may be generated. The '8×1' MAC result matrix may be added to a '8×1' bias matrix. The '8×1' bias matrix may have elements B0.0, . . . , and B7.0 corresponding to bias data. The bias data may be set to reduce an error of the MAC result matrix. As a result of the adding calculation of the MAC result matrix and the bias matrix, a '8×1' biased result matrix having eight elements Y0.0, . . . , and Y7.0 may be generated.

Figure 15:
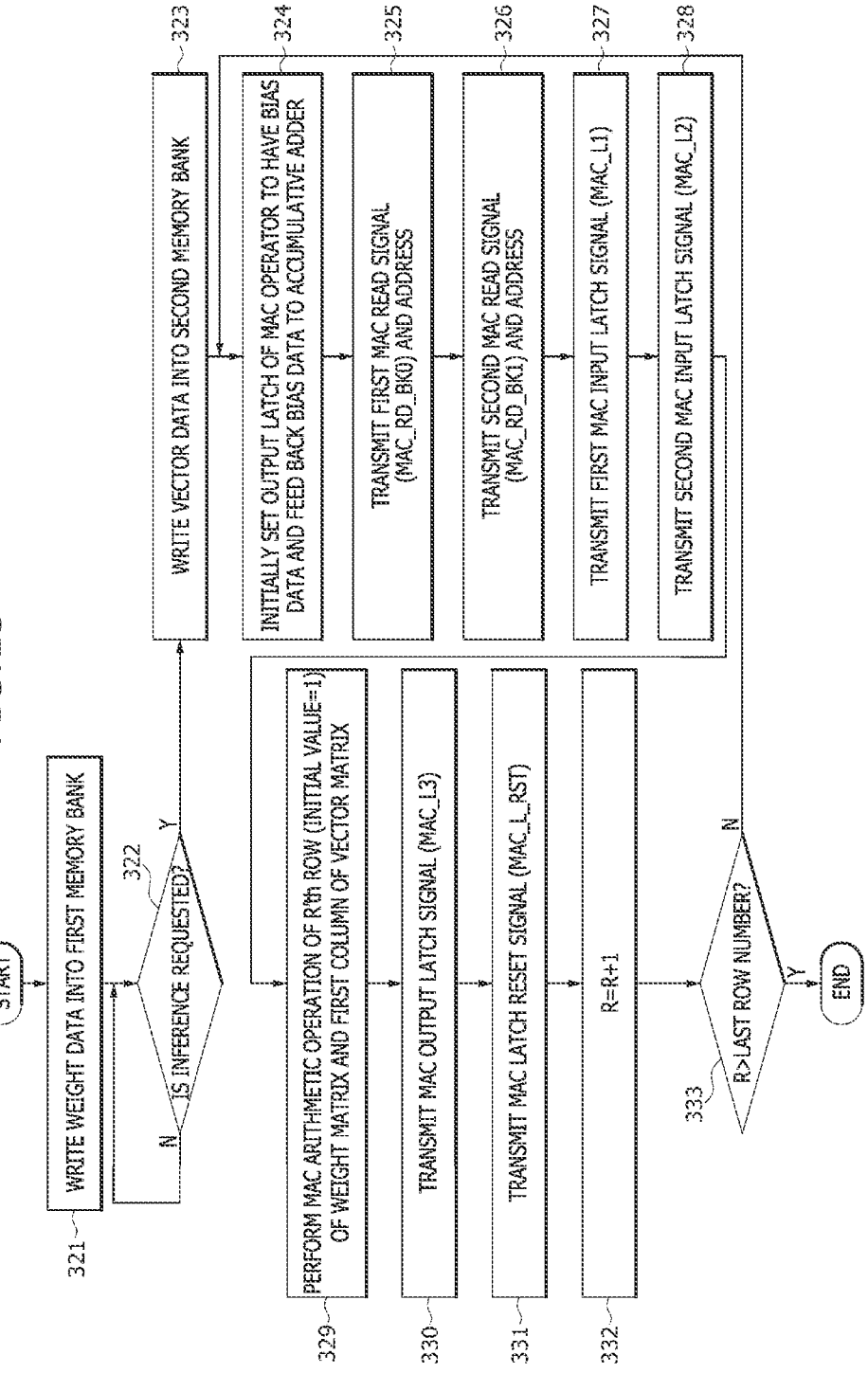
FIG. 15 is a flowchart illustrating processes of the MAC arithmetic operation illustrated in FIG. 14 in a PIM system according to a first embodiment of the present disclosure.
Figure 16:
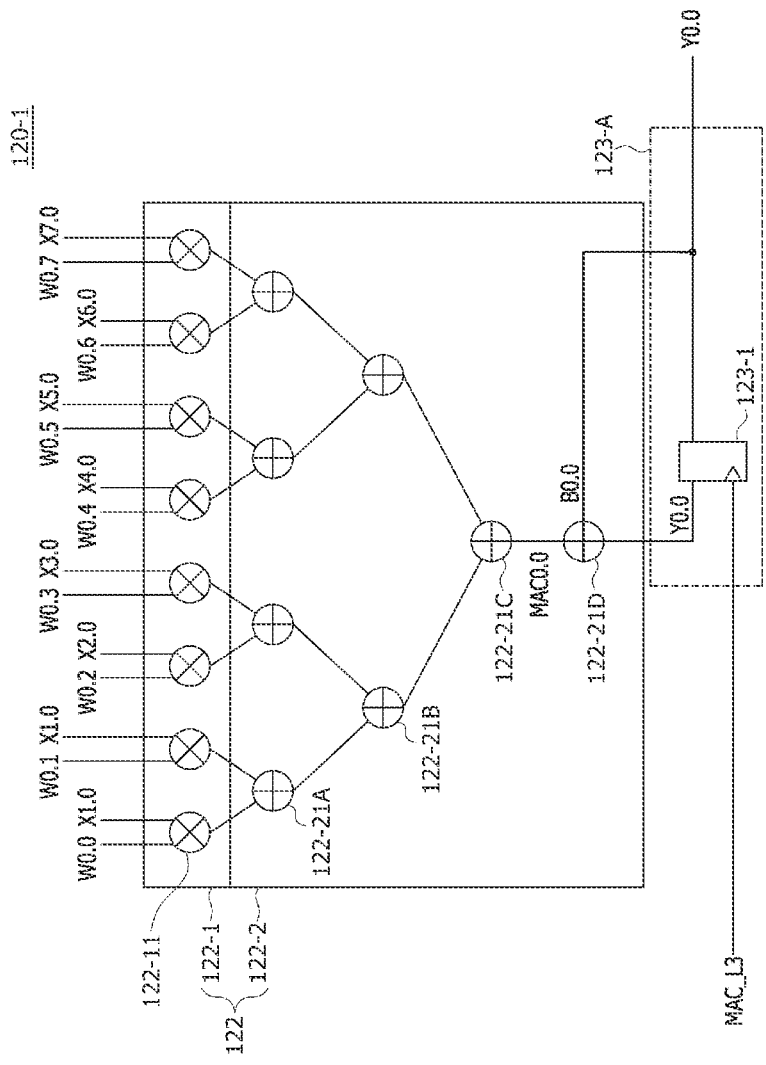
FIG. 16 illustrates an example of a configuration of a MAC operator for performing the MAC arithmetic operation of FIG. 14 in a PIM system according to a first embodiment of the present disclosure.

FIG. 15 is a flowchart illustrating processes of the MAC arithmetic operation described with reference to FIG. 14 in the PIM system 1-1 according to the first embodiment of the present disclosure. Moreover, FIG. 16 illustrates an example of a configuration of a MAC operator 120-1 for performing the MAC arithmetic operation of FIG. 14 in the PIM system 1-1 according to the first embodiment of the present disclosure. In FIG. 16, the same reference numerals or the same reference symbols as used in FIG. 4 denote the same elements, and the detailed descriptions of the same elements as indicated in the previous embodiment will be omitted hereinafter. Referring to FIG. 15, the first data (i.e., the weight data) may be written into the first memory bank 111 at a step 321 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 14.

At a step 322, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 200 at the step 322, the PIM controller 200 may write the vector data transmitted with the inference request signal into the second memory bank 112 at a step 323. Accordingly, the vector data may be stored in the second memory bank 112 of the PIM device 100.

At a step 324, the output latch of the MAC operator may be initially set to have the bias data and the initially set bias data may be fed back to an accumulative adder of the MAC operator. This process is executed to perform the matrix adding calculation of the MAC result matrix and the bias matrix, which is described with reference to FIG. 14. In other words, the output latch 123-1 in the data output circuit 123-A of the MAC operator (120-1) is set to have the bias data. Because the matrix multiplying calculation is executed for the first row of the weight matrix, the output latch 123-1 may be initially set to have the element B0.0 located at a cross point of the first row and the first column of the bias matrix as the bias data. The output latch 123-1 may output the bias data B0.0, and the bias data B0.0 outputted from the output latch 123-1 may be inputted to the accumulative adder 122-21D of the addition logic circuit 122-2, as illustrated in FIG. 16.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-1 of the PIM device 100. When a subsequent MAC arithmetic operation is performed, the accumulative adder 122-21D of the MAC operator 120-1 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

In a step 325, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 325 may be executed in the same way as described with reference to FIG. 7. In a step 326, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 326 may be executed in the same way as described with reference to FIG. 8.

At a step 327, the MAC command generator 240 of the PIM controller 200 may generate and transmit the first MAC input latch signal MAC_L1 to the PIM device 100. The step 327 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 328, the MAC command generator 240 of the PIM controller 200 may generate and transmit the second MAC input latch signal MAC_L2 to the PIM device 100. The step 328 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 329, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 16. The accumulative adder 122-21D may add output data of the adder 122-21C to feedback data fed back from the output latch 123-1 to output the result of the adding calculation. The output data of the adder 122-21C may be the matrix multiplying result MAC0.0, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123 disposed in a data output circuit 123-A of the MAC operator 120-1.

At a step 330, the MAC command generator 240 of the PIM controller 200 may generate and transmit the MAC output latch signal MAC_L3 to the PIM device 100. The step 330 may be executed in the same way as described with reference to FIG. 12. The MAC output latch signal MAC_L3 may control the output latch operation of the MAC result data MAC0.0, which is performed by the MAC operator 120-1 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123 may be inputted to the transfer gate 123-2.

At a step 331, the MAC command generator 240 of the PIM controller 200 may generate and transmit the MAC latch reset signal MAC_L_RST to the PIM device 100. The step 331 may be executed in the same way as described with reference to FIG. 13. The MAC latch reset signal MAC_L_RST may control an output operation of the biased result data Y0.0 generated by the MAC operator 120 and a reset operation of the output latch 123-1 included in the MAC operator 120. The transfer gate 123-2 receiving the biased result data Y0.0 from the output latch 123-1 of the data output circuit 123-A included in the MAC operator 120 may be synchronized with the MAC latch reset signal MAC_L_RST to output the biased result data Y0.0. In an embodiment, the biased result data Y0.0 outputted from the MAC operator 120 may be stored into the first memory bank 111 or the second memory bank 112 through the first BIO line or the second BIO line in the PIM device 100.

At a step 332, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 332. At a step 333, whether the row number changed at the step 332 is greater than the row number of the last row (i.e., the eighth row of the current example) of the weight matrix may be determined. Because the row number of the weight matrix is changed to '2' at the step 332, a process of the MAC arithmetic operation may be fed back to the step 324.

If the process of the MAC arithmetic operation is fed back to the step 324 from the step 333, then the same processes as described with reference to the steps 324 to 331 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix and the bias data B0.0 in the output latch 123-1 initially set at the step 324 may be changed into the bias data B1.0. If the process of the MAC arithmetic operation is fed back to the step 324 at the step 333, the processes from the step 324 to the step 332 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 332, the MAC arithmetic operation may terminate because the row number of '9' is greater than the last row number of '8' at the step 333.

Figure 17:
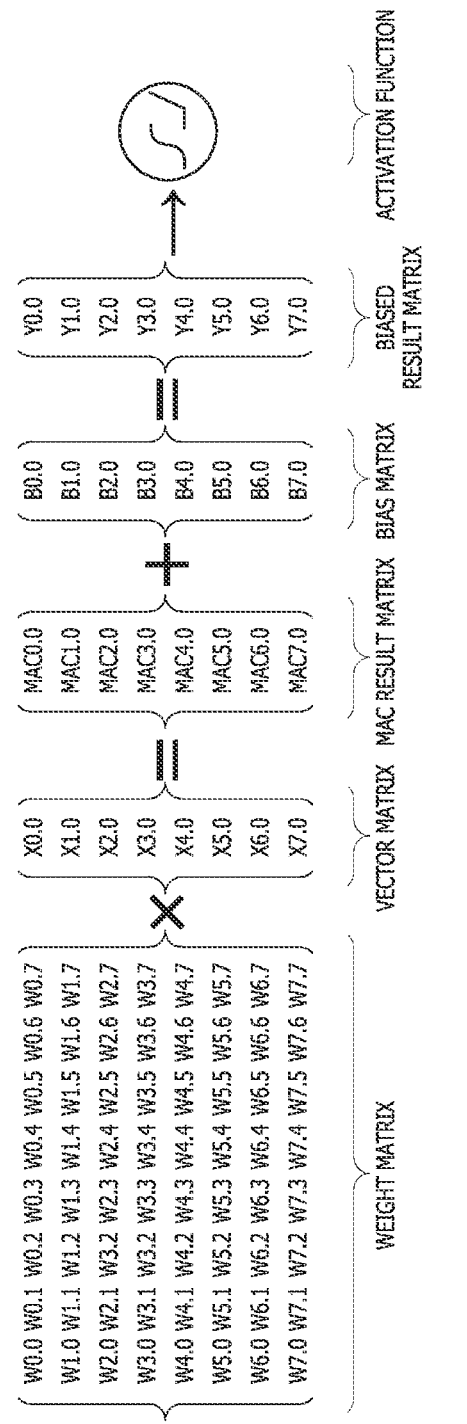
FIG. 17 illustrates yet another example of a MAC arithmetic operation performed in a PIM system according to a first embodiment of the present disclosure.

FIG. 17 illustrates yet another example of a MAC arithmetic operation performed in the PIM system 1-1 according to the first embodiment of the present disclosure. As illustrated in FIG. 17, the MAC arithmetic operation performed by the PIM system 1-1 may further include a process for applying the biased result matrix to an activation function. Specifically, as described with reference to FIG. 14, the PIM device 100 may execute the matrix multiplying calculation of the '8×8' weight matrix and the '8×1' vector matrix according to control of the PIM controller 200 to generate the MAC result matrix. In addition, the MAC result matrix may be added to the bias matrix to generate biased result matrix.

The biased result matrix may be applied to the activation function. The activation function means a function which is used to calculate a unique output value by comparing a MAC calculation value with a critical value in an MLP-type neural network. In an embodiment, the activation function may be a unipolar activation function which generates only positive output values or a bipolar activation function which generates negative output values as well as positive output values. In different embodiments, the activation function may include a sigmoid function, a hyperbolic tangent (Tanh) function, a rectified linear unit (ReLU) function, a leaky ReLU function, an identity function, and a maxout function.

Figure 18:
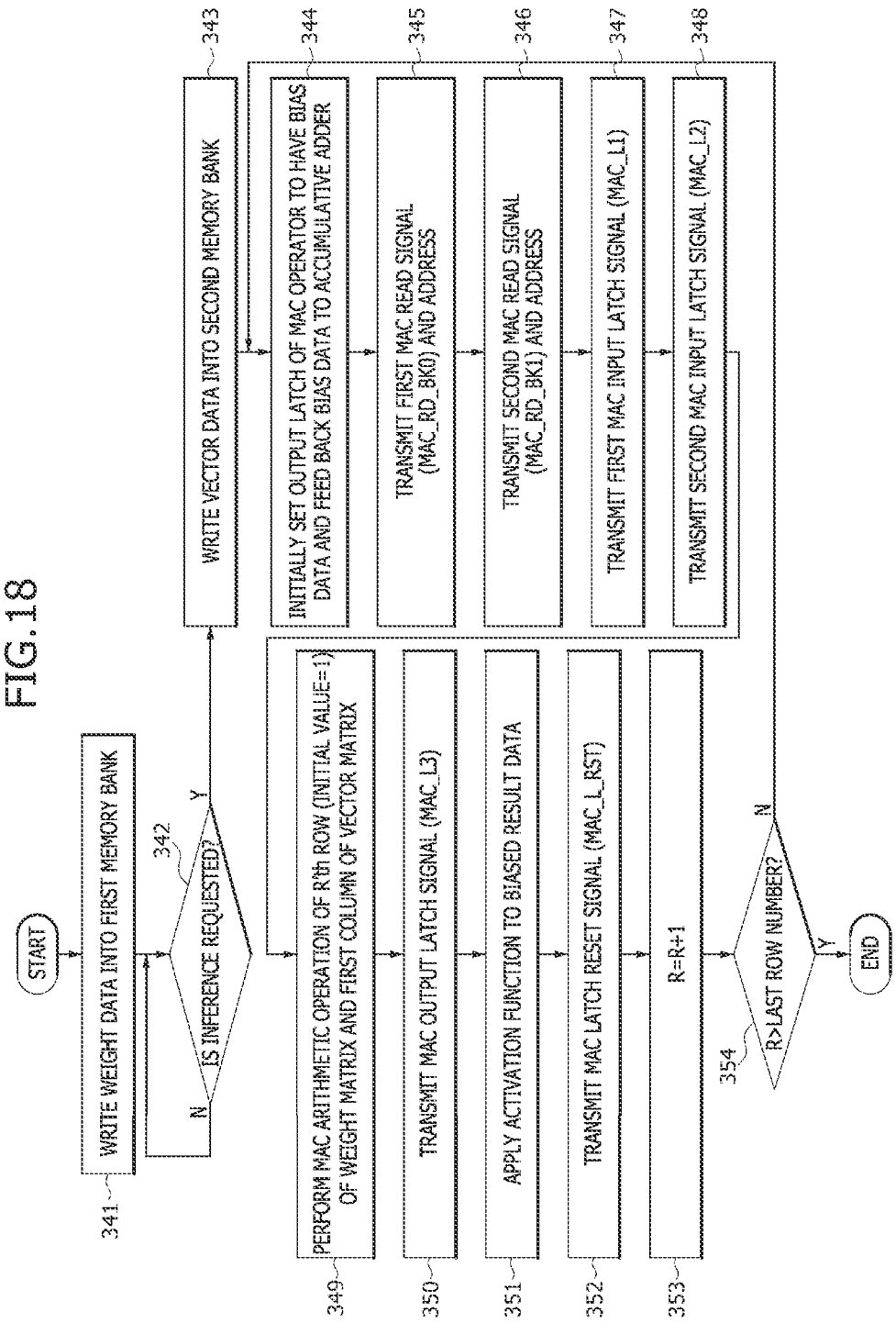
FIG. 18 is a flowchart illustrating processes of the MAC arithmetic operation illustrated in FIG. 17 in a PIM system according to a first embodiment of the present disclosure.
Figure 19:
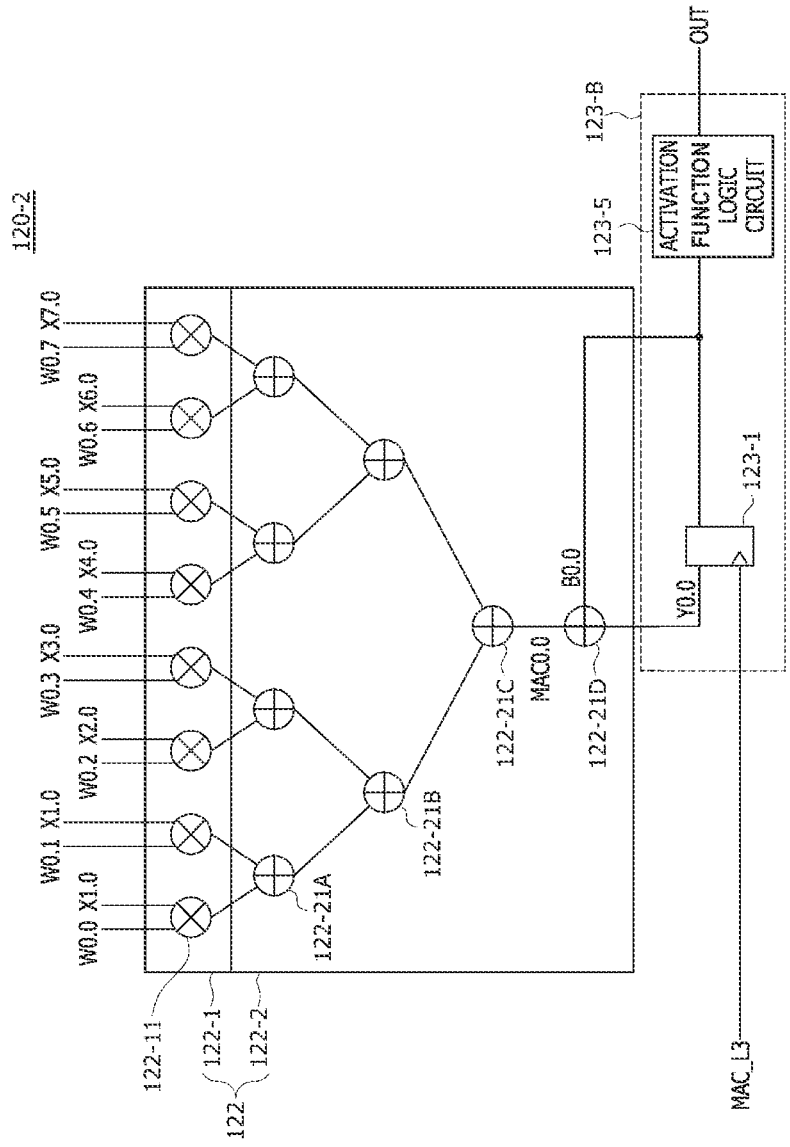
FIG. 19 illustrates an example of a configuration of a MAC operator for performing the MAC arithmetic operation of FIG. 17 in a PIM system according to a first embodiment of the present disclosure.

FIG. 18 is a flowchart illustrating processes of the MAC arithmetic operation described with reference to FIG. 17 in the PIM system 1-1 according to the first embodiment of the present disclosure. Moreover, FIG. 19 illustrates an example of a configuration of a MAC operator 120-2 for performing the MAC arithmetic operation of FIG. 17 in the PIM system 1-1 according to the first embodiment of the present disclosure. In FIG. 19, the same reference numerals or the same reference symbols as used in FIG. 4 denote the same elements, and the detailed descriptions of the same elements as mentioned in the previous embodiment will be omitted hereinafter. Referring to FIG. 18, the first data (i.e., the weight data) may be written into the first memory bank 111 at a step 341 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 17.

At a step 342, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., the data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 200 at the step 342, then the PIM controller 200 may write the vector data transmitted with the inference request signal into the second memory bank 112 at a step 343. Accordingly, the vector data may be stored in the second memory bank 112 of the PIM device 100.

At a step 344, an output latch of a MAC operator may be initially set to have bias data and the initially set bias data may be fed back to an accumulative adder of the MAC operator. This process is executed to perform the matrix adding calculation of the MAC result matrix and the bias matrix, which is described with reference to FIG. 17. That is, as illustrated in FIG. 19, the output latch 123-1 of the MAC operator (120-2 of FIG. 19) may be initially set to have the bias data of the bias matrix. Because the matrix multiplying calculation is executed for the first row of the weight matrix, the element B0.0 located at first row and the first column of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the MAC operator 120-2.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-2 of the PIM device 100. When a subsequent MAC arithmetic operation is performed, the accumulative adder 122-21D of the MAC operator 120-2 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. As illustrated in FIG. 19, the biased result data Y0.0 may be transmitted from the output latch 123-1 to an activation function logic circuit 123-5 disposed in a data output circuit 123-B of the MAC operator 120-2 in synchronization with the MAC output latch signal MAC_L3 transmitted in a subsequent process.

In a step 345, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 345 may be executed in the same way as described with reference to FIG. 7. In a step 346, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 346 may be executed in the same way as described with reference to FIG. 8.

At a step 347, the MAC command generator 240 of the PIM controller 200 may generate and transmit the first MAC input latch signal MAC_L1 to the PIM device 100. The step 347 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 348, the MAC command generator 240 of the PIM controller 200 may generate and transmit the second MAC input latch signal MAC_L2 to the PIM device 100. The step 348 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 349, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 19. The accumulative adder 122-21D may add output data of the adder 122-21C to feedback data fed back from the output latch 123-1 to output the result of the adding calculation. The output data of the adder 122-21C may be the element MAC0.0 of the '8×1' MAC result matrix, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123-1 disposed in the data output circuit 123-A of the MAC operator 120.

At a step 350, the MAC command generator 240 of the PIM controller 200 may generate and transmit the MAC output latch signal MAC_L3 to the PIM device 100. The step 350 may be executed in the same way as described with reference to FIG. 12. The MAC output latch signal MAC_L3 may control the output latch operation of the output latch 123-1 included in the MAC operator 120 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123-1 may be inputted to the activation function logic circuit 123-5. At a step 351, the activation function logic circuit 123-5 may apply an activation function to the biased result data Y0.0 to generate a final output value, and the final output value may be inputted to the transfer gate (123-2 of FIG. 4). This, for example, is the final output value for the current of R which is incremented in step 354.

At a step 352, the MAC command generator 240 of the PIM controller 200 may generate and transmit the MAC latch reset signal MAC_L_RST to the PIM device 100. The step 352 may be executed in the same way as described with reference to FIG. 13. The MAC latch reset signal MAC_L_RST may control an output operation of the final output value generated by the MAC operator 120 and a reset operation of the output latch 123-1 included in the MAC operator 120. The transfer gate 123-2 receiving the final output value from the activation function logic circuit 123-5 of the data output circuit 123-B included in the MAC operator 120 may be synchronized with the MAC latch reset signal MAC_L_RST to output the final output value. In an embodiment, the final output value outputted from the MAC operator 120 may be stored into the first memory bank 111 or the second memory bank 112 through the first BIO line or the second BIO line in the PIM device 100.

At a step 353, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 353. At a step 354, whether the row number changed at the step 353 is greater than the row number of the last row (i.e., the eighth row) of the weight matrix may be determined. Because the row number of the weight matrix is changed to '2' at the step 353, a process of the MAC arithmetic operation may be fed back to the step 344.

If the process of the MAC arithmetic operation is fed back to the step 344 from the step 354, the same processes as described with reference to the steps 344 to 354 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix, and the bias data B0.0 in the output latch 123-1 initially set at the step 344 may be changed to the bias data B1.0. If the process of the MAC arithmetic operation is fed back to the step 344 from the step 354, the processes from the step 344 to the step 354 may be iteratively performed until the MAC arithmetic operation is performed for all of the rows of the weight matrix with the vector matrix. For an embodiment, a plurality of final output values, namely, one final output value for each incremented value of R, represents an 'N×1' final result matrix. If the MAC arithmetic operation for the eighth row of the weight matrix terminates and the row number of the weight matrix changes from '8' to '9' at the step 354, the MAC arithmetic operation may terminate because the row number of '9' is greater than the last row number of '8' at the step 354.

Figure 20:
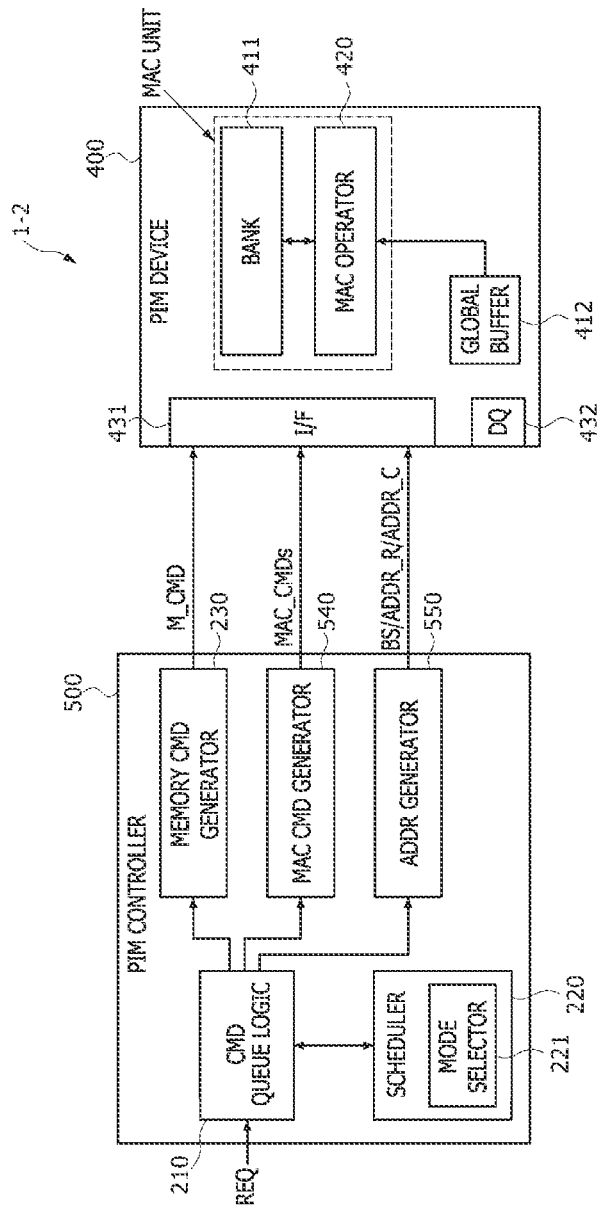
FIG. 20 is a block diagram illustrating a PIM system according to a second embodiment of the present disclosure.

FIG. 20 is a block diagram illustrating a PIM system 1-2 according to a second embodiment of the present disclosure. In FIG. 20, the same reference numerals or the same reference symbols as used in FIG. 2 denote the same elements. As illustrated in FIG. 20, the PIM system 1-2 may be configured to include a PIM device 400 and a PIM controller 500. The PIM device 400 may be configured to include a memory bank (BANK) 411 corresponding to a storage region, a global buffer 412, a MAC operator 420, an interface (I/F) 431, and a data input/output (I/O) pad 432. For an embodiment, the MAC operator 420 represents a MAC operator circuit. The memory bank (BANK) 411 and the MAC operator 420 included in the PIM device 400 may constitute one MAC unit. In another embodiment, the PIM device 400 may include a plurality of MAC units. The memory bank (BANK) 411 may represent a memory region for storing data, for example, a DRAM device. The global buffer 412 may also represent a memory region for storing data, for example, a DRAM device or an SRAM device. The memory bank (BANK) 411 may be a component unit which is independently activated and may be configured to have the same data bus width as data I/O lines in the PIM device 400. In an embodiment, the memory bank 411 may operate through interleaving such that an active operation of the memory bank 411 is performed in parallel while another memory bank is selected. The memory bank 411 may include at least one cell array which includes memory unit cells located at cross points of a plurality of rows and a plurality of columns.

Although not shown in the drawings, a core circuit may be disposed adjacent to the memory bank 411. The core circuit may include X-decoders XDECs and Y-decoders/IO circuits YDEC/IOs. An X-decoder XDEC may also be referred to as a word line decoder or a row decoder. The X-decoder XDEC may receive a row address ADDR_R from the PIM controller 500 and may decode the row address ADDR_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADD_C from the PIM controller 500 and may decode the column address ADD_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the memory bank 411. In addition, the I/O circuit may include a write driver for driving a write datum during a write operation for the memory bank 411.

The MAC operator 420 of the PIM device 400 may have mostly the same configuration as the MAC operator 120 described with reference to FIG. 4. That is, the MAC operator 420 may be configured to include the data input circuit 121, the MAC circuit 122, and the data output circuit 123, as described with reference to FIG. 4. The data input circuit 121 may be configured to include the first input latch 121-1 and the second input latch 121-2. The MAC circuit 122 may be configured to include the multiplication logic circuit 122-1 and the addition logic circuit 122-2. The data output circuit 123 may be configured to include the output latch 123-1, the transfer gate 123-2, the delay circuit 123-3, and the inverter 123-4. In an embodiment, the first input latch 121-1, the second input latch 121-2, and the output latch 123-1 may be realized using flip-flops.

The MAC operator 420 may be different from the MAC operator 120 in that a MAC input latch signal MAC_L1 is simultaneously inputted to both of clock terminals of the first and second input latches 121-1 and 121-2. As indicated in the following descriptions, the weight data and the vector data may be simultaneously transmitted to the MAC operator 420 of the PIM device 400 included in the PIM system 1-2 according to the present embodiment. That is, the first data DA1 (i.e., the weight data) and the second data DA2 (i.e., the vector data) may be simultaneously inputted to both of the first input latch 121-1 and the second input latch 121-2 constituting the data input circuit 121, respectively. Accordingly, it may be unnecessary to apply an extra control signal to the clock terminals of the first and second input latches 121-1 and 121-2, and thus the MAC input latch signal MAC_L1 may be simultaneously inputted to both of the clock terminals of the first and second input latches 121-1 and 121-2 included in the MAC operator 420.

In another embodiment, the MAC operator 420 may be realized to have the same configuration as the MAC operator 120-1 described with reference to FIG. 16 to perform the operation illustrated in FIG. 14. Even in such a case, the MAC operator 420 may have the same configuration as described with reference to FIG. 16 except that the MAC input latch signal MAC_L1 is simultaneously inputted to both of the clock terminals of the first and second input latches 121-1 and 121-2 constituting the data input circuit 121. In yet another embodiment, the MAC operator 420 may be realized to have the same configuration as the MAC operator 120-2 described with reference to FIG. 19 to perform the operation illustrated in FIG. 17. Even in such a case, the MAC operator 420 may have the same configuration as described with reference to FIG. 19 except that the MAC input latch signal MAC_L1 is simultaneously inputted to both of the clock terminals of the first and second input latches 121-1 and 121-2 constituting the data input circuit 121.

The interface 431 of the PIM device 400 may receive the memory command M_CMD, the MAC commands MAC_CMDs, the bank selection signal BS, and the row/column addresses ADDR_R/ADDR_C from the PIM controller 500. The interface 431 may output the memory command M_CMD, together with the bank selection signal BS and the row/column addresses ADDR_R/ADDR_C, to the memory bank 411. The interface 431 may output the MAC commands MAC_CMDs to the memory bank 411 and the MAC operator 420. In such a case, the interface 431 may output the bank selection signal BS and the row/column addresses ADDR_R/ADDR_C to the memory bank 411. The data I/O pad 432 of the PIM device 400 may function as a data communication terminal between a device external to the PIM device 400, the global buffer 412, and the MAC unit (which includes the memory bank 411 and the MAC operator 420) included in the PIM device 400. The external device to the PIM device 400 may correspond to the PIM controller 500 of the PIM system 1-2 or a host located outside the PIM system 1-2. Accordingly, data outputted from the host or the PIM controller 500 may be inputted into the PIM device 400 through the data I/O pad 432. In addition, data generated by the PIM device 400 may be transmitted to the external device to the PIM device 400 through the data I/O pad 432.

The PIM controller 500 may control operations of the PIM device 400. In an embodiment, the PIM controller 500 may control the PIM device 400 such that the PIM device 400 operates in the memory mode or the MAC mode. In the event that the PIM controller 500 controls the PIM device 500 such that the PIM device 400 operates in the memory mode, the PIM device 400 may perform a data read operation or a data write operation for the memory bank 411. In the event that the PIM controller 500 controls the PIM device 400 such that the PIM device 400 operates in the MAC mode, the PIM device 400 may perform the MAC arithmetic operation for the MAC operator 420. In the event that the PIM controller 500 controls the PIM device 400 such that the PIM device 400 operates in the MAC mode, the PIM device 400 may also perform the data read operation and the data write operation for the memory bank 411 and the global buffer 412 to execute the MAC arithmetic operation.

The PIM controller 500 may be configured to include the command queue logic 210, the scheduler 220, the memory command generator 230, a MAC command generator 540, and an address generator 550. The scheduler 220 may include the mode selector 221. The command queue logic 210 may receive the request REQ from an external device (e.g., a host of the PIM system 1-2) and store a command queue corresponding the request REQ in the command queue logic 210. The command queue stored in the command queue logic 210 may be transmitted to the memory command generator 230 or the MAC command generator 540 according to a sequence determined by the scheduler 220. The scheduler 220 may adjust a timing of the command queue when the command queue stored in the command queue logic 210 is outputted from the command queue logic 210. The scheduler 210 may include the mode selector 221 that generates a mode selection signal including information on whether command queue stored in the command queue logic 210 relates to the memory mode or the MAC mode. The memory command generator 230 may receive the command queue related to the memory mode of the PIM device 400 from the command queue logic 210 to generate and output the memory command M_CMD. The command queue logic 210, the scheduler 220, the mode selector 221, and the memory command generator 230 may have the same function as described with reference to FIG. 2.

The MAC command generator 540 may receive the command queue related to the MAC mode of the PIM device 400 from the command queue logic 210. The MAC command generator 540 may decode the command queue to generate and output the MAC commands MAC_CMDs. The MAC commands MAC_CMDs outputted from the MAC command generator 540 may be transmitted to the PIM device 400. The data read operation for the memory bank 411 of the PIM device 400 may be performed by the MAC commands MAC_CMDs outputted from the MAC command generator 540, and the MAC arithmetic operation of the MAC operator 420 may also be performed by the MAC commands MAC_CMDs outputted from the MAC command generator 540. The MAC commands MAC_CMDs and the MAC arithmetic operation of the PIM device 400 according to the MAC commands MAC_CMDs will be described in detail with reference to FIG. 21.

The address generator 550 may receive address information from the command queue logic 210. The address generator 550 may generate the bank selection signal BS for selecting a memory bank where, for example, the memory bank 411 represents multiple memory banks. The address generator 550 may transmit the bank selection signal BS to the PIM device 400. In addition, the address generator 550 may generate the row address ADDR_R and the column address ADDR_C for accessing a region (e.g., memory cells) in the memory bank 411 and may transmit the row address ADDR_R and the column address ADDR_C to the PIM device 400.

Figure 21:
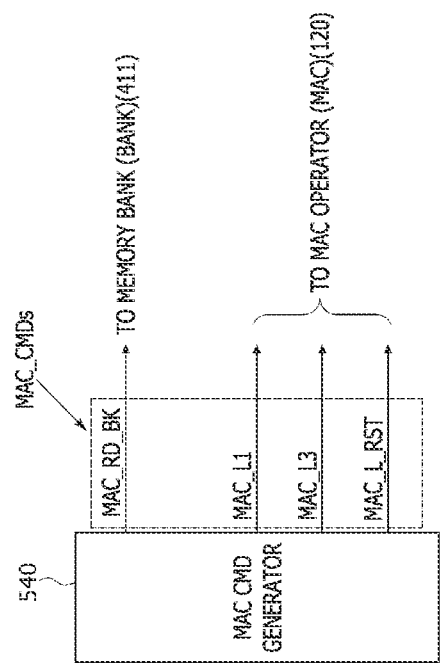
FIG. 21 illustrates MAC commands outputted from a MAC command generator of a PIM controller included in a PIM system according to a second embodiment of the present disclosure.

FIG. 21 illustrates the MAC commands MAC_CMDs outputted from the MAC command generator 540 included in the PIM system 1-2 according to the second embodiment of the present disclosure. As illustrated in FIG. 21, the MAC commands MAC_CMDs may include first to fourth MAC command signals. In an embodiment, the first MAC command signal may be a MAC read signal MAC_RD_BK, the second MAC command signal may be a MAC input latch signal MAC_L1, the third MAC command signal may be a MAC output latch signal MAC_L3, and the fourth MAC command signal may be a MAC latch reset signal MAC_L_RST.

The MAC read signal MAC_RD_BK may control an operation for reading the first data (e.g., the weight data) out of the memory bank 411 to transmit the first data to the MAC operator 420. The MAC input latch signal MAC_L1 may control an input latch operation of the weight data transmitted from the first memory bank 411 to the MAC operator 420. The MAC output latch signal MAC_L3 may control an output latch operation of the MAC result data generated by the MAC operator 420. And, the MAC latch reset signal MAC_L_RST may control an output operation of the MAC result data generated by the MAC operator 420 and a reset operation of an output latch included in the MAC operator 420.

The PIM system 1-2 according to the present embodiment may also be configured to perform the deterministic MAC arithmetic operation. Thus, the MAC commands MAC_CMDs transmitted from the PIM controller 500 to the PIM device 400 may be sequentially generated with fixed time intervals. Accordingly, the PIM controller 500 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 500 with fixed time intervals corresponding to the fixed latencies.

Figure 22:
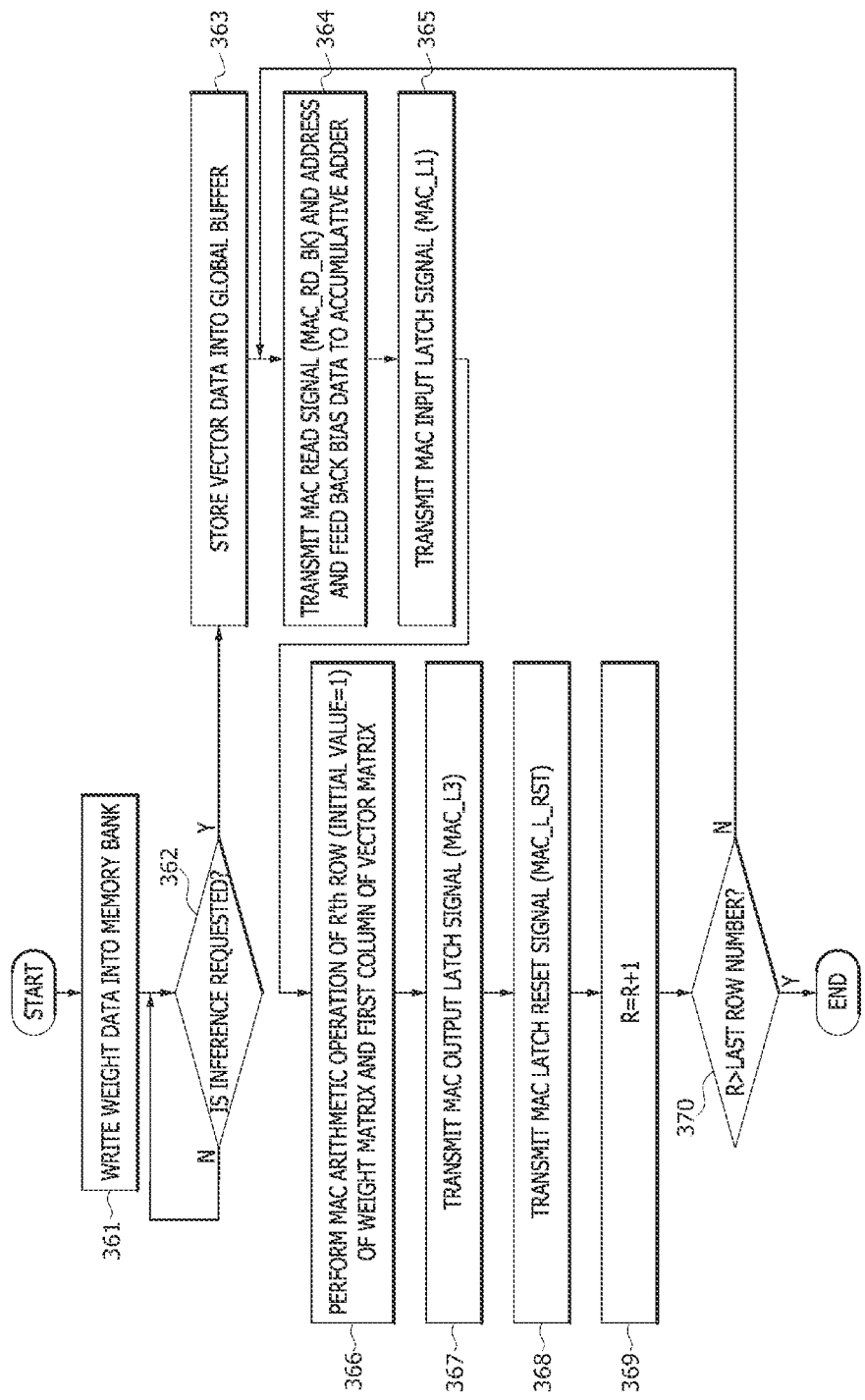
FIG. 22 is a flowchart illustrating processes of the MAC arithmetic operation illustrated in FIG. 5 in a PIM system according to a second embodiment of the present disclosure.

FIG. 22 is a flowchart illustrating processes of the MAC arithmetic operation described with reference to FIG. 5, which are performed in the PIM system 1-2 according to the second embodiment of the present disclosure. In addition, FIGS. 23 to 26 are block diagrams illustrating the processes of the MAC arithmetic operation illustrated in FIG. 5, which are performed in the PIM system 1-2 according to the second embodiment of the present disclosure. Referring to FIGS. 22 to 26, the first data (i.e., the weight data) may be written into the memory bank 411 at a step 361 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 5.

At a step 362, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 500 at the step 362, then the PIM controller 500 may write the vector data transmitted with the inference request signal into the global buffer 412 at a step 363. Accordingly, the vector data may be stored in the global buffer 412 of the PIM device 400.

Figure 23:
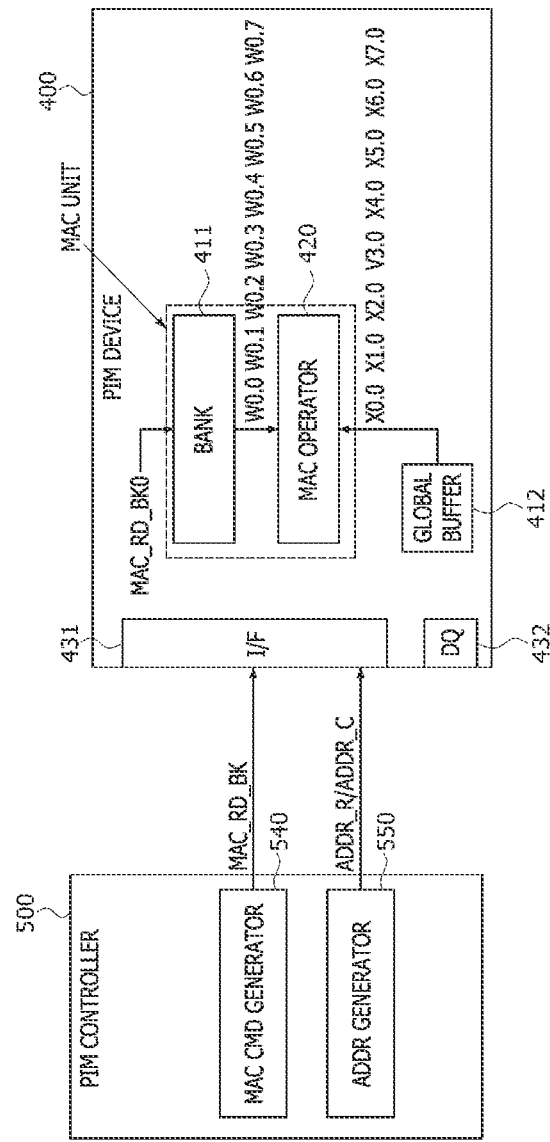
FIGS. 23 to 26 are block diagrams illustrating processes of the MAC arithmetic operation illustrated in FIG. 5 in a PIM system according to a second embodiment of the present disclosure.

At a step 364, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. Although not shown in the drawings, if a plurality of memory banks are disposed in the PIM device 400, the address generator 550 may transmit a bank selection signal for selecting the memory bank 411 among the plurality of memory banks as well as the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

Figure 24:
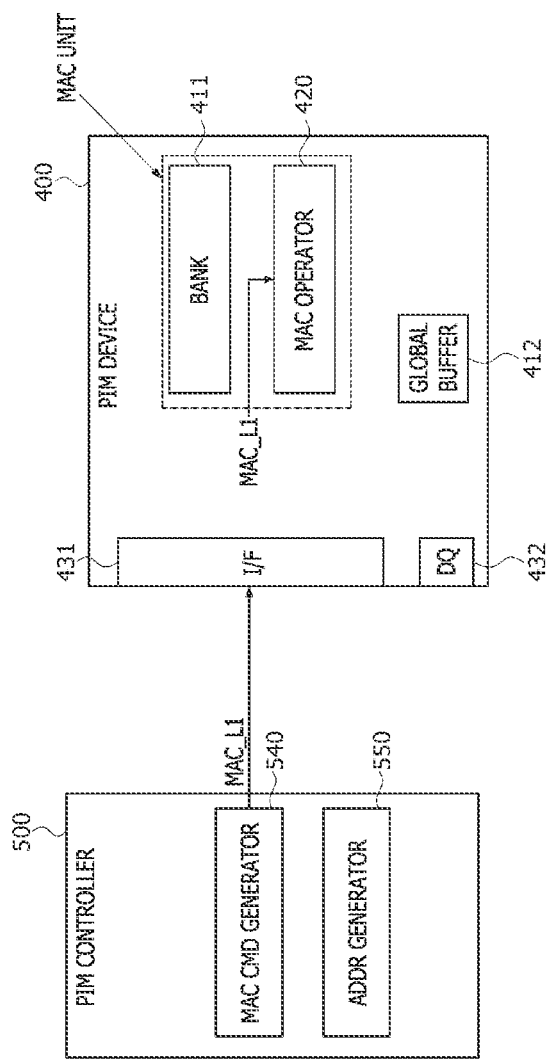

At a step 365, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 366, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, as described with reference to FIG. 4, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data from the multipliers 122-11 and may perform the adding calculation of the output data of the multipliers 122-11 to output the result data of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to the element MAC0.0 located at the first row of the '8× 1' MAC result matrix having the eight elements of MAC0.0, . . . , and MAC7.0 illustrated in FIG. 5. The output data MAC0.0 of the addition logic circuit 122-2 may be inputted to the output latch 123-1 disposed in the data output circuit 123 of the MAC operator 420, as described with reference to FIG. 4.

Figure 25:
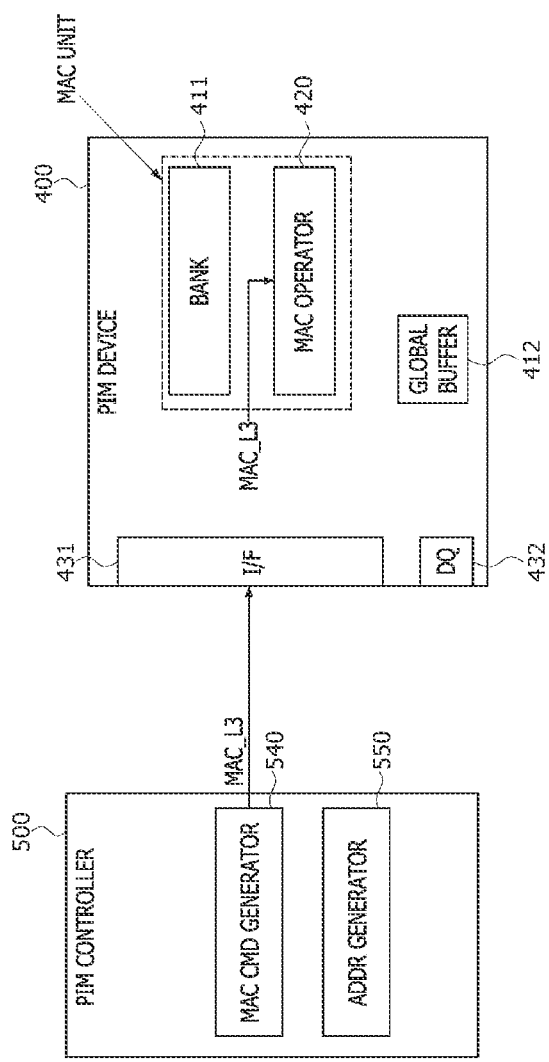

At a step 367, the MAC command generator 540 of the PIM controller 500 may generate and transmit the MAC output latch signal MAC_L3 to the PIM device 400, as illustrated in FIG. 25. The MAC output latch signal MAC_L3 may control the output latch operation of the MAC result data MAC0.0 performed by the MAC operator 420 of the PIM device 400. The MAC result data MAC0.0 transmitted from the MAC circuit 122 of the MAC operator 420 to the output latch 123-1 may be outputted from the output latch 123-1 by the output latch operation performed in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 26:
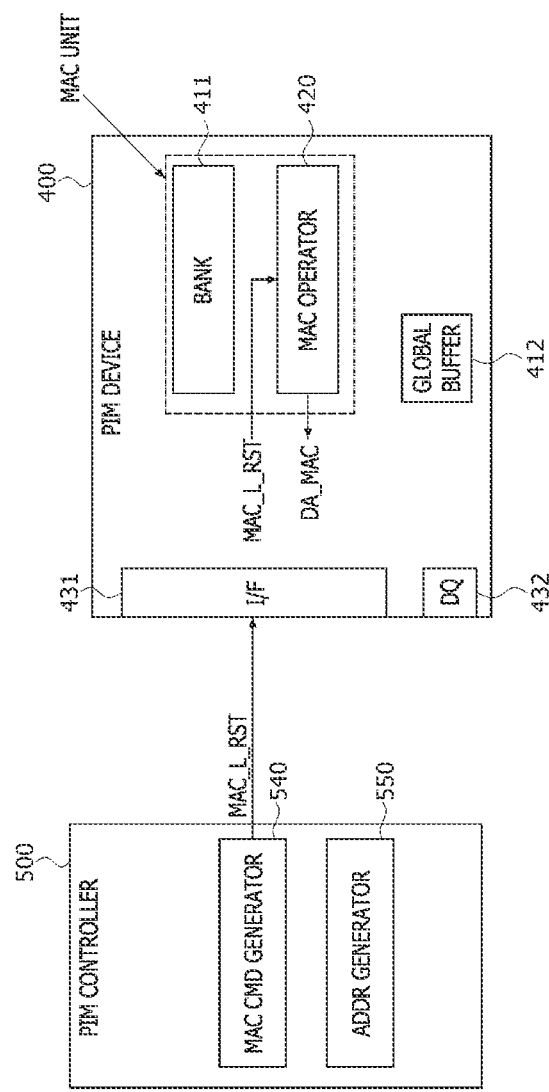

At a step 368, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the MAC result data MAC0.0 generated by the MAC operator 420 and a reset operation of the output latch 123-1 included in the MAC operator 420. As described with reference to FIG. 4, the transfer gate 123-2 receiving the MAC result data MAC0.0 from the output latch 123-1 of the MAC operator 420 may be synchronized with the MAC latch reset signal MAC_L_RST to output the MAC result data MAC0.0. In an embodiment, the MAC result data MAC0.0 outputted from the MAC operator 420 may be stored into the memory bank 411 through the BIO line in the PIM device 400.

At a step 369, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 369. At a step 370, whether the row number changed at the step 369 is greater than the row number of the last row (i.e., the eighth row) of the weight matrix may be determined. Because the row number of the weight matrix is changed to '2' at the step 370, a process of the MAC arithmetic operation may be fed back to the step 364.

If the process of the MAC arithmetic operation is fed back to the step 364 from the step 370, the same processes as described with reference to the steps 364 to 370 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 364 from the step 370, the processes from the step 364 to the step 370 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 369, the MAC arithmetic operation may terminate because the row number of '9' is greater than the last row number of '8' at the step 370.

Figure 27:
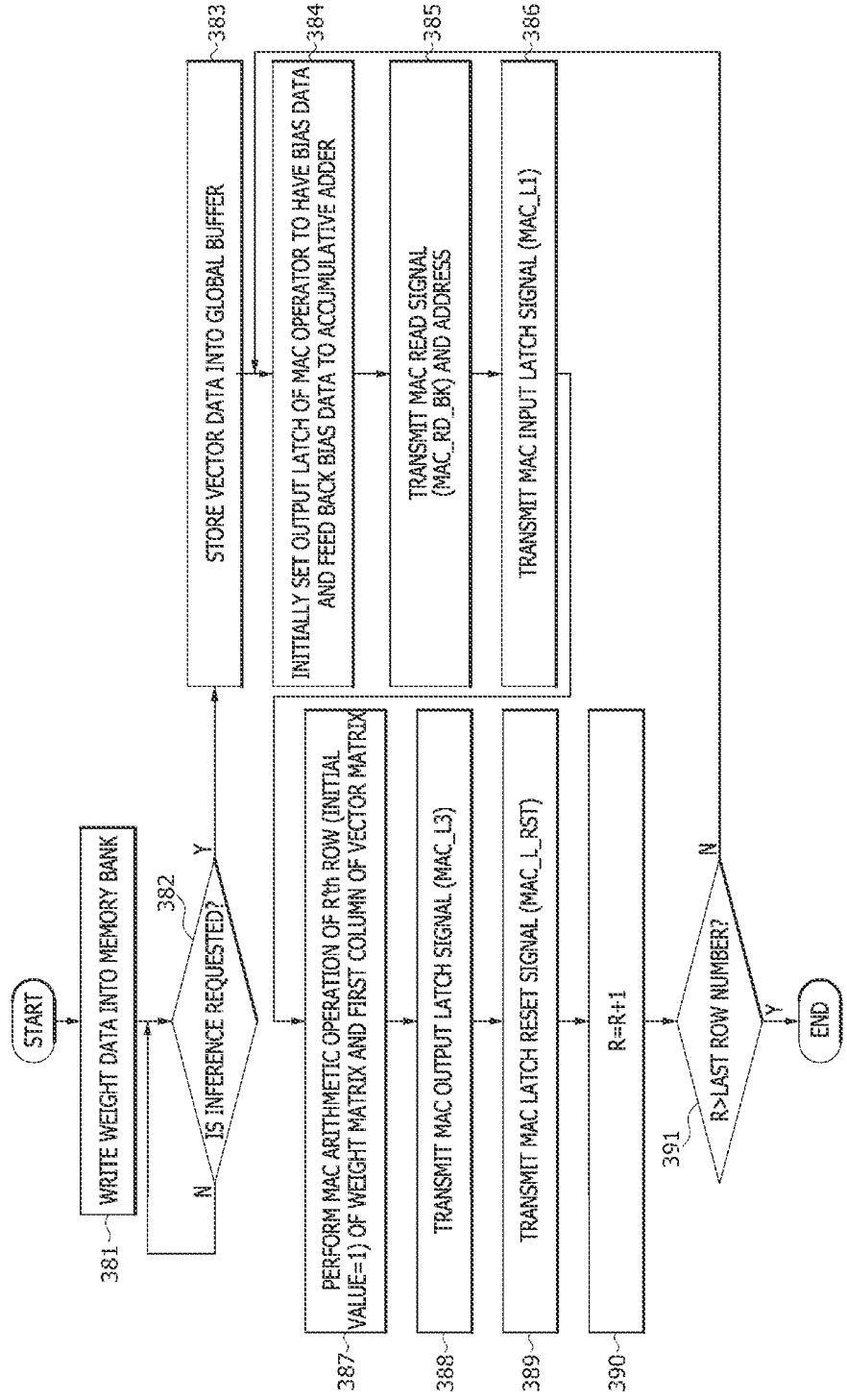
FIG. 27 is a flowchart illustrating processes of the MAC arithmetic operation illustrated in FIG. 14 in a PIM system according to a second embodiment of the present disclosure.

FIG. 27 is a flowchart illustrating processes of the MAC arithmetic operation described with reference to FIG. 14, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-1 illustrated in FIG. 16. Referring to FIGS. 20 and 27, the first data (i.e., the weight data) may be written into the memory bank 411 at a step 381 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 14.

At a step 382, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 500 at the step 382, then the PIM controller 500 may write the vector data transmitted with the inference request signal into the global buffer 412 at a step 383. Accordingly, the vector data may be stored in the global buffer 412 of the PIM device 400.

At a step 384, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 14. That is, as illustrated in FIG. 16, the output latch 123-1 of the data output circuit 123-A included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 385, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 386, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 387, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., MAC result data) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 388, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the transfer gate 123-2 of the data output circuit 123-A.

At a step 389, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the biased result data Y0.0 generated by the MAC operator 420 and a reset operation of the output latch 123-1 included in the MAC operator 420. The transfer gate 123-2 receiving the biased result data Y0.0 from the output latch 123-1 of the MAC operator 420 may be synchronized with the MAC latch reset signal MAC_L_RST to output the biased result data Y0.0. In an embodiment, the biased result data Y0.0 outputted from the MAC operator 120 may be stored into the memory bank 411 through the BIO line in the PIM device 400.

At a step 390, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 390. At a step 391, whether the row number changed at the step 390 is greater than the row number of the last row (i.e., the eighth row) of the weight matrix may be determined. Because the row number of the weight matrix is changed to '2' at the step 390, a process of the MAC arithmetic operation may be fed back to the step 384.

If the process of the MAC arithmetic operation is fed back to the step 384 at the step 391, the same processes as described with reference to the steps 384 to 391 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 384 at the step 391, then the processes from the step 384 to the step 390 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 390, then the MAC arithmetic operation may terminate because the row number of '9' is greater than the last row number of '8' at the step 391.

Figure 28:
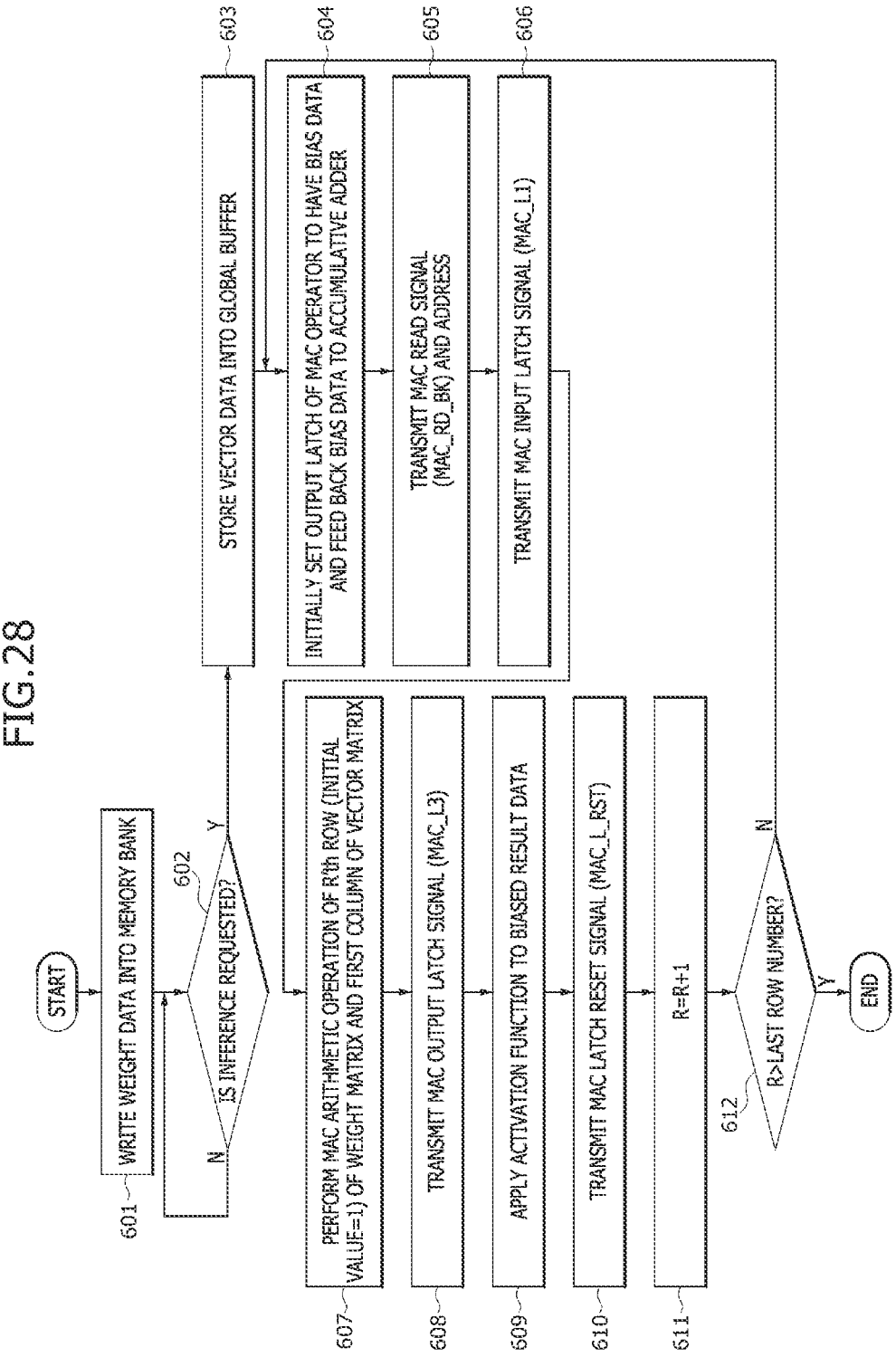
FIG. 28 is a flowchart illustrating processes of the MAC arithmetic operation illustrated in FIG. 17 in a PIM system according to a second embodiment of the present disclosure.

FIG. 28 is a flowchart illustrating processes of the MAC arithmetic operation described with reference to FIG. 17, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-2 illustrated in FIG. 19. Referring to FIGS. 19 and 28, the first data (i.e., the weight data) may be written into the memory bank 411 at a step 601 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 17.

At a step 602, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 500 at the step 602, then the PIM controller 500 may write the vector data transmitted with the inference request signal into the global buffer 412 at a step 603. Accordingly, the vector data may be stored in the global buffer 412 of the PIM device 400.

At a step 604, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 17. That is, as described with reference to FIG. 19, the output latch 123-1 of the data output circuit 123-B included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage of the addition logic circuit 122-2 to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 605, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 606, the MAC command generator 540 of the PIM controller 500 may generate and transmit the MAC input latch signal MAC_L1 to the PIM device 400, as described with reference to FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 607, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., the MAC result data MAC0.0) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 608, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the activation function logic circuit 123-5, which is illustrated in FIG. 19. At a step 610, the activation function logic circuit 123-5 may apply an activation function to the biased result data Y0.0 to generate a final output value, and the final output value may be inputted to the transfer gate (123-2 of FIG. 4).

At a step 610, the MAC command generator 540 of the PIM controller 500 may generate and transmit the MAC latch reset signal MAC_L_RST to the PIM device 400, as described with reference to FIG. 26. The MAC latch reset signal MAC_L_RST may control an output operation of the final output value generated by the MAC operator 420 and a reset operation of the output latch 123-1 included in the MAC operator 420. The transfer gate 123-2 receiving the final output value from the activation function logic circuit 123-5 of the data output circuit 123-B included in the MAC operator 420 may be synchronized with the MAC latch reset signal MAC_L_RST to output the final output value. In an embodiment, the final output value outputted from the MAC operator 420 may be stored into the memory bank 411 through the BIO line in the PIM device 400.

At a step 611, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 611. At a step 612, whether the row number changed at the step 611 is greater than the row number of the last row (i.e., the eighth row) of the weight matrix may be determined. Because the row number of the weight matrix is changed to '2' at the step 611, a process of the MAC arithmetic operation may be fed back to the step 604.

If the process of the MAC arithmetic operation is fed back to the step 604 from the step 612, the same processes as described with reference to the steps 604 to 612 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix to generate the MAC result data (corresponding to the element MAC1.0 located in the second row of the MAC result matrix) and the bias data (corresponding to the element B1.0 located in the second row of the bias matrix). If the process of the MAC arithmetic operation is fed back to the step 604 from the step 612, the processes from the step 604 to the step 612 may be iteratively performed until the MAC arithmetic operation is performed for all of the rows (i.e., first to eighth rows) of the weight matrix with the vector matrix. If the MAC arithmetic operation for the eighth row of the weight matrix terminates and the row number of the weight matrix changes from '8' to '9' at the step 611, the MAC arithmetic operation may terminate because the row number of '9' is greater than the last row number of '8' at the step 612.

Figure 29:
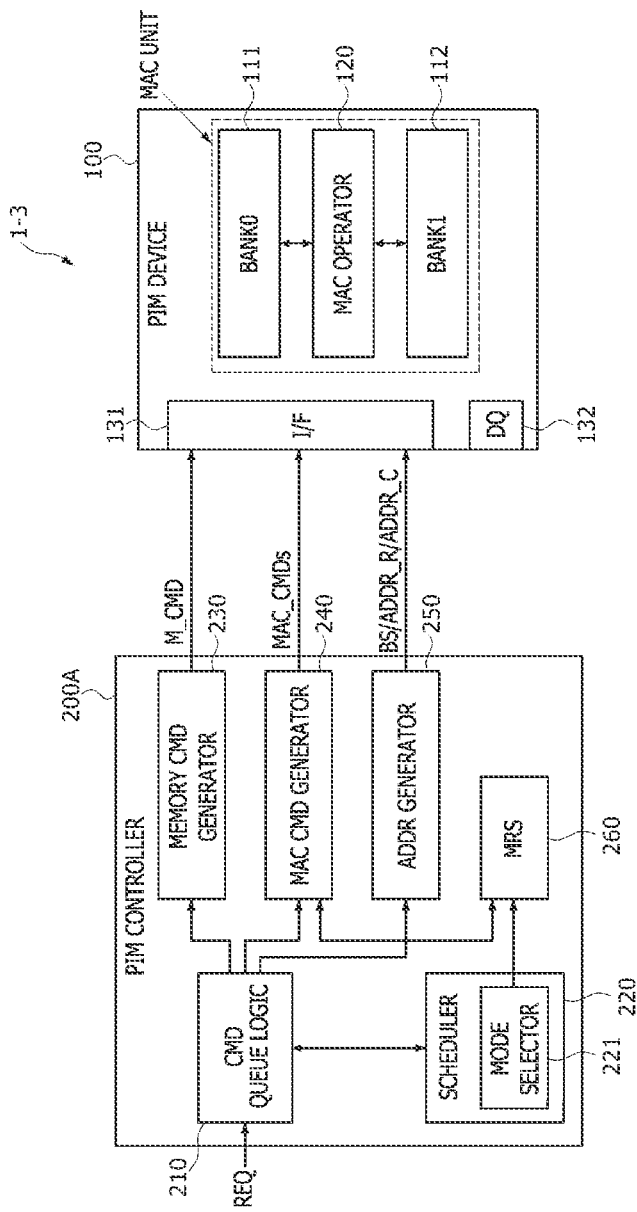
FIG. 29 is a block diagram illustrating a PIM system according to yet another embodiment of the present disclosure.

FIG. 29 is a block diagram illustrating a PIM system 1-3 according to a third embodiment of the present disclosure. As illustrated in FIG. 29, the PIM system 1-3 may have substantially the same configuration as the PIM system 1-1 illustrated in FIG. 2 except that a PIM controller 200A of the PIM system 1-3 further includes a mode register set (MRS) 260 as compared with the PIM controller 200 of the PIM system 1-1. Thus, the same explanation as described with reference to FIG. 2 will be omitted hereinafter. The mode register set 260 in the PIM controller 200A may receive an MRS signal instructing arrangement of various signals necessary for the MAC arithmetic operation of the PIM system 1-3. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 240. For an embodiment, the MRS 260 represents a MRS circuit.

In an embodiment, the MRS signal may include timing information on when the MAC commands MAC_CMDs are generated. In such a case, the deterministic operation of the PIM system 1-3 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the second memory bank 112 of the PIM device 100 by the inference request signal transmitted from an external device to the PIM controller 200A. Alternatively, the generation of the MRS signal in the MRS 260 may be executed after the vector data are stored in the second memory bank 112 of the PIM device 100 by the inference request signal transmitted from an external device to the PIM controller 200A.

Figure 30:
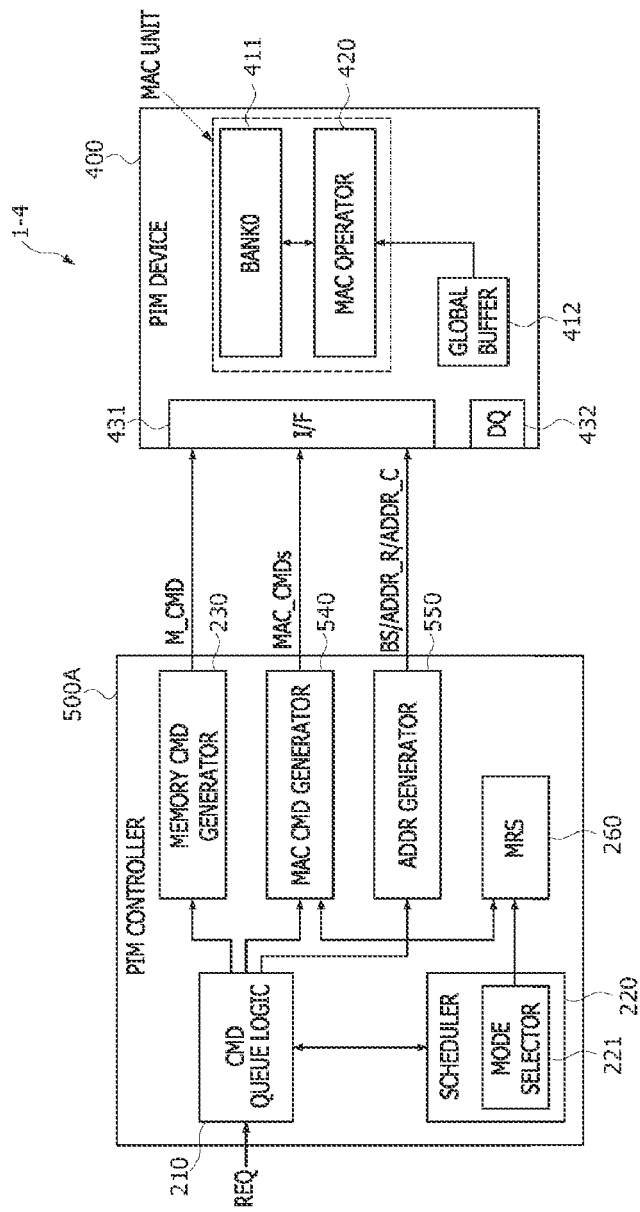
FIG. 30 is a block diagram illustrating a PIM system according to still another embodiment of the present disclosure.

FIG. 30 is a block diagram illustrating a PIM system 1-4 according to a fourth embodiment of the present disclosure. As illustrated in FIG. 30, the PIM system 1-4 may have substantially the same configuration as the PIM system 1-2 illustrated in FIG. 20 except that a PIM controller 500A of the PIM system 1-4 further includes the mode register set (MRS) 260 as compared with the PIM controller 500 of the PIM system 1-2. Thus, the same explanation as described with reference to FIG. 20 will be omitted hereinafter. The mode register set 260 in the PIM controller 500A may receive an MRS signal instructing arrangement of various signals necessary for the MAC arithmetic operation of the PIM system 1-4. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 540.

In an embodiment, the MRS signal may include timing information on when the MAC commands MAC_CMDs are generated. In such a case, the deterministic operation of the PIM system 1-4 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the global buffer 412 of the PIM device 400 by the inference request signal transmitted from an external device to the PIM controller 500A. Alternatively, the generation of the MRS signal in the MRS 260 may be executed after the vector data are stored in the global buffer 412 of the PIM device 400 by the inference request signal transmitted from an external device to the PIM controller 500A.

Figure 31:
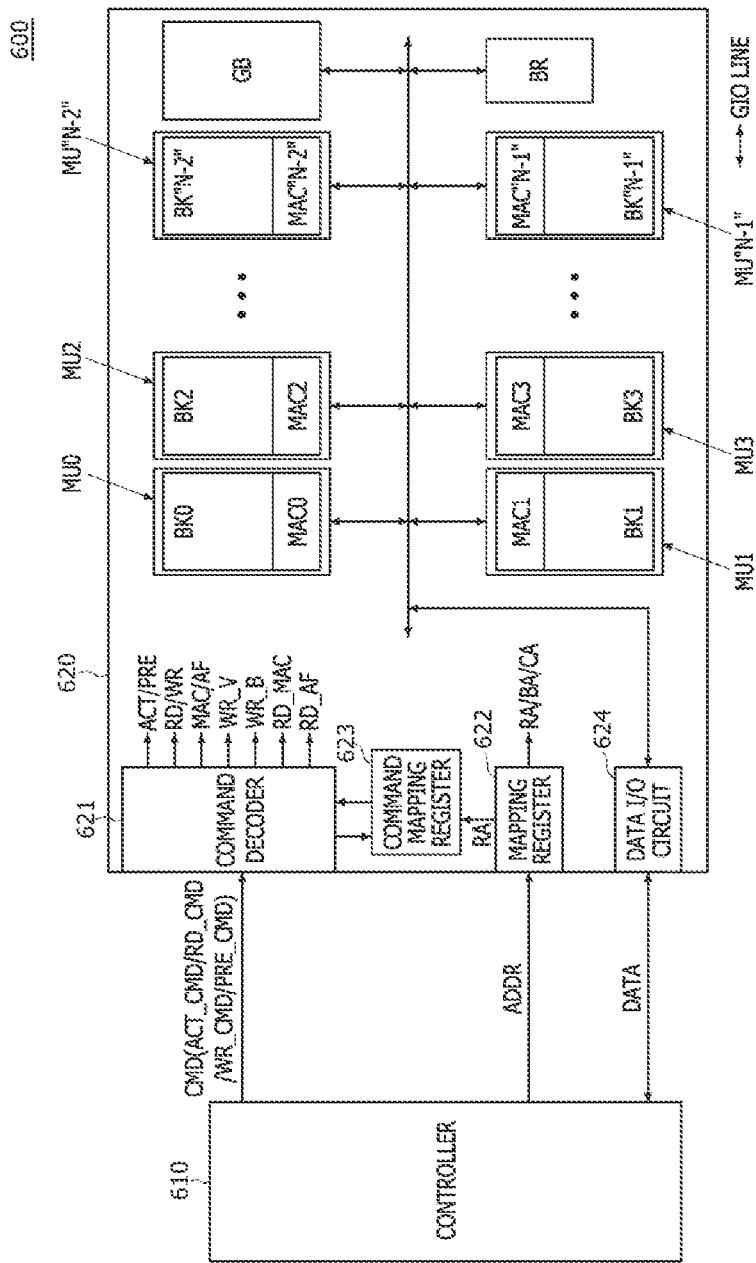
FIG. 31 is a block diagram illustrating a PIM system according to an embodiment of the present disclosure.

FIG. 31 is a block diagram illustrating a PIM system 600 according to an embodiment of the present disclosure. Referring to FIG. 31, the PIM system 600 may include a controller 610 and a PIM device 620. The controller 610 may generate and output a command CMD and an address signal ADDR in response to a request from a host. The PIM device 620 may perform a memory operation or a PIM operation in response to the command CMD and the address signal ADDR from the controller 610.

The controller 610 may transmit one of an active command ACT_CMD, a read command RD_CMD, a write command WR_CMD, and a pre-charge command PRE_CMD as a command CMD to the PIM device 620. The controller 610 may receive a memory request that requests a memory operation to be performed on the PIM device 620 from the host. Here, the memory operation of the PIM device 620 may include a read operation for reading data that is stored in the PIM device 620 and a write operation for writing data to the PIM device 620.

When a data read request is transmitted from the host, the controller 610 may sequentially generate an active command ACT_CMD, a read command RD_CMD, and a pre-charge command PRE_CMD to transmit the generated commands to the PIM device 620. When a data write request is transmitted from the host, the controller 610 may sequentially generate an active command ACT_CMD, a write command WR_CMD, and a pre-charge command PRE_CMD to transmit the generated commands to the PIM device 620. When the controller 610 transmits an active command ACT_CMD and a pre-charge command PRE_CMD to the PIM device 620, the controller 610 may transmit an address signal ADDR including a row address, together with the active command ACT_CMD and the pre-charge command PRE_CMD, to the PIM device 620. When the controller 610 transmits a read command RD_CMD to the PIM device 620, the controller 610 may transmit an address signal ADDR including a column address, together with the read command RD_CMD, to the PIM device 620. When the controller 610 transmits a write command WR_CMD to the PIM device 620, the controller 610 may transmit an address signal ADDR including a column address and write data, together with the write command WR_CMD, to the PIM device 620.

The controller 610 may receive a memory request requesting a PIM operation to be performed on the PIM device 620 from the host. Here, the PIM operation to be performed on the PIM device 620 may include a MAC arithmetic operation of performing MAC arithmetic, a vector data write operation of storing vector data that is used for the MAC arithmetic operation in the PIM device 620, a bias data write operation of storing bias data, used for the MAC arithmetic operation, in the PIM device 620, an AF operation of applying an active function (hereinafter, referred to as "AF") to a MAC arithmetic result, a MAC result data read operation of reading MAC result data that is generated as a result of the MAC arithmetic operation, and an AF result data read operation of reading AF result data that is generated as a result of the AF application.

In an example, when a MAC arithmetic request is transmitted from the host, the controller 610 may sequentially generate an active command ACT_CMD, a read command RD_CMD, and a pre-charge command PRE_CMD to transmit the generated commands to the PIM device 620. In this case, the controller 610 may transmit an address signal ADDR including a first specific row address, together with the active command ACT_CMD, to the PIM device 620. Here, the first specific row address may be a row address of a region in which weight data that is used for the MAC arithmetic is stored in the PIM device 620. When the first specific row address is transmitted together with the active command ACT_CMD from the controller 610, the PIM device 620 may perform the MAC arithmetic operation in response to the read command RD_CMD and the column address that is transmitted from the controller 610, following the active command ACT_CMD.

In another example, when a vector data write request is transmitted from the host, the controller 610 may sequentially generate an active command ACT_CMD, a write command WR_CMD, and a pre-charge command PRE_CMD to transmit the generated commands to the PIM device 620. In this case, the controller 610 may transmit an address signal ADDR including a second specific row address together with the active command ACT_CMD to the PIM device 620. Here, the second specific row address may be a row address that is predetermined for a vector data write operation to be performed on the PIM device 620. When the second specific row address is transmitted together with the active command ACT_CMD from the controller 610, the PIM device 620 may perform a vector data write operation of storing vector data in the PIM device 620 in response to the write command WR_CMD and a column address that is transmitted from the controller 610, following the active command ACT_CMD.

The PIM device 620 may include a plurality of, for example, "N" ("N" is a natural number two or greater) memory banks BK0-BK"N−1", a global buffer GB, a bias register BR and "N" MAC operators MAC0-MAC"N−1". In addition, the PIM device 620 may include a command decoder 621, an address latch 622, a command mapping register 623, and a data input/output circuit 624.

Each of the memory banks BK0-BK"N−1" may constitute one MAC unit MU with one MAC operator. As illustrated in FIG. 31, a first memory bank BK0 and a first MAC operator MAC0 may constitute a first MAC unit MU0. A second memory bank BK1 and a second MAC operator MAC1 may constitute a second MAC unit MU1. A third memory bank BK2 and a third MAC operator MAC2 may constitute a third MAC unit MU2. An "N−1"$^{th}$ memory bank BK"N−2" and an "N−1"$^{th}$ MAC operator MAC"N−2" may constitute an "N−1"$^{th}$ MAC unit MU"N−2". Similarly, an "N"$^{th}$ memory bank BK"N−1" and an "N"$^{th}$ MAC operator MAC"N−1" may constitute an "N"$^{th}$ MAC unit MU"N−1".

The memory banks BK0-BK"N−1" may provide weight data for the MAC arithmetic operation to the MAC operators that together form the MAC units. For example, the first memory bank BK0 of the first MAC unit MU0 may provide first weight data to the first MAC operator MAC0. The second memory bank BK1 of the second MAC unit MU1 may provide second weight data to the second MAC operator MAC1. Similarly, the "N"$^{th}$ memory bank BK"N−1" of the "N"$^{th}$ MAC unit MU"N−1" may provide "N"$^{th}$ weight data to the "N"$^{th}$ MAC operator MAC"N−1". The weight data transmission from the memory banks BK0-BK"N−1" to the MAC operators MAC0-MAC"N−1" may be performed through the GIO line.

The global buffer GB may provide vector data for the MAC arithmetic to the MAC operators MAC0-MAC"N−1". To this end, the PIM device 620 may perform a vector data write operation of storing the vector data for the MAC arithmetic operation in the global buffer GB prior to the MAC arithmetic operation. The global buffer GB may provide the same vector data to the MAC operators MAC0-MAC"N−1", in common. The vector data transmission from the global buffer GB to the MAC operators MAC0-MAC"N−1" may be performed through the GIO line.

The bias register BR may provide bias data for the bias addition to the MAC operators MAC0-MAC"N−1". To this end, the PIM device 620 may perform a bias data write operation of storing the bias data for the bias addition operation in the bias register BR prior to the bias addition operation. The bias data transmission from the bias register BR to the MAC operators MAC0-MAC"N−1" may be performed through the GIO line.

The MAC operators MAC0-MAC"N−1" may perform the MAC arithmetic operation of matrix multiplication by using the weight data and the vector data that is transmitted from the memory banks BK0-BK"N−1" and the global buffer GB, respectively. The MAC operators MAC0-MAC"N−1" may output MAC result data that is generated as a result of the MAC arithmetic operation through the GIO line. The MAC operators MAC0-MAC"N−1" may perform a bias addition operation of adding bias data to the MAC result data. The MAC operators MAC0-MAC"N−1" may perform an AF process on the data that is generated as a result of the bias addition operation. The MAC operators MAC0-MAC"N−1" may output AF result data that is generated as a result of the AF process through the GIO line. In an example, the operations of the MAC operators MAC0-MAC"N−1" may be performed in synchronization with a clock signal transmitted from the memory banks BK0-BK"N−1".

The command decoder 621 may receive the command CMD from the controller 610 and generate a memory control signal or a PIM control signal to transmit the generated memory control signal or PIM control signal to the MAC units MU0-MU"N−1". The command decoder 621 may generate and output an active control signal ACT, a pre-charge control signal PRE, a read control signal RD, a write control signal WR, a MAC arithmetic control signal MAC, an AF control signal AF, a vector data write control signal WR_V, a bias data write control signal WR_B, a MAC result data read control signal RD_MAC, and an AF result data read control signal RD_AF. When the active command ACT_CMD is transmitted from the controller 610, the command decoder 621 may transmit the active command ACT_CMD to the command mapping register 623. The command decoder 621 may receive a memory operation mode signal or a PIM operation mode signal from the command mapping register 623. When the memory operation mode signal is transmitted from the command mapping register 623, the command decoder 621 may generate and output a memory control signal for the memory operation, for example, the read control signal RD or the write control signal WR. When the PIM operation mode signal is transmitted from the command mapping register 623, the command decoder 621 may generate and output a PIM control signal for the PIM operation, for example, the MAC arithmetic control signal MAC, the AF control signal AF, the vector data write control signal WR_V, the bias data write control signal WR_B, the MAC result data read control signal RD_MAC, or the AF result data read control signal RD_AF. The command decoder 621 may generate and output the active control signal ACT and the pre-charge control signal PRE regardless of whether the memory operation or the PIM operation is performed.

The address latch 622 may receive the address signal ADDR from the controller 610. The address latch 622 may latch the address signal ADDR and generate a row address RA, a bank address BA, and a column address CA to transmit the addresses to the memory banks BK0-BK"N−1". When an address signal ADDR including a row address RA is transmitted from the controller 610, the address latch 622 may transmit the row address RA to the command mapping register 623 and the memory banks BK0-BK"N−1". When an address signal ADDR including a bank address BA and a column address CA is transmitted from the controller 610, the address latch 622 may transmit the bank address BA and the column address CA to the memory banks BK0-BK"N−1".

The data input/output circuit 624 may receive data from the controller 610 or transmit data to the controller 610. In an example, the data input/output circuit 624 may include a plurality of data input/output terminals. In an example, the data input/output circuit 624 may include a data input/output buffer. The data input/output circuit 624 may exchange data with the memory banks BK0-BK"N−1" through the GIO line in the PIM device 620. The data input/output circuit 624 may transmit data, for example, vector data, to the global buffer GB through the GIO line in the PIM device 620. The data input/output circuit 624 may receive data, for example, MAC result data and AF result data, from the MAC operators MAC0-MAC"N−1" through the GIO line in the PIM device 620.

FIG. 32 is a diagram illustrating an example of a configuration of the command mapping register 623 of the PIM device 620 in the PIM system 600 of FIG. 31. Referring to FIG. 32, together with FIG. 31, the command mapping register 623 of the PIM device (620 in FIG. 31) may include a plurality of, for example, nine registers. Each of the registers constituting the command mapping register 623 may include a column address entry, a PIM operation entry, an enable state entry, a start row address entry, and an end row address entry. In the column address entries, column addresses, defining PIM operations, while distinguishing the registers from each other, may be stored. As illustrated in FIG. 32, a column address "0x00" of a first register may define a MAC arithmetic operation as a PIM operation to be stored in the PIM operation entry of the first register. A column address "0x01" of a second register may define a vector data write operation as the PIM operation to be stored in the PIM operation entry of the second register. A column address "0x02" of a third register may define a bias data write operation as the PIM operation to be stored in the PIM operation entry of the third register. A column address "0x03" of a fourth register may define an AF operation by using sigmoid as the PIM operation to be stored in the PIM operation entry of the fourth register. A column address "0x04" of a fifth register may define an AF operation by using tanh as the PIM operation to be stored in the PIM operation entry of the fifth register. A column address "0x05" of a sixth register may define an AF operation by using GeLU as the PIM operation to be stored in the PIM operation entry of the sixth register. A column address "0x06" of the seventh register may define an AF operation by using ReLU as the PIM operation to be stored in the PIM operation entry of the seventh register. A column address "0x07" of an eighth register may define a MAC result data read operation as the PIM operation to be stored in the PIM operation entry of the eighth register. In addition, a column address "0x08" of a ninth register may define an AF result data read operation as the PIM operation to be stored in the PIM operation entry of the ninth register.

The PIM operation entries of the command mapping register 623 may store the PIM operations that are defined by the column addresses of the column address entries as described above. As illustrated in FIG. 32, the MAC arithmetic operation, the vector data write operation, the bias data write operation, the AF operation by using sigmoid, the AF operation by using tanh, the AF operation by using GeLU, the AF operation by using ReLU, the MAC result data read operation, and the AF result data read operation may be stored sequentially in the PIM operation entries of the first to ninth registers. In the state entries of the command mapping register 623, data indicating whether the PIM operation that is stored in the PIM operation entry is available or not may be stored. As illustrated in FIG. 32, the enable data Enable may be stored in the state entries, and accordingly, it may indicate that all settings of the command mapping register 623 have been completed.

In the start row address entries of the command mapping register 623, start row addresses that designate the PIM operations that are stored in the PIM operation entries may be stored. Similarly, in the end row address entries of the command mapping register 623, end row addresses that designate the PIM operations that are stored in the PIM operation entries may be stored. As illustrated in FIG. 32, each of the row addresses from "0x8000" to "0x8FFF" may designate the MAC arithmetic operation. The row address "0xFFF7" may designate the vector data write operation. The row address "0xFFF8" may designate the bias data write operation. The row address "0xFFF9" may designate the AF operation by using sigmoid. The row address "0xFFFA" may designate the AF operation by using tanh. The row address "0xFFFB" may designate the AF operation by using GeLU. The row address "0xFFFC" may designate the AF operation by using ReLU. The row address "0xFFFD" may designate the MAC result data read operation. In addition, the row address "0xFFFE" may designate the AF result data read operation.

Figure 33:
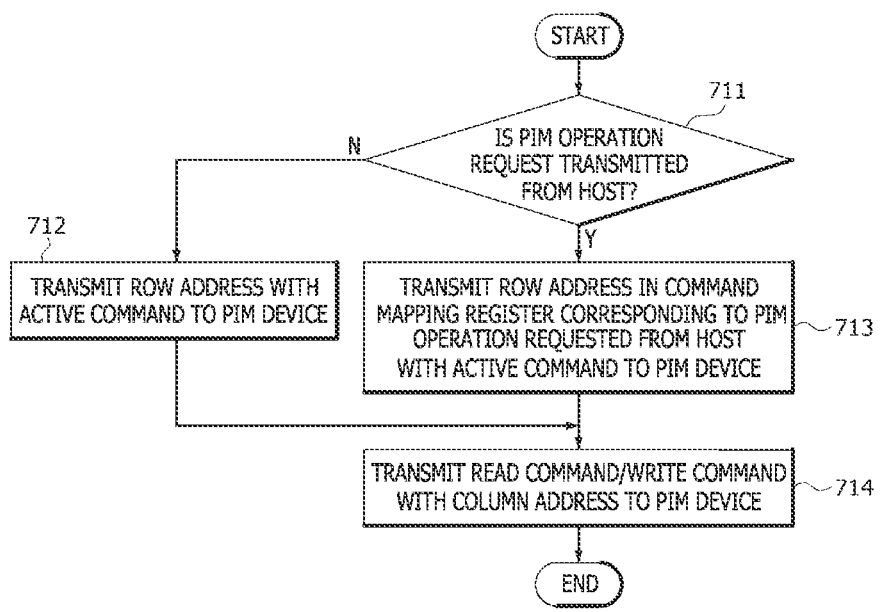
FIG. 33 is a flowchart illustrating an operation of a controller of the PIM system of FIG. 31.

FIG. 33 is a flowchart illustrating an operation of the controller 610 of the PIM system 600 of FIG. 31. Referring to FIG. 33 together with FIG. 31, in step 711, the controller 610 of the PIM system 600 may determine whether a PIM operation request is transmitted from a host. If a PIM operation request is not transmitted from the host, that is, if a memory operation request is transmitted from the host, in step 712, the controller 610 may transmit an active command and a row address to the PIM device 620. In this case, the row address that is transmitted from the controller 610 to the PIM device 620 might not match the row address that is stored in a start row address entry and an end row address entry of each of the registers constituting the command mapping register 623 of the PIM device 620. After performing step 712, in step 714, the controller 610 may transmit a read command or a write command together with a column address to the PIM device 620. If a read request is transmitted from the host, the controller 610 may transmit the read command together with a column address to the PIM device 620. In this case, the column address may designate a region in which data to be read is stored. On the other hand, if a write request is transmitted from the host, the controller 610 may transmit the write command, together with the column address, to the PIM device 620. In this case, the column address may designate a region in which data to be written is stored. In step 711, if a PIM operation request is transmitted from the host, in step 713, the controller 610 may transmit a row address that defines a PIM operation according to the PIM operation request in the command mapping register 623, together with the active command, to the PIM device 620. After performing step 713, in step 714, the controller 610 may transmit the read command or the write command, together with the column address, to the PIM device 620. Even if the memory operation request is transmitted or the PIM operation request is transmitted from the host to the controller 610, the controller 610 may perform the same operation in step 714. However, the PIM device 620 may recognize a difference between the row address that is transmitted according to the operation of step 712 and the row address that is transmitted according to the operation of step 713 to perform the memory operation or the PIM operation in response to the read command or the write command that is transmitted according to the operation of step 714.

Figure 34:
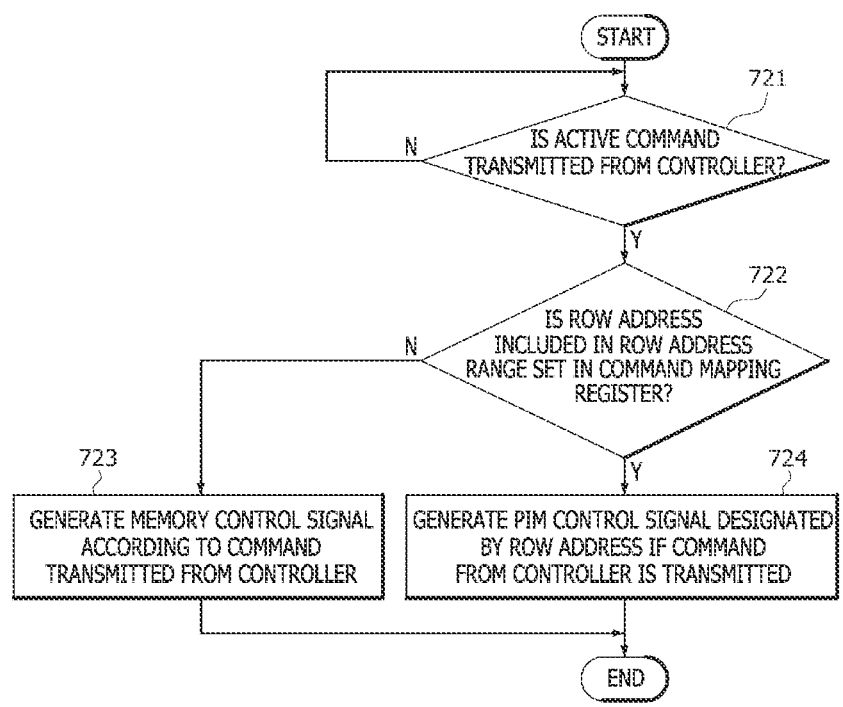
FIG. 34 is a flowchart illustrating an operation of the PIM device of the PIM system of FIG. 31.

FIG. 34 is a flowchart illustrating an operation of PIM device 620 of the PIM system 600 of FIG. 31. Referring to FIG. 34 together with FIG. 31, in step 721, the PIM device 620 may determine whether an active command is transmitted from the controller 610. If the active command is transmitted from the controller 610, the PIM device 620 may determine whether a row address that is transmitted with the active command is included in a row address range set in the command mapping register 623. If the row address that is transmitted from the controller 610 is not included in the row address range set in the command mapping register 623, in step 723, the PIM device 620 may generate a memory control signal according to the command that is transmitted from the controller 610, for example, a read command or a write command. The PIM device 620 may perform a memory operation corresponding to the memory control signal. If the row address that is transmitted from the controller 610 is included in the row address range set in the command mapping register 623, in step 724, the PIM device 620 may generate a PIM control signal designated by the row address set in the command mapping register 623 in response to the command that is transmitted from the controller 610, for example, the read command or the write command. In addition, the PIM device 620 may perform the PIM operation corresponding to the PIM control signal.

Figure 35:
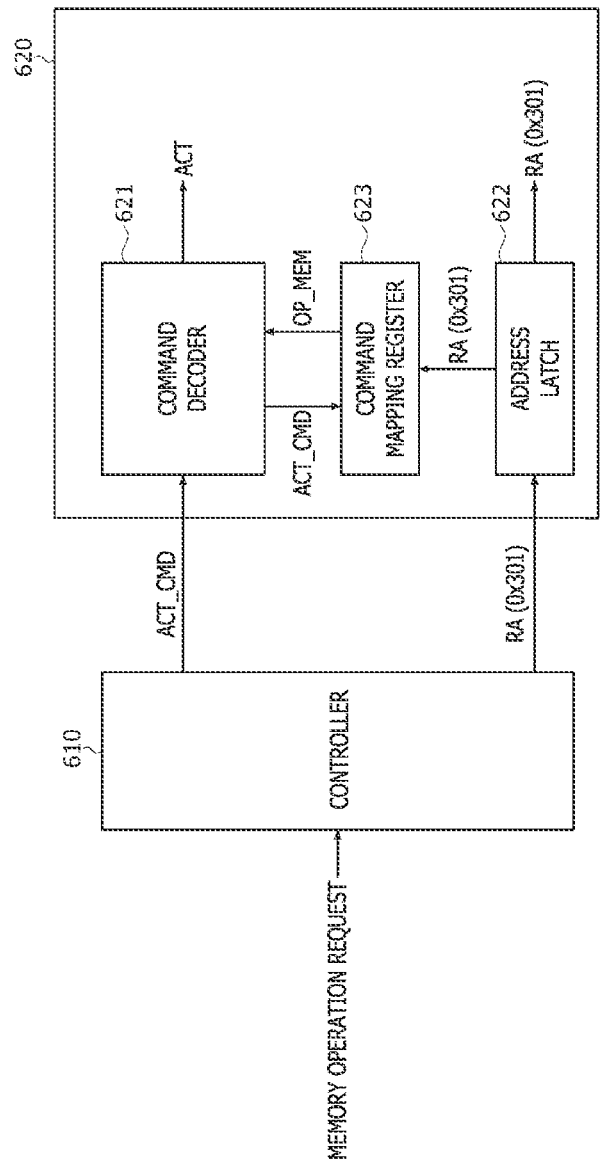
FIGS. 35 and 36 are block diagrams illustrating an example of a memory operation of the PIM system of FIG. 31.
Figure 36:
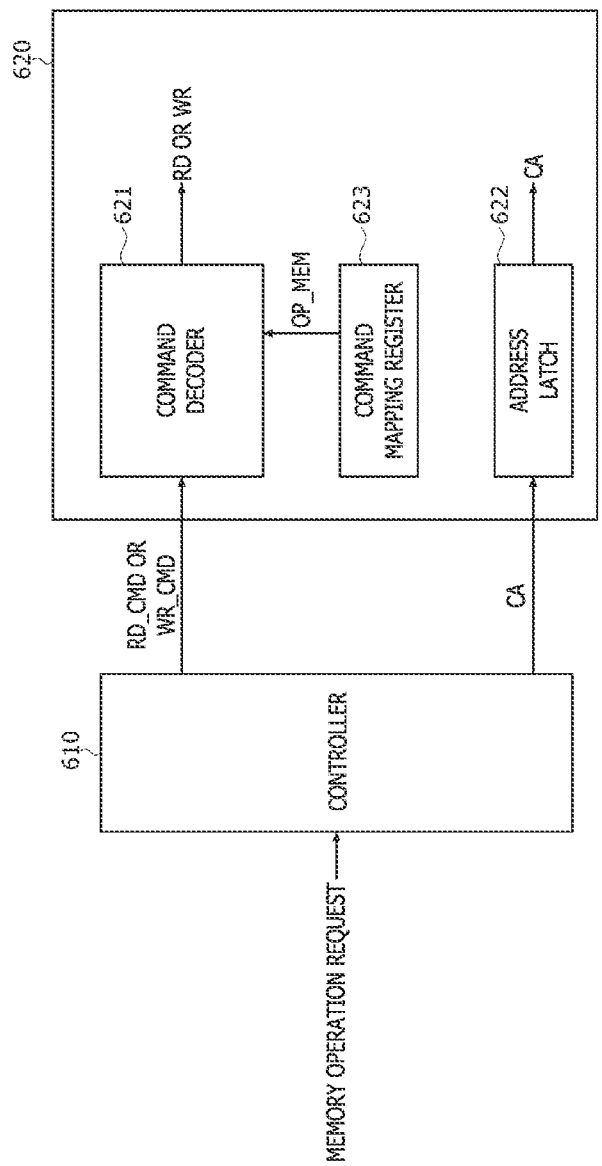

FIGS. 35 and 36 are block diagrams illustrating an example of the memory operation of the PIM system 600 of FIG. 31. In FIGS. 35 and 36, some components of the PIM device 620, for example, the MAC units MU0-MU"N-1", the global buffer GB, the data input/output circuit 624, and the GIO line are omitted. In the following examples, it is assumed that the command mapping register 623 of the PIM device 620 is set as described with reference to FIG. 32.

First, referring to FIG. 35, when the controller 610 receives a memory operation request, the controller 610 may transmit an active command ACT_CMD to the command decoder 621 of the PIM decoder 620. In addition, the controller 610 may transmit a row address RA, for example, "0x301", to the address latch 622 of the PIM device 620. The command decoder 621 of the PIM device 620 may transmit the active command ACT_CMD that is received from the controller 610 to the command mapping register 623. In addition, the command decoder 621 may decode the received active command ACT_CMD to generate an active control signal ACT and transmit the generated active control signal ACT to the memory banks (BK0-BK"N-1" of FIG. 31). The address latch 622 of the PIM device 620 may transmit the row address RA "0x301" that is received from the controller 610 to the command mapping register 623 and the memory banks (BK0-BK"N-1" of FIG. 31). Since the row address RA "0x301" that is transmitted from the address latch 622 is not included in a row address range that is stored in the start row address entries and the end row address entries in the command mapping register 623, the command mapping register 623 may generate a memory operation mode signal OP_MEM to transmit the same to the command decoder 621. The memory banks (BK0-BK"N-1" of FIG. 31) may perform active operations on a row having the row address RA "0x301" in response to the active control signal ACT.

Next, referring to FIG. 36, the controller 610 may transmit a read command RD_CMD or a write command WR_CMD corresponding to the memory operation request to the command decoder 621 of the PIM device 620. In addition, the controller 610 may transmit a column address CA to the address latch 622 of the PIM device 620. As described with reference to FIG. 35, as the memory operation mode signal OP_MEM is transmitted from the command mapping register 623, the command decoder 621 of the PIM device 620 may transmit a read control signal RD corresponding to the read command RD_CMD or a write control signal WR corresponding to the write command WR_CMD to the memory banks (BK0-BK"N-1" of FIG. 31). The address latch 622 may transmit the column address CA that is transmitted from the controller 610 to the memory banks (BK0-BK"N-1" of FIG. 31). When the read control signal RD is transmitted, the memory banks (BK0-BK"N-1" of FIG. 31) may transmit data of the columns having the column address in the activated row to the controller 610. When the write control signal WR is transmitted, the memory banks (BK0-BK"N-1" of FIG. 31) may store the data that is transmitted from the controller 610 to the columns having the column address in the activated row. In this process, the data that is stored in the memory banks (BK0-BK"N-1" in FIG. 31) may include weight data that is used for the MAC arithmetic operation. Although not illustrated in FIG. 36, after a predetermined time elapses, the controller 610 may transmit a pre-charge command (PRE_CMD of FIG. 31) together with a row address to the PIM device 620.

Figure 37:
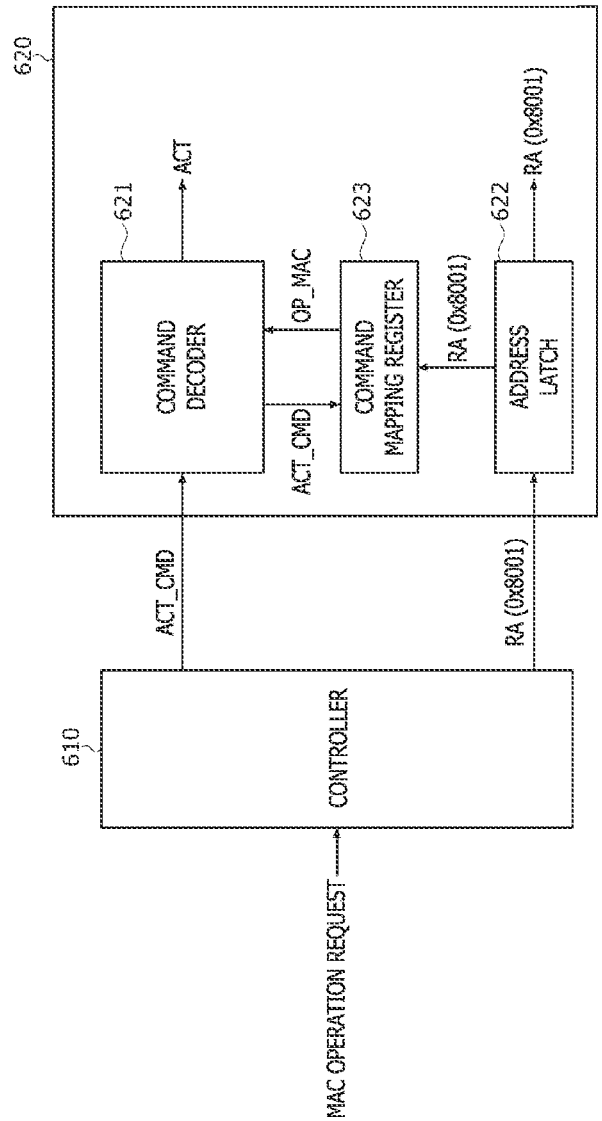
FIGS. 37 and 38 are block diagrams illustrating an example of a PIM operation of the PIM system of FIG. 31.
Figure 38:
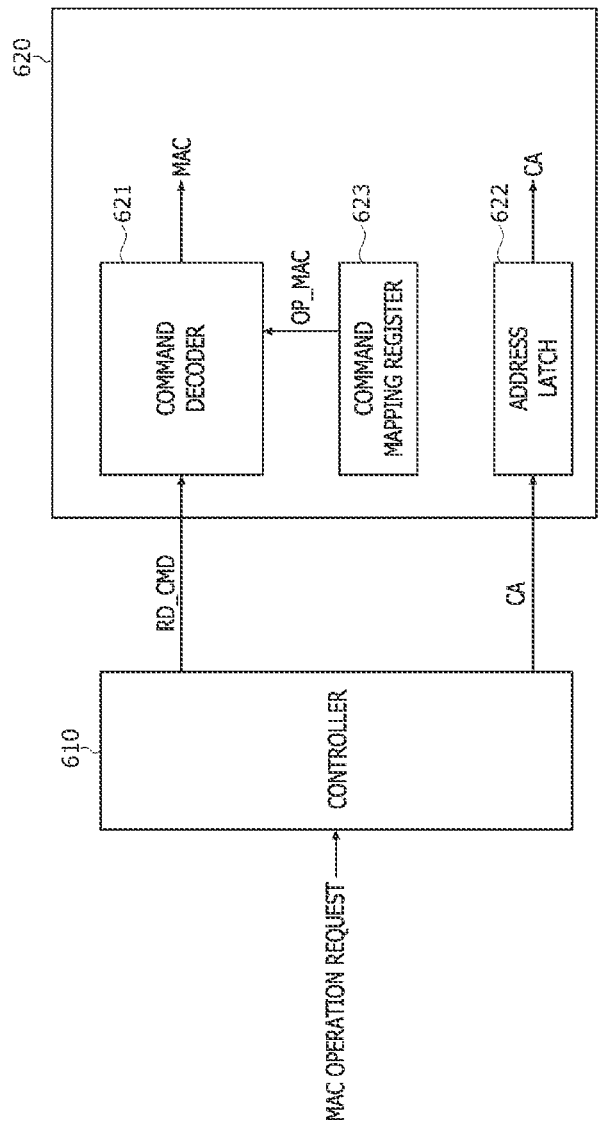

FIGS. 37 and 38 are block diagrams illustrating an example of the PIM operation of the PIM system 600 of FIG. 31. In FIGS. 37 and 38, some components of the PIM device 620, such as the MAC units MU0-MU"N-1", the global buffer GB, the data input/output circuit 624, and the GIO line are omitted. In the following example, it is assumed that the command mapping register 623 of the PIM device 620 is set as described with reference to FIG. 32.

First, referring to FIG. 37, when the controller 610 receives a MAC arithmetic operation request among the PIM operation requests, the controller 610 may transmit an active command ACT_CMD to the command decoder 621 of the PIM device 620. In addition, the controller 610 may transmit an address of a row in which weight data is stored in the memory banks (BK0-BK"N-1" in FIG. 31), for example, "0x8001", as a row address RA to the address latch 622 of the PIM device 620. The command decoder 621 of the PIM device 620 may transmit the active command ACT_CMD that is received from the controller 610 to the command mapping register 623. In addition, the command decoder 621 may decode the received active command ACT_CMD to generate an active control signal ACT and transmit the generated active control signal ACT to the memory banks (BK0-BK"N-1" of FIG. 31). The address latch 622 of the PIM device 620 may transmit the row address "0x8001" that is received from the controller 610 to the command mapping register 623 and the memory banks (BK0-BK"N-1" in FIG. 31). As illustrated in FIG. 32, as the row address RA "0x8001" that is transmitted from the address latch 622 is included in the row address range "0x8000-0x8FFF" that is stored in the start row address entry and the end row address entry of the first register in the command mapping register 623, the command mapping register 623 may generate a first PIM operation mode signal OP_MAC corresponding to a MAC arithmetic operation that is stored in the PIM operation entry of the first register of the command mapping register 623 to transmit the generated first PIM operation mode signal OP_MAC to the command decoder 621. The memory banks (BK0-BK"N-1" of FIG. 31) may perform active operations on the row having a row address RA "0x8001" in response to the active control signal ACT.

Next, referring to FIG. 38, the controller 610 may transmit a read command RD_CMD to the command decoder 621 of the PIM device 620. In addition, the controller 610 may transmit a column address CA to the address latch 622 of the PIM device 620. As described with reference to FIG. 37, as the first PIM operation mode signal OP_MAC is transmitted from the command mapping register 623, the command decoder 621 of the PIM device 620 may transmit a MAC control signal MAC to the memory banks (BK0-BK"N-1" of FIG. 31) in response to the read command RD_CMD. The address latch 622 may transmit the column address CA that is transmitted from the controller 610 to the memory banks (BK0-BK"N-1" of FIG. 31) and the global buffer (GB of FIG. 31). The memory banks (BK0-BK"N-1" of FIG. 31) may transmit a MAC clock signal and weight data of the columns having the column address CA in the activated row to the MAC operators (MAC0-MAC"N-1" of FIG. 31) in response to the MAC control signal MAC. The global buffer (GB of FIG. 31) may transmit vector data that is selected by the column address CA to the MAC operators (MAC0-MAC"N−1" of FIG. 31). The MAC operators (MAC0-MAC"N−1" of FIG. 31) may perform MAC arithmetic operations by using the weight data and the vector data that is transmitted from the memory banks (BK0-BK"N−1" of FIG. 31) and the global buffer (GB of FIG. 31), respectively, in synchronization with the MAC clock signal. Although not illustrated in FIG. 38, after a predetermined time elapses, the controller 610 may transmit a pre-charge command (PRE_CMD of FIG. 31) together with the row address to the PIM device 620.

Figure 39:
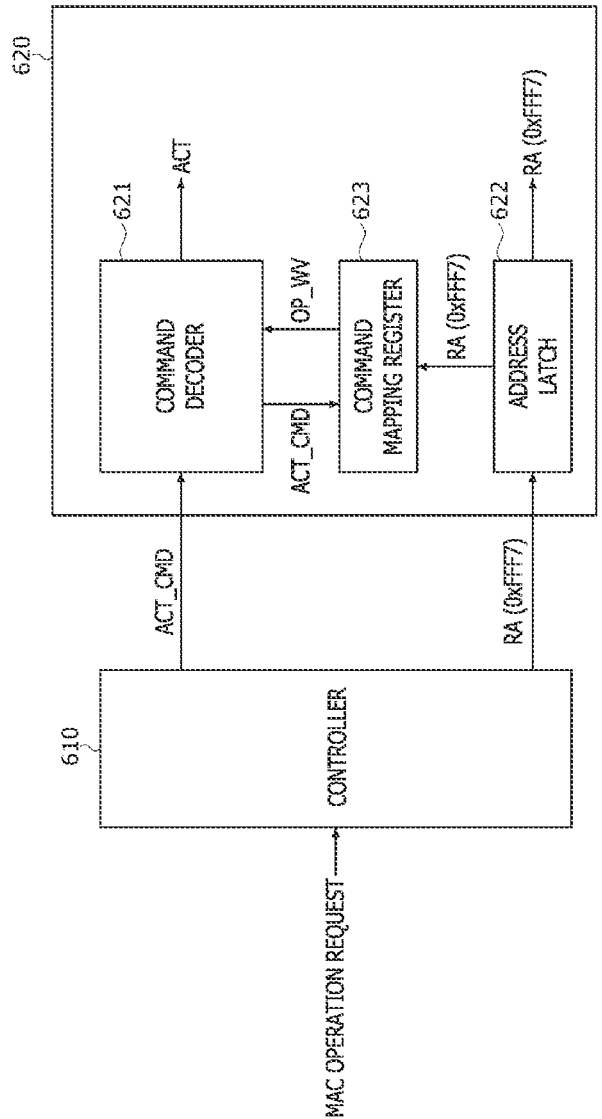
FIGS. 39 and 40 are block diagrams illustrating another example of a PIM operation of the PIM system of FIG. 31.
Figure 40:
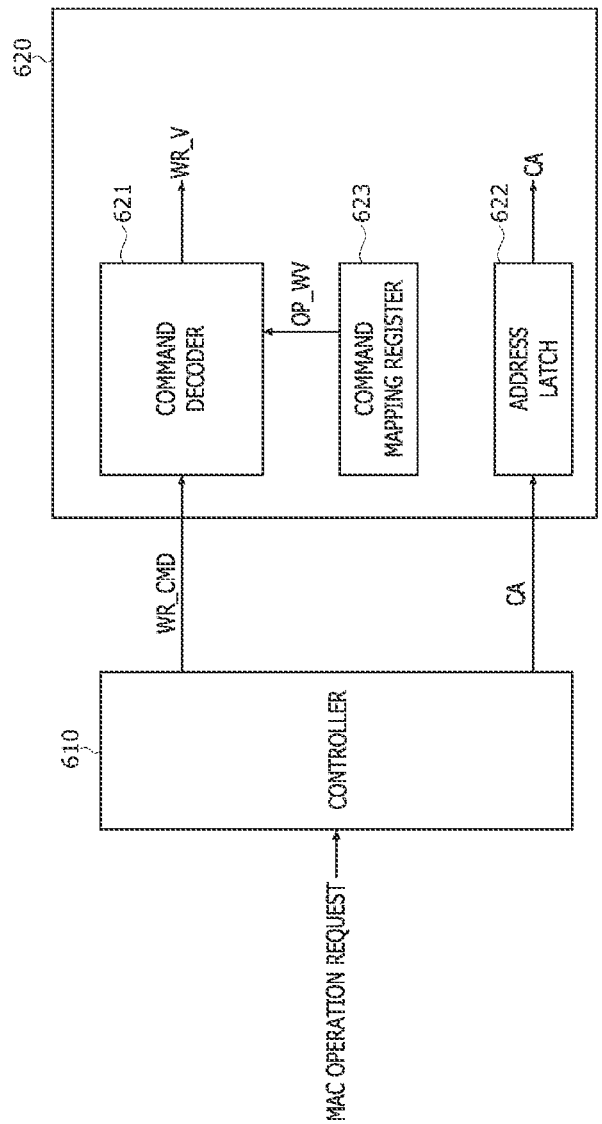

FIGS. 39 and 40 are block diagrams illustrating another example of the PIM operation of the PIM system 600 of FIG. 31. In FIGS. 39 and 40, some components of the PIM device 620, for example, the MAC units MU0-MU"N−1", the global buffer GB, the data input/output circuit 624, and the GIO line are omitted. In the following example, it is assumed that the command mapping register 623 of the PIM device 620 is set as described with reference to FIG. 32.

First, referring to FIG. 39, when the controller 610 receives a vector data write operation request, among the PIM operation requests, the controller 610 may transmit an active command ACT_CMD to the command decoder 621 of the PIM device 620. In addition, the controller 610 may transmit "0xFFF7" as a row address to the address latch 622 of the PIM device 620. Here, the row address "0xFFF7" may be a value corresponding to a start row address and an end row address of the second register in which the vector data write operation is stored in the command mapping register 623 of the PIM device 620, as described above with reference to FIG. 32. The command decoder 621 of the PIM device 620 may transmit the active command ACT_CMD that is received from the controller 610 to the command mapping register 623. In addition, the command decoder 621 may decode the received active command ACT_CMD to generate an active control signal ACT and transmit the generated active control signal ACT to the memory banks (BK0-BK"N−1" of FIG. 31). The address latch 622 of the PIM device 620 may transmit the row address RA "0xFFF7" that is received from the controller 610 to the command mapping register 623 and the memory banks (BK0-BK"N−1" of FIG. 31). As the row address RA "0xFFF7" that is transmitted from the address latch 622 corresponds to the row address "0xFFF7" that is stored in a start row address entry and an end row address entry of the second register in the command mapping register 623, the command mapping register 623 may generate a second PIM operation mode signal OP_WV corresponding to the vector data write operation that is stored in the PIM operation entry of the second register of the command mapping register 623 to transmit the same to the command decoder 621.

Next, referring to FIG. 40, the controller 610 may transmit a write command WR_CMD to the command decoder 621 of the PIM device 620. In addition, the controller 610 may transmit a column address CA to the address latch 622 of the PIM device 620. Although not illustrate in FIG. 40, the controller 610 may transmit vector data to the PIM device 620. As described with reference to FIG. 39, as the second PIM operation mode signal OP_WV is transmitted from the command mapping register 623, the command decoder 621 of the PIM device 620 may transmit a vector data write control signal WR_V to the global buffer (GB of FIG. 31) in response to the write command WR_CMD. The address latch 622 may transmit the column address CA received from the controller 610 to the global buffer (GB of FIG. 31). The global buffer (GB of FIG. 31) may store the vector data in columns having the column address CA in response to the vector data write control signal WR_V.

Figure 41:
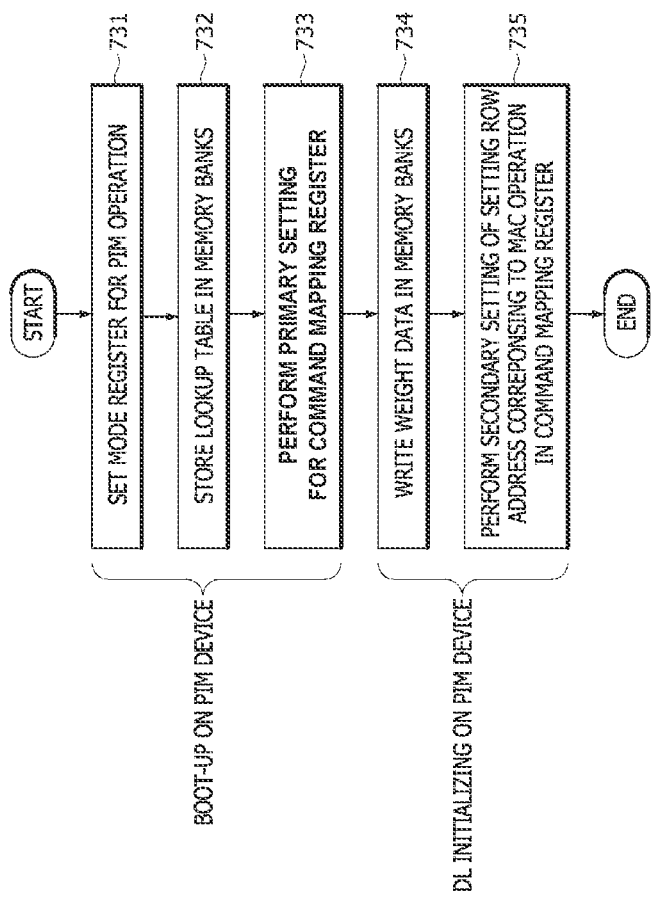
FIG. 41 is a flowchart illustrating a command mapping register setting process of the PIM system of FIG. 31.

FIG. 41 is a flowchart illustrating a setting process for the command mapping register 623 of the PIM system 600 of FIG. 31. Referring to FIG. 41 together with FIG. 31, in step 731, a mode register may be set for the PIM operation in the PIM device 620. Here, the values set in the mode register may be various parameters required in the process of performing the PIM operation in the PIM device 620. Next, in step 732, a lookup table LUT that is used for an AF process may be stored in the memory banks BK0-BK"N−1" of the PIM device 620. Next, in step 733, a primary setting for the command mapping register 623 may be performed. The primary setting for the command mapping register 623 may be defined as setting for the remaining registers, except for the first register in which the MAC arithmetic operation is stored as the PIM operation, that is, the second to ninth registers. In an example, steps 731 to 733 may be performed during a boot-up process of the PIM device 620.

Next, in step 734, weight data may be stored in, for example, first to second rows having first to second row addresses, respectively, among the rows of the memory banks BK0-BK"N−1" of the PIM device 620. Next, in step 735, a secondary setting for the command mapping register 623 may be performed. The secondary setting for the command mapping register 623 may be defined as setting for the first register in which the MAC arithmetic operation is stored as the PIM operation. In this case, in a start row address entry and an end row address entry of the first register, a first row address and a second row address, which are a start row address and a last row address of the first row and the second row in which weight data is stored, respectively. In an example, steps 734 and 735 may be performed in a deep learning (DL) initialization process of the PIM device 620.

FIG. 42 is a diagram illustrating a state of the command mapping register 623 before the primary setting for the command mapping register 623 of step 733 is performed in the flowchart of FIG. 41. In the following example, it is assumed that the PIM operation is stored in the PIM operation entry of each of the first to ninth registers of the command mapping register 623. Referring to FIG. 42 together with FIG. 41, before performing step 733 among the steps of FIG. 41, that is, before performing the primary setting for the command mapping register 623, the row addresses are not stored yet in the start row address entry and the end row address entry of each of the first to ninth registers of the command mapping register 623. Accordingly, disable data Disable indicating a disable state may be stored in the state entry of each of the first to ninth registers of the command mapping register 623.

FIG. 43 is a diagram illustrating a state of the command mapping register 623 after performing the primary setting for the command mapping register 623 in step 733 in the flowchart of FIG. 41. Referring to FIG. 43 together with FIG. 41, after performing step 733 among the steps of FIG. 41, that is, after performing the primary setting for the command mapping register 623, a start row address and an end row address may be stored in the start row address entry and the end row address entry of each of the second to ninth registers of the command mapping register 623, respectively. As the setting for the second to ninth registers of the command mapping register 623 is completed, enable data Enable indicating an enable state may be stored in the state entry of each of the second to ninth registers. Even though the primary setting for the command mapping register 623 of step 733 is performed, since the secondary setting of step 735 is not performed, row addresses are not stored yet in the start row address entry and the end row address entry of the first register in which the MAC arithmetic operation is stored among the registers of the command mapping register 623. Accordingly, disable data Disable indicating a disable state may be stored in the state entry of the first register of the command mapping register 623.

FIG. 44 is a diagram illustrating a state of the command mapping register 623 after the secondary setting for the command mapping register 623 of step 733 is performed in the flowchart of FIG. 41. Referring to FIG. 44 together with FIG. 41, after step 735 of steps of FIG. 41 is performed, that is, after the secondary setting for the command mapping register 623 is performed, a start row address "0x8000" and an end row address "0x8FFF" of the rows in which weight data is stored may be stored in the start row address entry and the end address entry of the first register, respectively, among the registers of the command mapping register 623, in which the MAC arithmetic operation is stored. In the state entry of the first register of the command mapping register 623, enable data Enable indicating an enable state may be stored.

Figure 45:
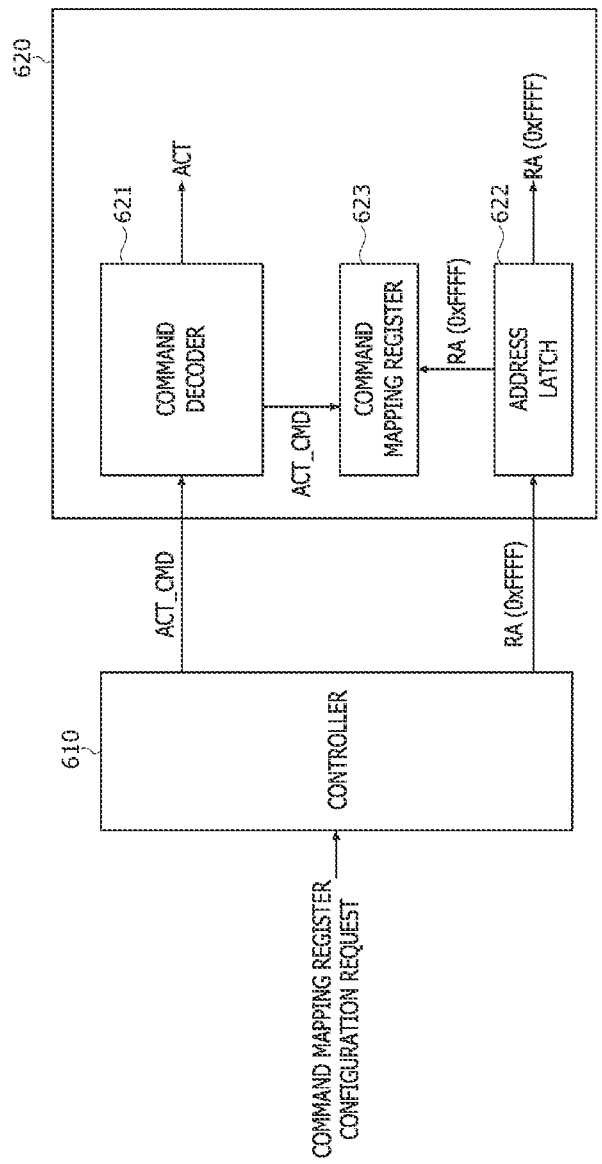

FIGS. 45 to 51 are diagrams illustrating a PIM operation entry setting process of the command mapping register 623 of the PIM device 620 in the PIM system 600 of FIG. 31. First, as illustrated in FIG. 45, when a command mapping register setting request is transmitted from a host, the controller 610 may set the PIM operation entry of each of the first to ninth registers of the command mapping register 623. In the following example, it is assumed that a MAC arithmetic operation is fixedly stored in the PIM operation entry of the first register in which a column address "0x00" is stored among the registers of the command mapping register 623. Specifically, the controller 610 may transmit an active command ACT_CMD and a last row address, for example, "0xFFF", to the PIM device 620. In this example, the controller 610 transmits the last row address to the PIM device 620, but this is only an example and other predefined row addresses may be used instead of the last row address. The command decoder 621 of the PIM device 620 may transmit the active command ACT_CMD to the command mapping register 623. The address latch 622 may transmit the last row address "0xFFFF" to the command mapping register 623. The command mapping register 623 that receives the active command ACT_CMD and the last row address "0xFFFF" may be in a setting mode for setting a PIM operation entry of each of the first to ninth registers.

Figure 46:
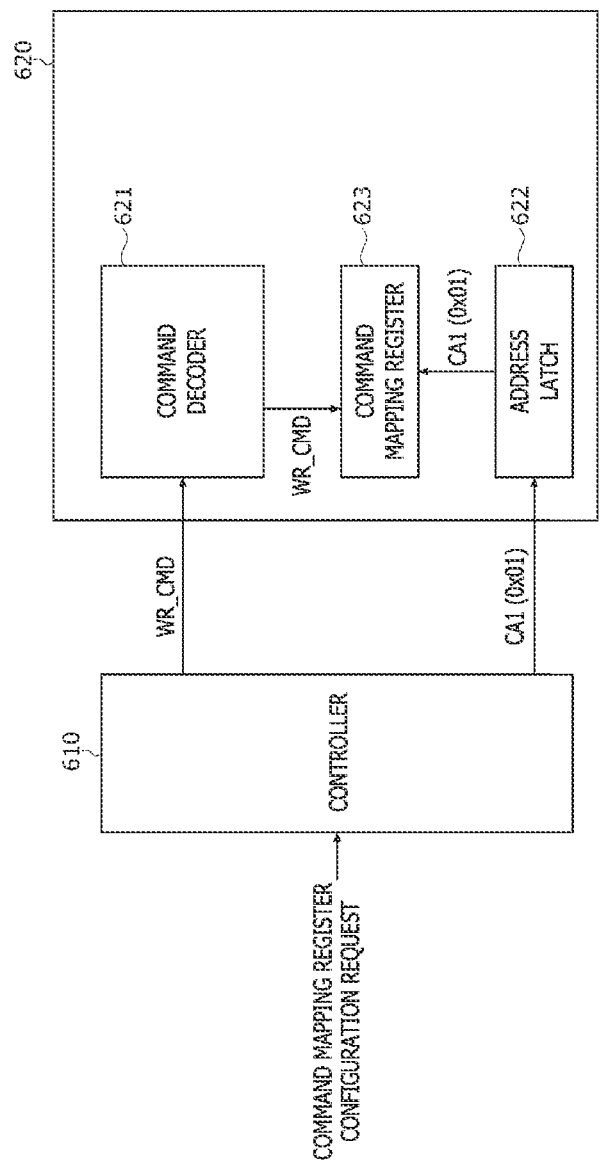

Next, as illustrated in FIG. 46, the controller 610 may transmit a write command WR_CMD and a first column address CA1, for example, "0x01" to the PIM device 620. The command decoder 21 of the PIM device 620 may transmit the write command WR_CMD to the command mapping register 623. The address latch 622 may transmit the first column address "0x01" to the command mapping register 623. As illustrated in FIG. 47, the command mapping register 623 may store a vector data write operation in the PIM operation entry of the second register in which the column address "0x01" is stored in the column address entry.

Figure 48:
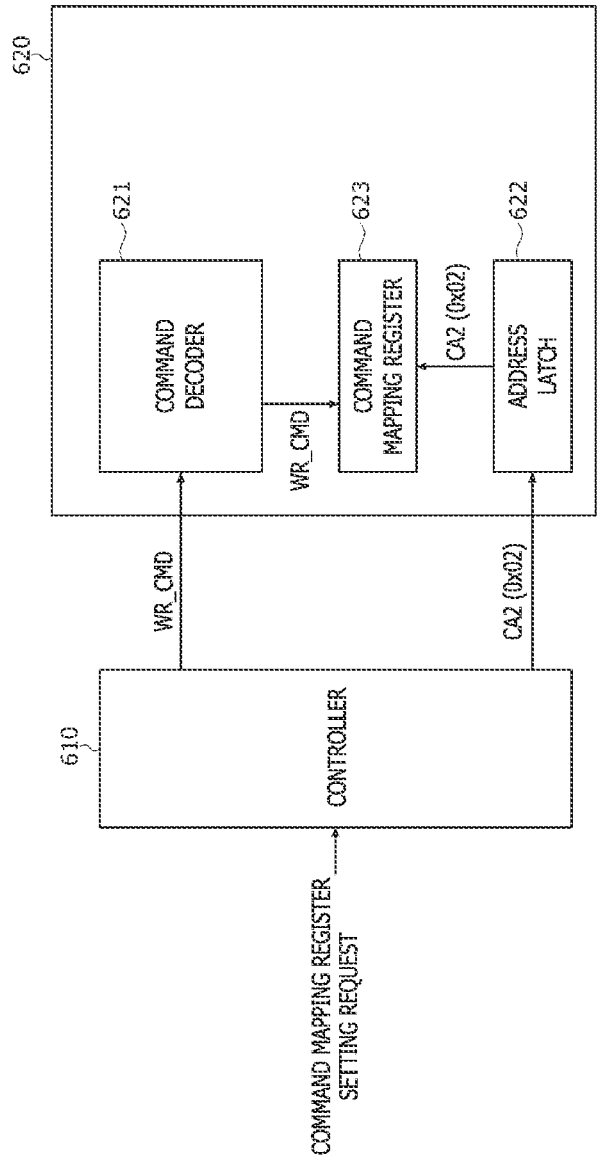

Next, as illustrated in FIG. 48, the controller 610 may transmit a write command WR_CMD and a second column address CA2, for example, "0x02", to the PIM device 620. The command decoder 621 of the PIM device 620 may transmit the write command WR_CMD to the command mapping register 623. The address latch 622 may transmit the second column address "0x02" to the command mapping register 623. As illustrated in FIG. 49, the command mapping register 623 may store a bias data write operation in the PIM operation entry of a third register in which the column address of "0x02" is stored in the column address entry.

Figure 50:
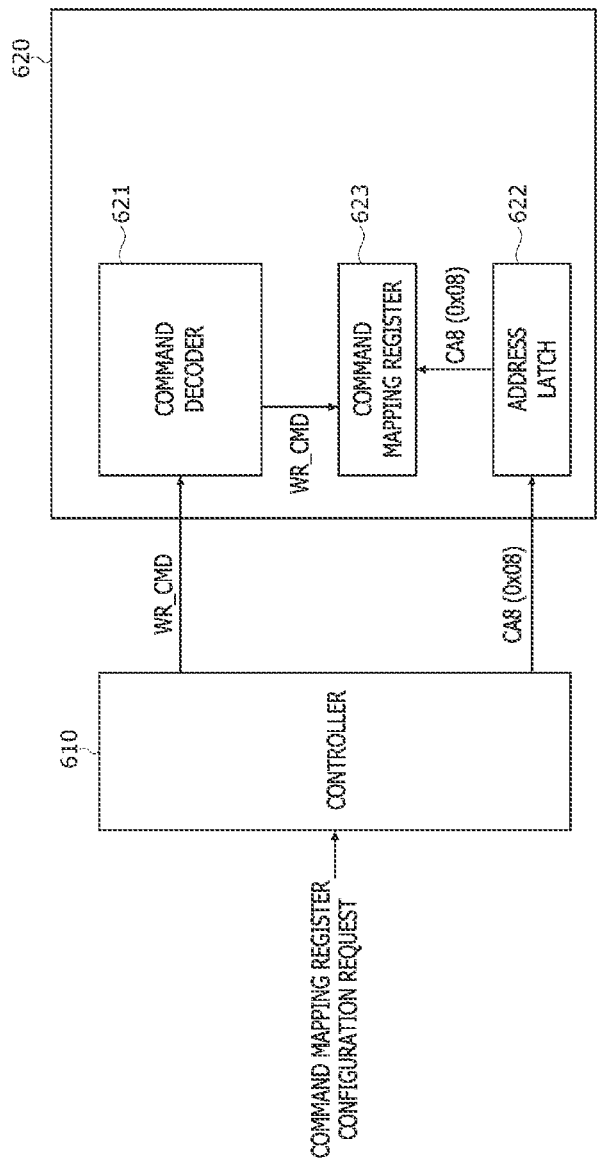

The operation described with reference to FIGS. 46 and 47 or the operation described with reference to FIGS. 48 and 49 may be repeatedly performed until the PIM operation is stored in the PIM operation entry of each of the fourth to eighth registers of the command mapping register 623. Next, as illustrated in FIG. 50, the controller 610 may transmit a write command WR_CMD and an eighth column address CA8, for example, "0x08" to the PIM device 620. The command decoder 621 of the PIM device 620 may transmit the write command WR_CMD to the command mapping register 623. The address latch 622 may transmit the eighth column address CA8 "0x08" to the command mapping register 623. As illustrated in FIG. 51, the command mapping register 623 may store an AF result data read operation in the PIM operation entry of the ninth register in which the column address "0x08" is stored in the column address entry.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. A processing-in-memory (PIM) device comprising:
   a plurality of multiplication and accumulation (MAC) units, each of the plurality of MAC units including a memory bank and a MAC operator and performing one operation, among a memory operation and a PIM operation;
   a command mapping register configured to generate one of a memory operation mode signal and a PIM operation mode signal based on a row address that is mapped to the PIM operation to be performed by the plurality of MAC units; and
   a command decoder configured to generate a memory control signal for the memory operation and a PIM control signal for the PIM operation,
   wherein the command decoder is configured to generate the PIM control signal in response to the PIM operation mode signal and configured to transmit the PIM control signal to the plurality of MAC units, and
   wherein the command decoder is configured to generate the memory control signal in response to the memory operation mode signal and configured to transmit the memory control signal to the plurality of MAC units.

2. The PIM device of claim 1,
   wherein the command mapping register includes a plurality of registers, and wherein each of the plurality of registers includes:
a PIM operation entry configured to store the PIM operation of the plurality of MAC operators;
a start row address entry configured to store a start row address of the PIM operation; and
an end row address entry configured to store an end row address of the PIM operation.

3. The PIM device of claim 2, wherein each of the plurality of registers further includes a state entry configured to store state data that indicates whether the PIM operation is available.

4. The PIM device of claim 2,
wherein each of the plurality of registers further includes a column address entry configured to store a column address that defines the PIM operation and distinguishing the plurality of registers from each other.

5. The PIM device of claim 2, further comprising a global buffer and a bias register configured to provide vector data and bias data, respectively, to each of the plurality of MAC units,
wherein the PIM operation defined in the PIM operation entry of the command mapping register includes:
a MAC arithmetic operation of the plurality of MAC units;
a vector data write operation of storing the vector data in the global buffer;
a bias data write operation of storing the bias data in the bias register;
an active function operation of applying an active function to the plurality of MAC units;
a MAC result data read operation of reading MAC result data from the plurality of MAC units; and
an active function result data read operation of reading active function result data from the plurality of MAC units.

6. The PIM device of claim 5, wherein the start address entry and the end address entry, corresponding to the MAC arithmetic operation in the PIM operation entry, store a start row address and an end row address of the memory bank in which weight data that is used for the MAC arithmetic operations is stored, respectively.

7. The PIM device of claim 1, wherein the command decoder is configured to transmit an active command to the command mapping register when the active command is received from an outside device.

8. The PIM device of claim 7, further comprising an address latch configured to latch an address that is transmitted from the outside device and to transmit the address to a memory bank of each of the plurality of MAC units,
wherein the address latch is configured to transmit a row address to the command mapping register when the row address is transmitted together with the active command.

9. The PIM device of claim 8, wherein the command mapping register is configured to:
generate the PIM operation mode signal when the row address corresponds to the row address that is mapped to the PIM operation, and
generate the memory operation mode signal when the row address does not correspond to the row address that is mapped to the PIM operation.

10. The PIM device of claim 9, wherein the command decoder is configured to:
generate a read control signal or a write control signal and transmit the read control signal or write control signal to the plurality of MAC units, in response to a read command or a write command that is subsequently transmitted to the active command, respectively, when the memory operation mode signal is transmitted from the command mapping register, and
generate the PIM control signal that is determined by the PIM operation mode signal and transmit the PIM control signal to the plurality of MAC units, in response to the read command or the write command that is subsequently transmitted to the active command when the PIM operation mode signal is transmitted from the command mapping register.

11. A processing-in-memory (PIM) system comprising:
a controller configured to generate a command and an address in response to a request from a host; and
a PIM device configured to perform a memory operation or a PIM operation in response to the command and address from the controller,
wherein the PIM device comprises:
a plurality of multiplication and accumulation (MAC) units, each of the plurality of MAC units including a memory bank and a MAC operator and performing one operation, among the memory operation and the PIM operation;
a command mapping register configured to generate one of a memory operation mode signal and a PIM operation mode signal based on a row address that is mapped to the PIM operation to be performed by the plurality of MAC units; and
a command decoder configured to generate a memory control signal for the memory operation and a PIM control signal for the PIM operation,
wherein the command decoder is configured to generate the PIM control signal to transmit the PIM control signal to the plurality of MAC units in response to the PIM operation mode signal, and
wherein the command decoder is configured to generate the memory control signal to transmit the memory control signal to the plurality of MAC units in response to the memory operation mode signal.

12. The PIM system of claim 11, wherein the command mapping register includes a plurality of registers, and
wherein each of the plurality of registers includes:
a PIM operation entry configured to store the PIM operation of each of the plurality of MAC operators;
a start row address entry configured to store a start row address of the PIM operation; and
an end row address entry configured to store an end row address of the PIM operation.

13. The PIM system of claim 12, wherein each of the plurality of registers further includes a state entry configured to store state data that indicates whether the PIM operation is available.

14. The PIM system of claim 12,
wherein each of the plurality of registers further includes a column address entry configured to store a column address that defines the PIM operation and distinguishing the plurality of registers from each other.

15. The PIM system of claim 12, wherein the PIM device further includes a global buffer and a bias register configured to provide vector data and bias data, respectively, to each of the plurality of MAC units, and
wherein the PIM operation defined in the PIM operation entry of the command mapping register includes:
a MAC arithmetic operation of the plurality of MAC units;
a vector data write operation of storing the vector data in the global buffer;

a bias data write operation of storing the bias data in the bias register;

an active function operation of applying an active function to the plurality of MAC units;

a MAC result data read operation of reading MAC result data from the plurality of MAC units; and an active function result data read operation of reading active function result data from the plurality of MAC units.

16. The PIM system of claim 15, wherein the start address entry and the end address entry, corresponding to the MAC arithmetic operation in the PIM operation entry, store a start row address and an end row address of the memory bank in which weight data that is used for the MAC arithmetic operation is stored, respectively.

17. The PIM system of claim 11, wherein the controller is configured to transmit an active command and the row address that is mapped to the PIM operation of the command mapping register to the PIM device when an active request for the PIM operation is transmitted from the host.

18. The PIM system of claim 17, wherein the PIM device further includes an address latch configured to latch an address that is transmitted from the controller and transmit the address to the memory bank of each of the plurality of MAC units, and wherein the address latch is configured to transmit a row address to the command mapping register when the row address is transmitted together with the active command.

19. The PIM system of claim 18, wherein the command mapping register is configured to:

generate the PIM operation mode signal when the row address corresponds to the row address that is mapped to the PIM operation, and generate the memory operation mode signal when the row address does not correspond to the row address that is mapped to the PIM operation.

20. The PIM system of claim 19, wherein the command decoder is configured to:

generate a read control signal or a write control signal and transmit the read control signal or the write control signal to the plurality of MAC units, in response to a read command or a write command that is subsequently transmitted to the active command, respectively when the memory operation mode signal is transmitted from the command mapping register, and generate the PIM control signal that is determined by the PIM operation mode signal and transmit the PIM control signal to the plurality of MAC units, in response to the read command or the write command that is subsequently transmitted to the active command when the PIM operation mode signal is transmitted from the command mapping register.

21. The PIM system of claim 11, wherein the command mapping register includes:

a PIM operation entry defining the PIM operation of the plurality of MAC operators;

a start row address entry defining a start row address of the PIM operation;

an end row address entry defining the end row address of the PIM operation; and a column address entry distinguishing the PIM operation, wherein the controller is configured to transmit a last row address and an active signal of the memory bank of each of the plurality of MAC units to the PIM device during boot-up and then configured to sequentially transmit write commands and column addresses in the column address entry to the PIM device, and wherein the PIM device is configured to set the PIM operation entry in response to the write commands and the column addresses that are transmitted from the controller.

* * * * *